(12) United States Patent
Sullivan et al.

(10) Patent No.: US 9,488,423 B2
(45) Date of Patent: Nov. 8, 2016

(54) FIREARM SYSTEMS AND METHODS

(71) Applicant: Arm West, LLC., Prescott, AZ (US)

(72) Inventors: Leroy James Sullivan, Prescott, AZ (US); James McGarry, Prescott, AZ (US); Robert Lloyd Waterfield, Prescott, AZ (US); Paul N. Latulippe, Jr., Chino Valley, AZ (US)

(73) Assignee: Arm West, LLC, Prescott, AZ (US)

( * ) Notice: Subject to any disclaimer, the term of this patent is extended or adjusted under 35 U.S.C. 154(b) by 0 days.

(21) Appl. No.: 14/720,713

(22) Filed: May 22, 2015

(65) Prior Publication Data
US 2016/0047612 A1 Feb. 18, 2016

Related U.S. Application Data

(63) Continuation-in-part of application No. 13/348,871, filed on Jan. 12, 2012, now Pat. No. 9,038,525.

(60) Provisional application No. 61/433,092, filed on Jan. 14, 2011, provisional application No. 61/433,083, (Continued)

(51) Int. Cl.
*F41A 15/14* (2006.01)
*F41A 3/14* (2006.01)
(Continued)

(52) U.S. Cl.
CPC .. *F41A 3/14* (2013.01); *F16J 9/16* (2013.01); *F41A 3/26* (2013.01); *F41A 3/70* (2013.01);
(Continued)

(58) Field of Classification Search
CPC .............. F41A 3/14; F41A 3/16; F41A 3/26; F41A 3/30; F41A 3/64; F41A 3/66; F41A 15/00; F41A 15/12; F41A 15/14

USPC .................................................. 42/25; 89/138
See application file for complete search history.

(56) References Cited

U.S. PATENT DOCUMENTS

| 804,986 A | 11/1905 | Stamm |
| 980,980 A | 1/1911 | Maggio |

(Continued)

FOREIGN PATENT DOCUMENTS

| CH | 37247 | 5/1907 |
| CH | 199224 | 8/1938 |

(Continued)

OTHER PUBLICATIONS

"HS-Precision-Magazine Feed Liptool", Brownells, 1 page, [online], [retrieved on May 21, 2015]. Retrieved from the internet: <URL:http://www.brownells.com/.aspx/pid=25049/Product/Madazine-Feed-Liptool>.

*Primary Examiner* — Bret Hayes
*Assistant Examiner* — Derrick Morgan
(74) *Attorney, Agent, or Firm* — Haynes and Boone, LLP

(57) ABSTRACT

A firearm can have a bolt having a plurality of locking lugs that are configured to have a shear area that is larger than that of a standard M16/M4. A bolt carrier can have a bolt that has a double cut cam having an unlocking cam surface that has sufficient dwell increase to delay a start of unlocking when the bolt carrier is used in an M4 carbine. A stepped extractor pin may be provided that prevents disengagement of the extractor pin. A tube can be configured to provide gas from a barrel of the firearm to the piston via the carrier key. The tube can have a heat radiator formed from triangular shaped threads on at least a portion of the tube. A piston on the bolt can have a plurality of rings including pairs of mating rings that are formed and maintained as a matched pair.

30 Claims, 42 Drawing Sheets

Related U.S. Application Data filed on Jan. 14, 2011, provisional application No. 61/478,439, filed on Apr. 22, 2011, provisional application No. 61/479,194, filed on Apr. 26, 2011, provisional application No. 61/498,426, filed on Jun. 17, 2011, provisional application No. 61/528,062, filed on Aug. 26, 2011.

(51) Int. Cl.

| | | |
|---|---|---|
| *F41A 5/26* | (2006.01) | |
| *F16J 9/16* | (2006.01) | |
| *F41A 3/26* | (2006.01) | |
| *F41A 3/70* | (2006.01) | |
| *F41A 5/18* | (2006.01) | |
| *F41A 5/24* | (2006.01) | |
| *F41A 5/28* | (2006.01) | |
| *F41A 13/12* | (2006.01) | |
| *F41A 21/24* | (2006.01) | |

(52) U.S. Cl.
CPC .. *F41A 5/18* (2013.01); *F41A 5/24* (2013.01); *F41A 5/26* (2013.01); *F41A 5/28* (2013.01); *F41A 13/12* (2013.01); *F41A 21/24* (2013.01)

(56) References Cited

U.S. PATENT DOCUMENTS

| | | | |
|---|---|---|---|
| 1,202,707 A | 10/1916 | Greico | |
| 1,227,439 A | 5/1917 | Hilgendorf | |
| 1,357,949 A * | 11/1920 | Brooks | F16J 9/16 277/446 |
| 1,402,459 A | 1/1922 | Swebilius | |
| 1,413,409 A | 4/1922 | Lackman | |
| 1,431,059 A | 10/1922 | Sutter | |
| 1,476,657 A * | 12/1923 | Tawney | F16J 9/16 277/446 |
| 1,500,580 A | 7/1924 | Fererro | |
| 1,588,887 A | 6/1926 | Haubroe | |
| 1,771,311 A | 7/1930 | Phliponeau | |
| 1,907,164 A | 5/1933 | White | |
| 1,946,388 A | 2/1934 | Chevallier | |
| 2,088,268 A | 7/1937 | Lauf | |
| 2,096,028 A | 10/1937 | Burton et al. | |
| 2,147,208 A | 2/1939 | Nolan | |
| 2,217,848 A | 10/1940 | Schillstrom | |
| 2,287,066 A | 6/1942 | Rogers | |
| 2,345,031 A | 3/1944 | Carithers | |
| 2,361,985 A | 11/1944 | Birkigt | |
| 2,365,306 A | 12/1944 | Swebilius | |
| 2,365,392 A | 12/1944 | Cooley | |
| 2,376,466 A | 5/1945 | Williams | |
| 2,391,756 A | 12/1945 | Vesely | |
| 2,462,119 A | 2/1949 | Moore | |
| 2,482,880 A | 9/1949 | Sefried, II | |
| 2,488,233 A | 11/1949 | Pelo | |
| 2,495,460 A | 1/1950 | Koucky | |
| 2,503,116 A | 4/1950 | Maillard | |
| 2,510,685 A | 6/1950 | Chevallier et al. | |
| 2,589,274 A * | 3/1952 | Moratta | F16J 9/061 277/464 |
| 2,712,192 A * | 7/1955 | Dixon | F41A 15/14 42/25 |
| 2,756,640 A | 7/1956 | Maillard | |
| 2,910,332 A | 10/1959 | Madsen | |
| 2,918,848 A | 12/1959 | Maillard | |
| 2,981,154 A | 4/1961 | Sweeney | |
| 3,043,198 A | 7/1962 | Darsie et al. | |
| 3,090,148 A | 5/1963 | Smith | |
| 3,090,149 A | 5/1963 | Marlas | |
| 3,198,076 A | 8/1965 | Stoner | |
| 3,226,869 A | 1/1966 | Musgrave | |
| 3,236,155 A | 2/1966 | Sturtevant | |
| 3,283,435 A | 11/1966 | Koch | |
| 3,290,815 A | 12/1966 | Edwards | |
| 3,300,889 A | 1/1967 | Baker | |
| 3,318,192 A | 5/1967 | Sullivan et al. | |
| 3,330,183 A | 7/1967 | Löffler | |
| 3,333,510 A | 8/1967 | Muhlemann | |
| 3,345,771 A | 10/1967 | Silsby | |
| 3,346,982 A | 10/1967 | Loffler et al. | |
| 3,366,011 A | 1/1968 | Stutervant | |
| 3,381,405 A | 5/1968 | Edwards | |
| 3,429,223 A | 2/1969 | Seccombe | |
| 3,440,751 A | 4/1969 | Fremont | |
| 3,604,142 A | 9/1971 | Silsby | |
| 3,672,089 A | 6/1972 | Silsby | |
| 3,688,641 A | 9/1972 | Curtis et al. | |
| 3,795,173 A | 3/1974 | Freymond | |
| 3,969,983 A | 7/1976 | Zellweger et al. | |
| 3,977,114 A | 8/1976 | Poor | |
| 3,990,348 A | 11/1976 | Vesamaa | |
| 4,020,740 A | 5/1977 | Schirneker | |
| 4,127,954 A | 12/1978 | Hausmann | |
| 4,142,314 A | 3/1979 | Foote | |
| 4,150,819 A | 4/1979 | Taylor | |
| 4,279,091 A | 7/1981 | Edwards | |
| 4,416,186 A | 11/1983 | Sullivan | |
| 4,428,137 A | 1/1984 | Johnson | |
| 4,440,062 A * | 4/1984 | McQueen | F41A 15/14 89/128 |
| 4,446,645 A | 5/1984 | Kelsey, Jr. | |
| 4,505,182 A | 3/1985 | Sullivan | |
| 4,524,672 A | 6/1985 | Balsavage | |
| 4,589,218 A | 5/1986 | Teppa | |
| 4,765,224 A * | 8/1988 | Morris | F41A 5/26 42/75.02 |
| 4,910,904 A | 3/1990 | Rose | |
| 4,986,018 A | 1/1991 | Mcdonald, Jr. | |
| 5,168,648 A | 12/1992 | Brandl | |
| 5,267,406 A * | 12/1993 | Ruger | F41A 15/14 42/25 |
| 5,343,649 A | 9/1994 | Petrovich | |
| 5,448,940 A | 9/1995 | Schuetz et al. | |
| 5,495,687 A | 3/1996 | Waiser | |
| 5,561,933 A | 10/1996 | Czekalski | |
| 5,617,664 A | 4/1997 | Troncoso | |
| 5,634,288 A * | 6/1997 | Martel | F41A 5/18 42/71.01 |
| 5,726,377 A | 3/1998 | Harris et al. | |
| 5,827,992 A | 10/1998 | Harris et al. | |
| 5,909,002 A | 6/1999 | Atchisson | |
| 5,920,028 A | 7/1999 | Guhring et al. | |
| 6,340,161 B1 * | 1/2002 | Zitting | F16J 9/16 277/459 |
| 6,484,430 B1 * | 11/2002 | Robinson | F41A 3/26 42/25 |
| 6,609,319 B1 * | 8/2003 | Olson | F41A 3/26 42/16 |
| 6,722,255 B2 | 4/2004 | Herring | |
| 6,829,974 B1 | 12/2004 | Gwinn, Jr. | |
| 6,848,351 B1 | 2/2005 | Davies | |
| 6,898,888 B2 | 5/2005 | Greenhut | |
| 6,931,978 B1 | 8/2005 | Dionne | |
| 7,117,626 B1 | 10/2006 | Alzamora | |
| 7,275,472 B1 * | 10/2007 | Finn | F41A 3/74 89/26 |
| 7,293,385 B2 | 11/2007 | McCormick | |
| 7,464,496 B1 | 12/2008 | Davies et al. | |
| 7,627,974 B2 | 12/2009 | Olson | |
| 7,793,453 B1 | 9/2010 | Sewell, Jr. et al. | |
| 7,823,314 B1 | 11/2010 | Wheatley | |
| 7,827,722 B1 | 11/2010 | Davies | |
| 7,832,326 B1 | 11/2010 | Barrett | |
| 7,886,470 B1 | 2/2011 | Doiron | |
| 7,938,055 B2 | 5/2011 | Hochstrate et al. | |
| 8,028,611 B2 | 10/2011 | Loundsbury | |
| 8,061,071 B2 | 11/2011 | Fitzpatrick et al. | |
| 8,087,194 B1 | 1/2012 | Vuksanovich | |
| 8,141,285 B2 | 3/2012 | Brown | |
| 8,205,373 B1 | 6/2012 | Ubi et al. | |
| 8,210,089 B2 | 7/2012 | Brown | |
| 8,261,653 B2 | 9/2012 | Crommett | |
| 8,297,175 B1 | 10/2012 | Davies | |

(56) References Cited

U.S. PATENT DOCUMENTS

| | | | |
|---|---|---|---|
| 8,316,756 B1 | 11/2012 | Woodell et al. | |
| 8,365,454 B2 | 2/2013 | Hogan, Jr. | |
| 8,561,337 B2 * | 10/2013 | Lewis | F41A 3/26 |
| | | | 42/73 |
| 8,887,426 B2 * | 11/2014 | Feese | F16F 1/36 |
| | | | 42/25 |
| 9,097,478 B1 * | 8/2015 | Karagias | F41A 15/12 |
| 9,217,615 B2 * | 12/2015 | Lewis | F41A 3/26 |
| 2003/0154640 A1 | 8/2003 | Bragg | |
| 2003/0188567 A1 | 10/2003 | Garrett | |
| 2005/0260545 A1 | 11/2005 | Schavone | |
| 2005/0262752 A1 | 12/2005 | Robinson et al. | |
| 2007/0199435 A1 | 8/2007 | Hochstrate et al. | |
| 2008/0092733 A1 | 4/2008 | Leitner-Wise et al. | |
| 2008/0134557 A1 | 6/2008 | Wossner et al. | |
| 2009/0031607 A1 | 2/2009 | Robinson | |
| 2009/0071053 A1 * | 3/2009 | Thomele | F41A 11/02 |
| | | | 42/1.01 |
| 2009/0151213 A1 | 6/2009 | Bell | |
| 2010/0095833 A1 | 4/2010 | Gavage et al. | |
| 2010/0126053 A1 | 5/2010 | Fitzpatrick et al. | |
| 2010/0163250 A1 * | 7/2010 | Schultz | E21B 17/07 |
| | | | 166/381 |
| 2010/0269389 A1 | 10/2010 | Lopez Laparra | |
| 2011/0005384 A1 | 1/2011 | Lewis et al. | |
| 2011/0173857 A1 | 7/2011 | Hogan, Jr. | |
| 2012/0131831 A1 | 5/2012 | Sullivan et al. | |
| 2012/0137869 A1 * | 6/2012 | Gomez | F41A 3/26 |
| | | | 89/125 |
| 2012/0152105 A1 | 6/2012 | Gomez et al. | |
| 2013/0139424 A1 * | 6/2013 | Devine | F41A 3/26 |
| | | | 42/16 |
| 2014/0075798 A1 | 3/2014 | Kincel | |

FOREIGN PATENT DOCUMENTS

| | | |
|---|---|---|
| CH | 631542 | 8/1982 |
| DE | 242206 | 12/1911 |
| DE | 329336 | 11/1920 |
| DE | 419803 | 10/1925 |
| DE | 478630 | 6/1929 |
| DE | 569280 | 2/1933 |
| DE | 203574 | 8/1938 |
| DE | 664926 | 9/1938 |
| DE | 712084 | 10/1941 |
| DE | 858944 | 12/1952 |
| DE | 3707925 | 9/1988 |
| DE | 102006011278 | 9/2007 |
| DE | 102007011502 | 9/2008 |
| DE | 102007034670 | 1/2009 |
| EP | 0055690 | 7/1982 |
| EP | 1479997 | 11/2004 |
| EP | 1596151 | 11/2005 |
| EP | 2045561 | 4/2009 |
| EP | 2141437 | 1/2010 |
| FR | 1362361 | 5/1964 |
| GB | 166579 | 7/1921 |
| GB | 441687 | 1/1936 |
| GB | 525429 | 8/1940 |
| GB | 536728 | 12/1944 |
| GB | 604348 | 7/1948 |
| GB | 1140405 | 1/1969 |
| GB | 1227706 | 4/1971 |
| GB | 1338189 | 11/1973 |
| GB | 2231943 | 11/1990 |
| JP | 2003/287127 | 10/2003 |
| WO | WO97/25581 | 7/1997 |
| WO | WO2009/137132 | 11/2009 |
| WO | WO2010/132543 | 11/2010 |

* cited by examiner

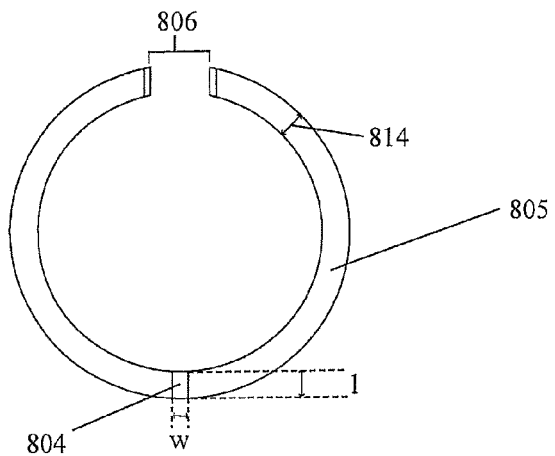
FIG. 8B
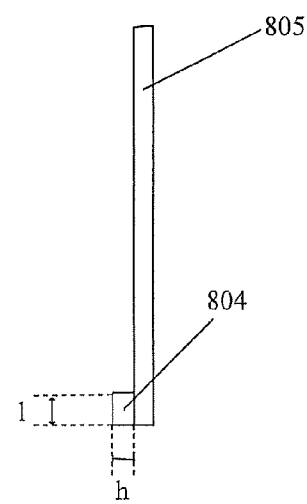
FIG. 8C
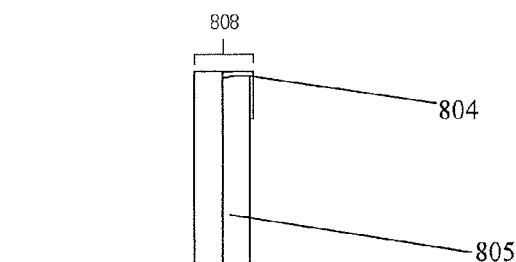
FIG. 8D
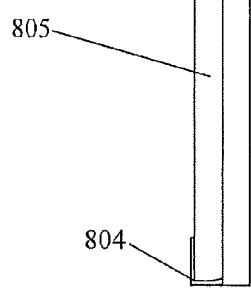
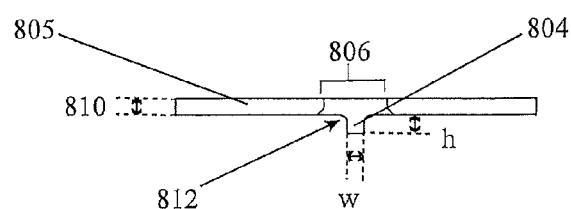
FIG. 8E

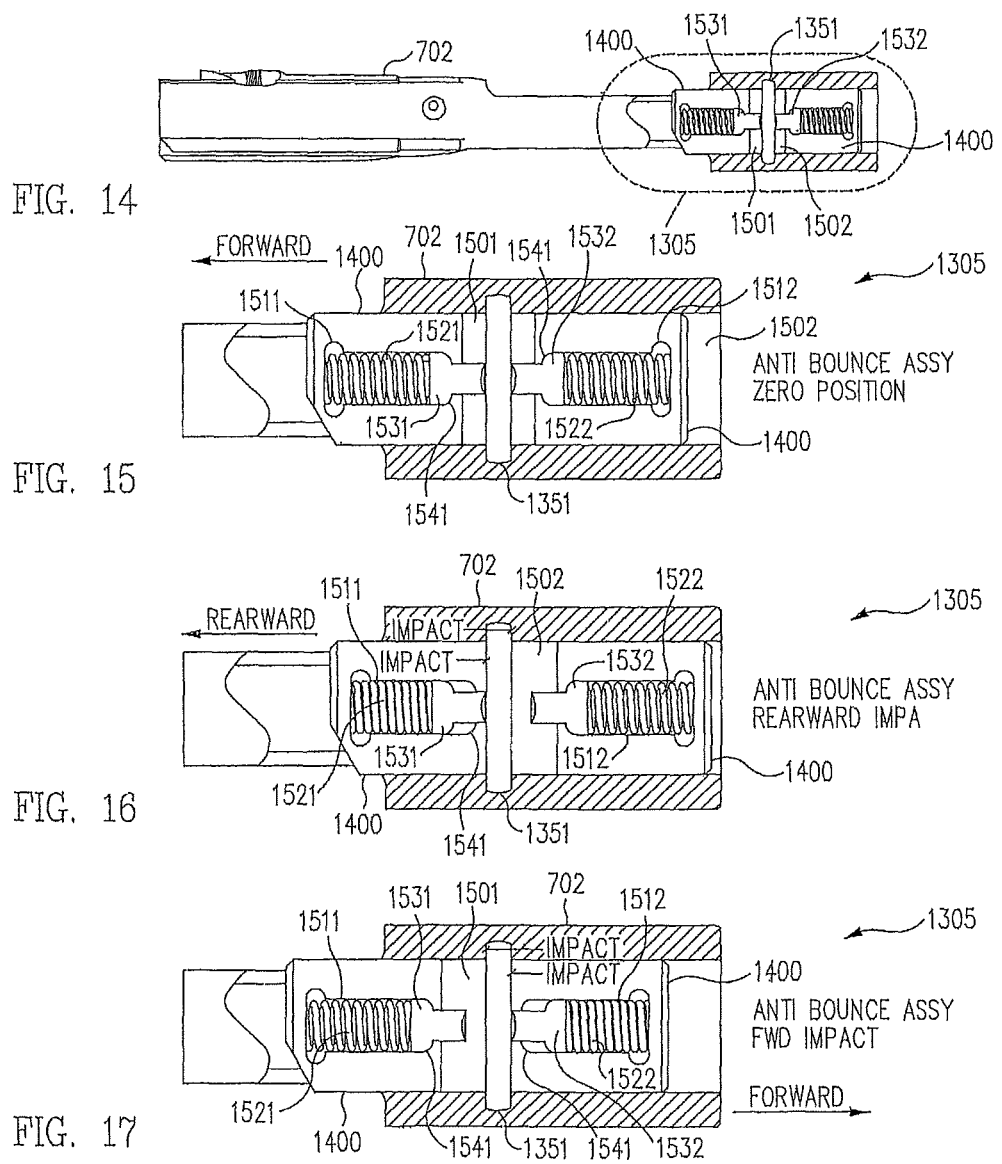

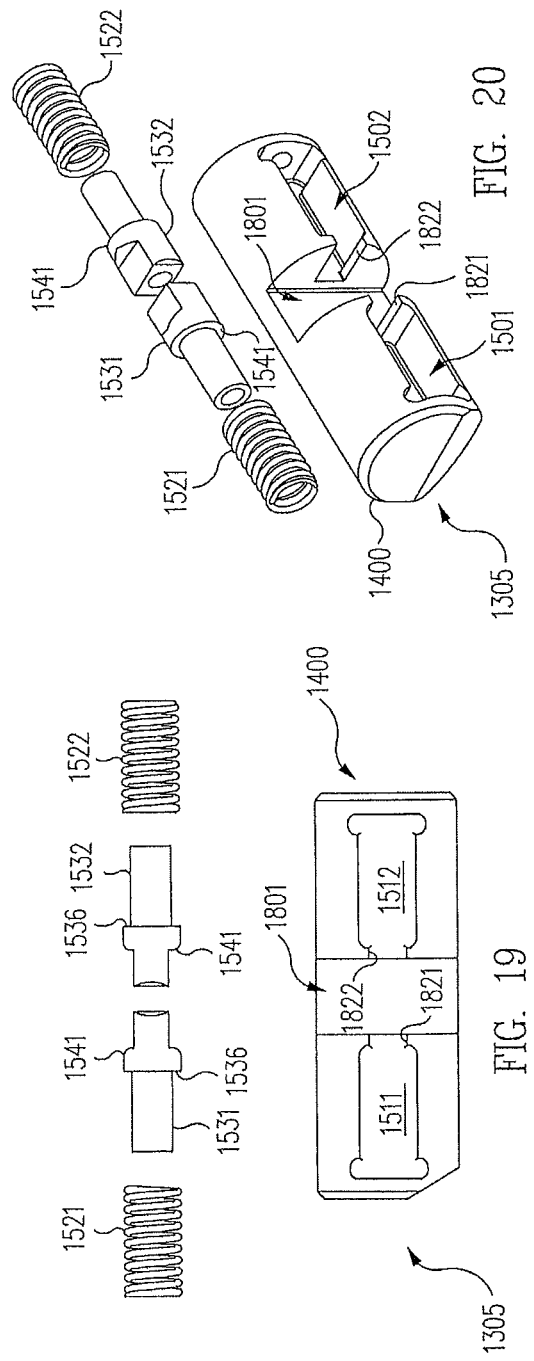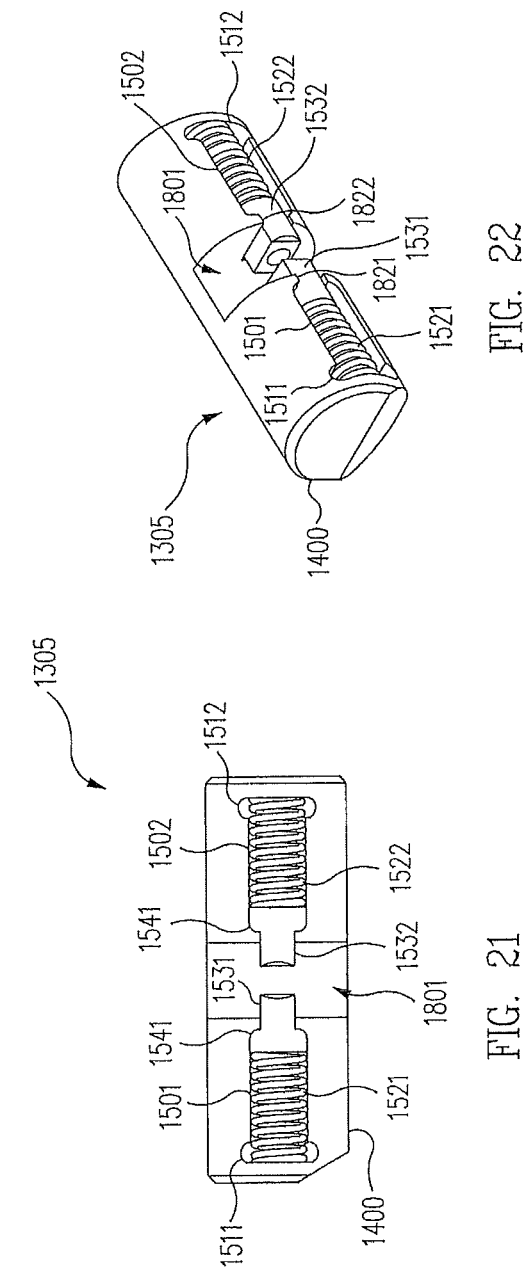

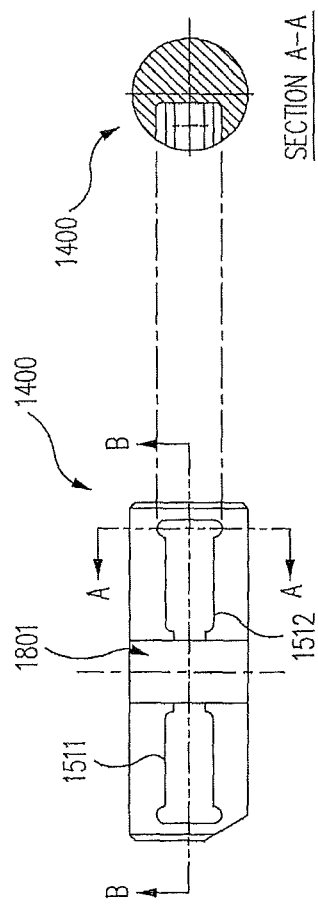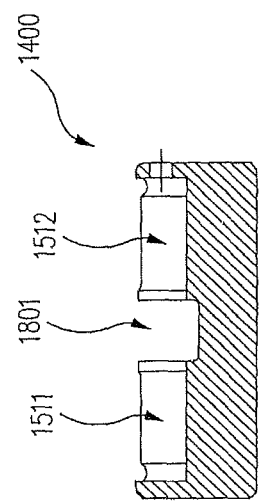
FIG. 29A
FIG. 29B
FIG. 29C

SECTION A-A

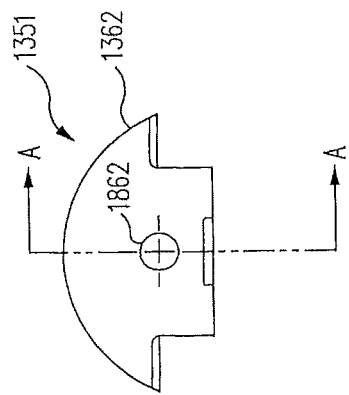
FIG. 31A
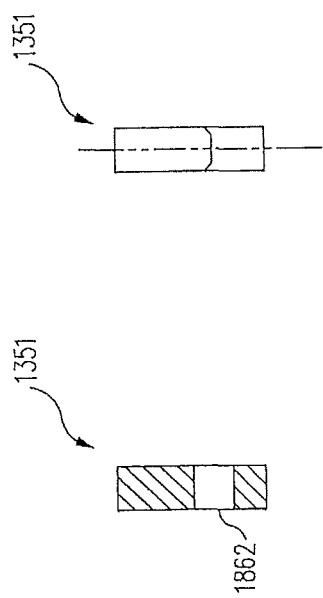
FIG. 31B
FIG. 31C

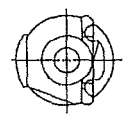
FIG. 32D
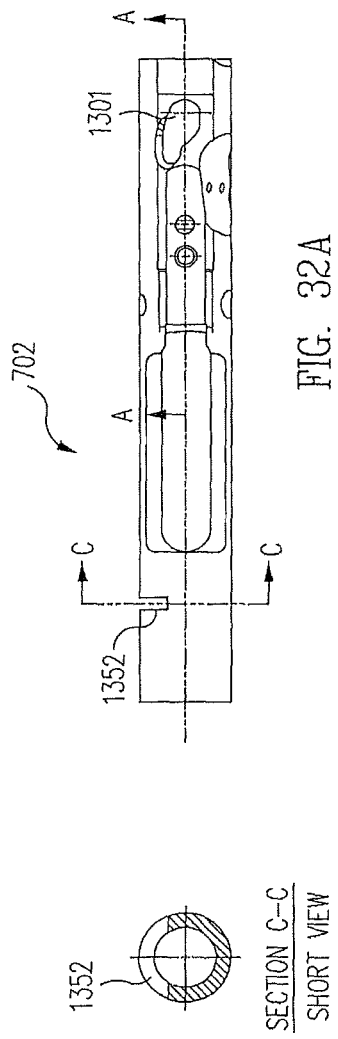
FIG. 32A
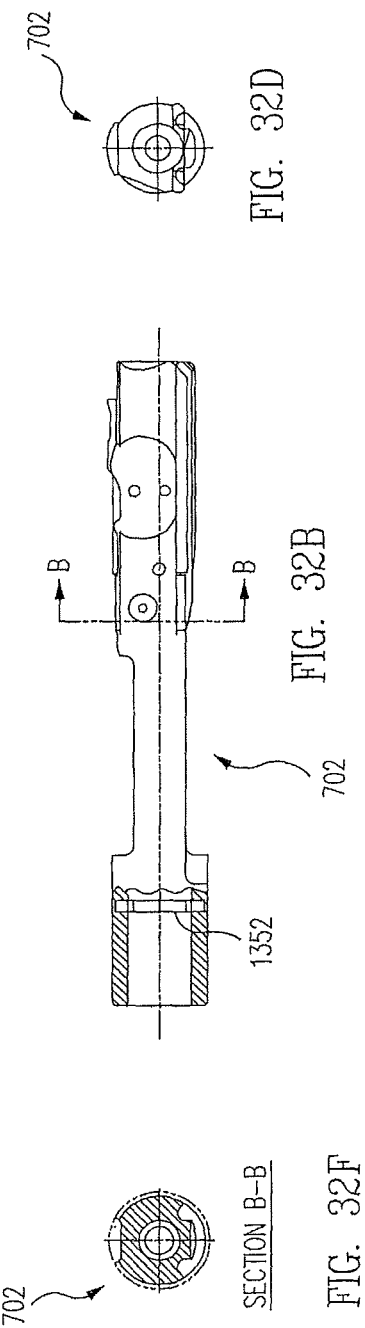
FIG. 32B
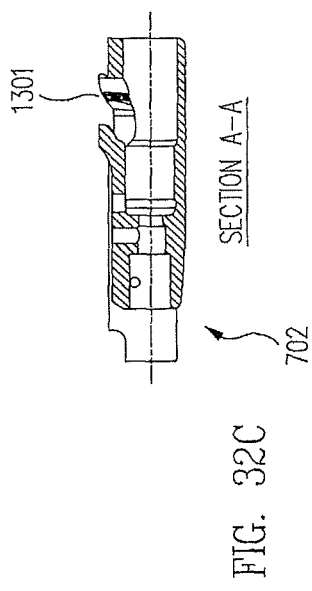
FIG. 32C
SECTION C-C
SHORT VIEW
FIG. 32E
SECTION B-B
FIG. 32F

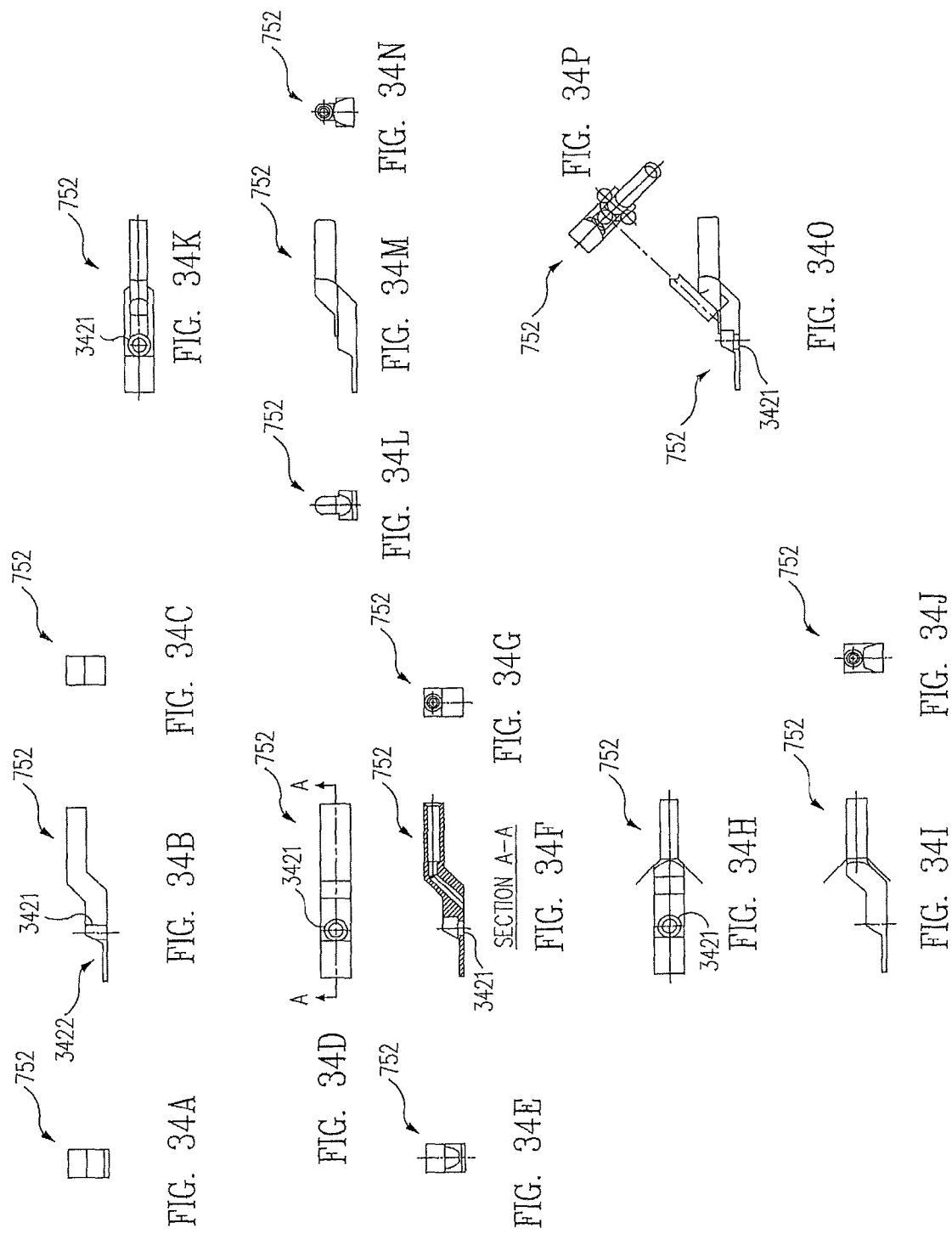

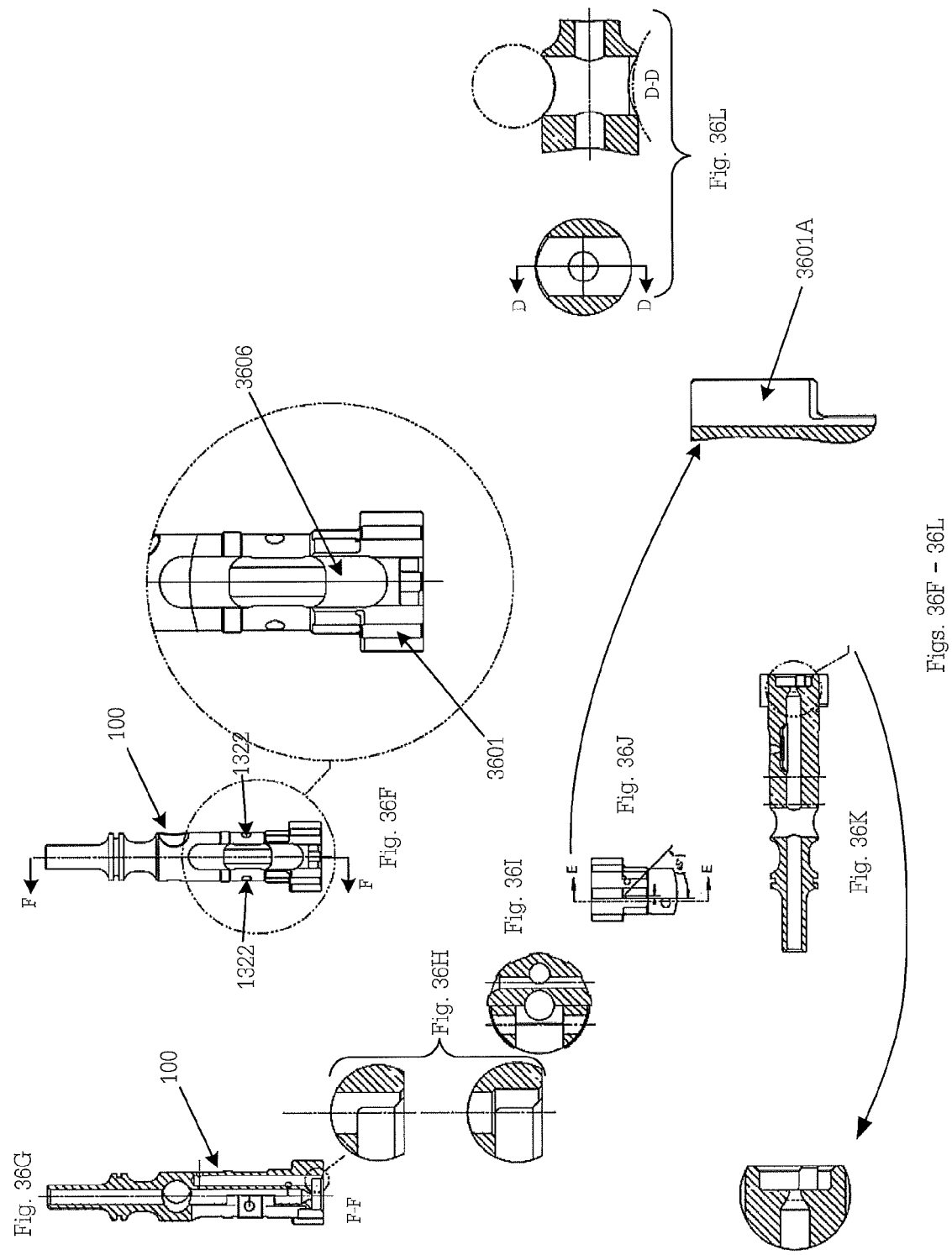

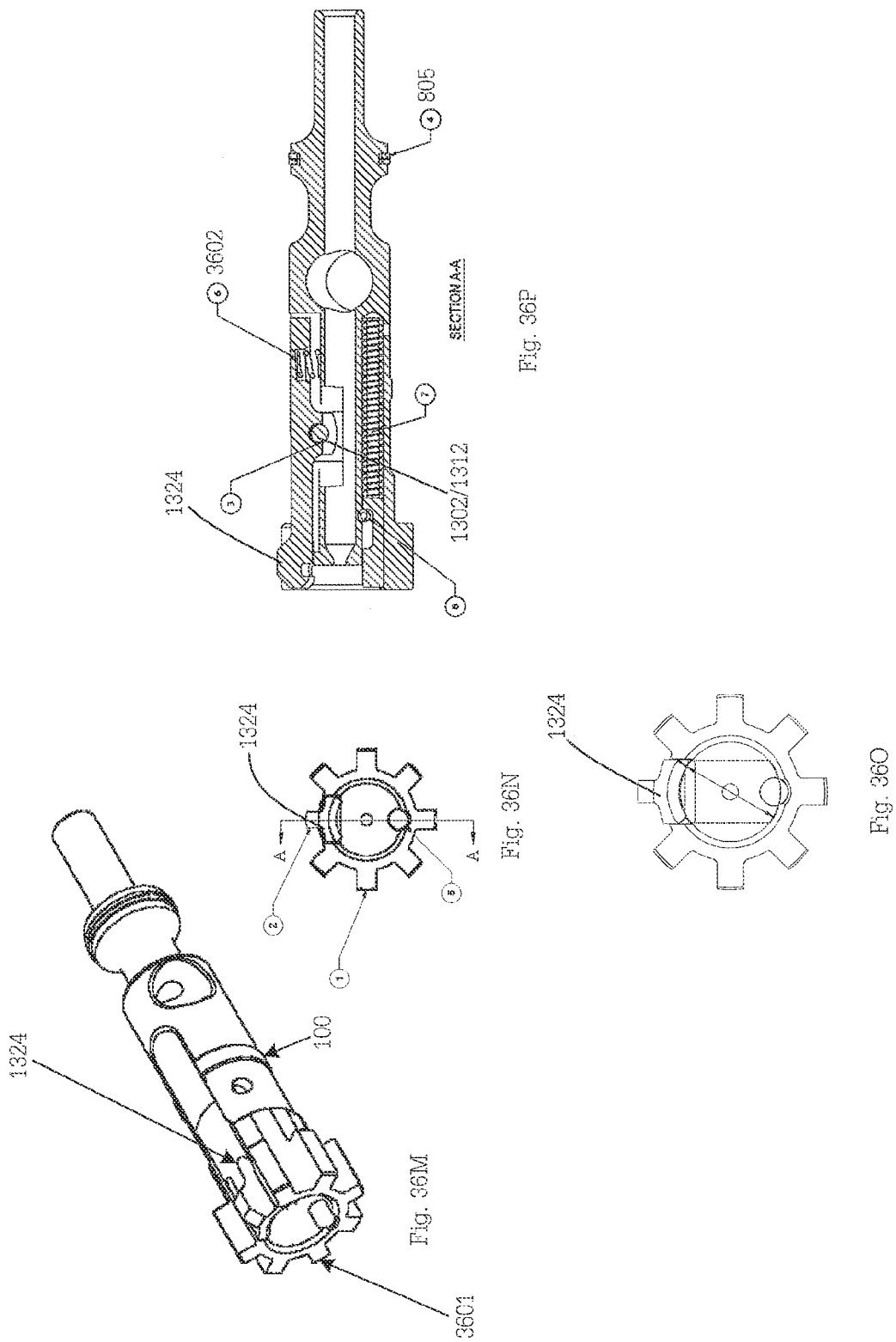

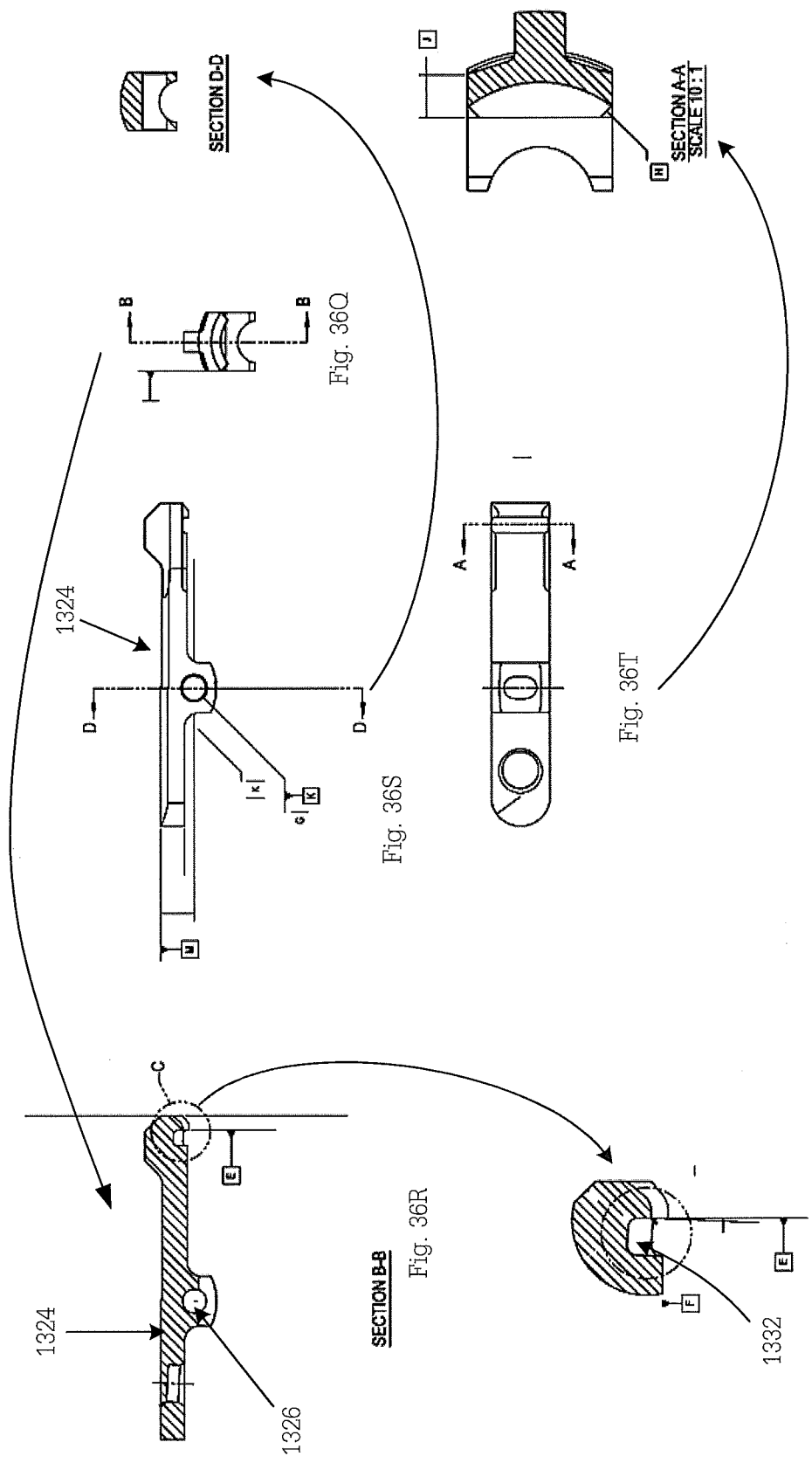

FIG. 36X    SECTION A-A    FIG. 36Y

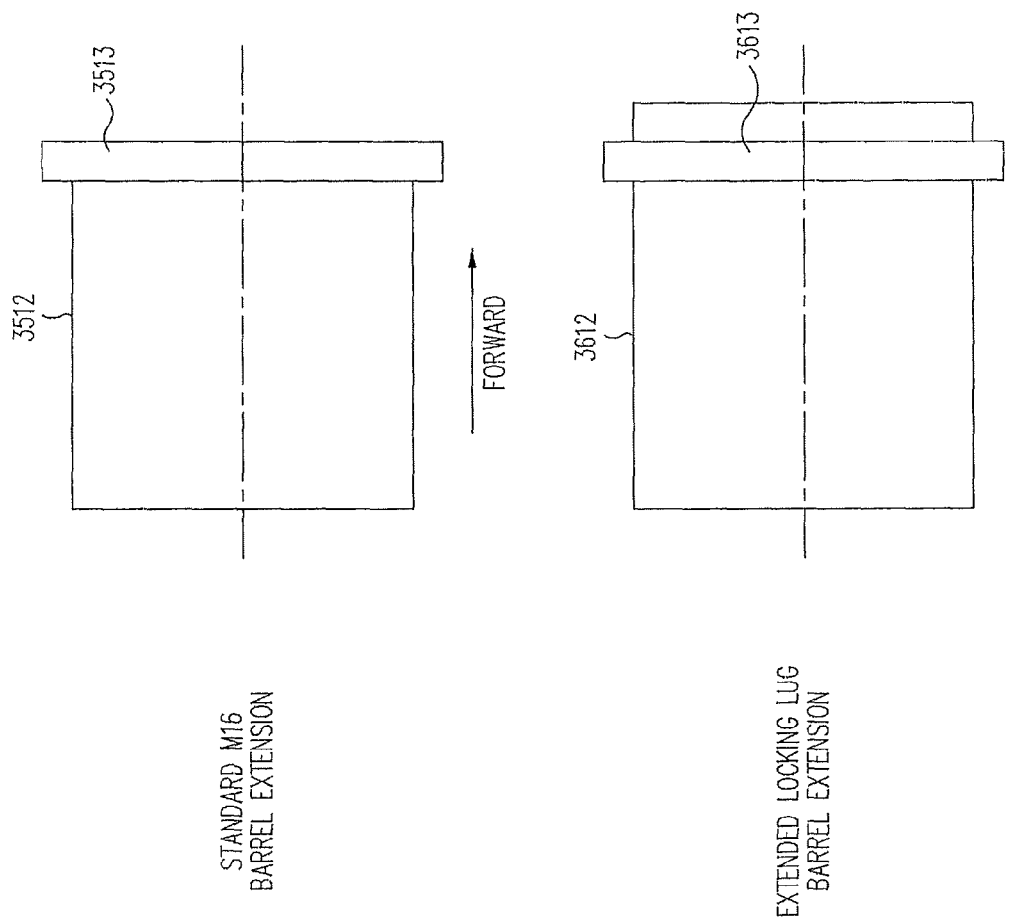

FIREARM SYSTEMS AND METHODS

PRIORITY CLAIM

This application is a continuation-in-part of U.S. patent application Ser. No. 13/348,871 filed Jan. 12, 2012, which is hereby incorporated by reference in its entirety. U.S. patent application Ser. No. 13/348,871 claims the benefit of U.S. Provisional Application No. 61/433,092, filed Jan. 14, 2011. U.S. patent application Ser. No. 13/348,871 claims the benefit of U.S. Provisional Application No. 61/433,083, filed Jan. 14, 2011. U.S. patent application Ser. No. 13/348,871 claims the benefit of U.S. Provisional Application No. 61/478,439, filed Apr. 22, 2011. U.S. patent application Ser. No. 13/348,871 claims the benefit of U.S. Provisional Application No. 61/479,194, filed Apr. 26, 2011. U.S. patent application Ser. No. 13/348,871 claims the benefit of U.S. Provisional Application No. 61/498,426, filed Jun. 17, 2011. U.S. patent application Ser. No. 13/348,871 claims the benefit of U.S. Provisional Application No. 61/528,062, filed Aug. 26, 2011. All of these provisional patent applications are hereby incorporated by reference in their entirety.

TECHNICAL FIELD

One or more embodiments of the invention relate generally to firearms and, more particularly for example, to a firearm such as a member of the M16/M4 family of firearms that has features which enhance the reliability thereof.

BACKGROUND

The M16 service rifle and the M4 carbine are well known. Although these firearms have proven generally satisfactory, the M16 and M4, as well as other firearms, have a variety of reliability shortcomings. These reliability shortcomings can result in a malfunction of the firearm. These reliability shortcomings are becoming more evident as the use of higher capacity magazines increases. Such malfunctions can have serious consequences and are thus highly undesirable. Some of the reliability shortcomings are discussed below.

Gas operated firearms use some of the gas from a cartridge being fired to extract the spent case of the cartridge and to chamber a new cartridge. The gas travels from a port in the barrel to a gas cylinder where the gas pushes a piston within the gas cylinder to operate a mechanism for extracting the spent case and for chambering the new cartridge. In some firearms, such as the M16 and the M4, the gas cylinder is formed in the bolt carrier and the piston is part of the bolt. In such firearms, gas is provided from the barrel to the gas cylinder by a gas tube.

In other firearms, such as the HK416, a separate (not part of the bolt) piston is used. The piston is disposed in a gas cylinder that is not part of the bolt carrier. This separate piston applies force through a tappet or operating rod and a bolt carrier to operate the mechanism for extracting the spent case and for chambering the new cartridge.

Whether or not the piston is part of the bolt, it is desirable to prevent gas leakage between the piston and the cylinder. Contemporary gas operated firearms commonly use a plurality of piston rings which fit into a groove of the piston in an attempt to provide a gas seal between the piston and the cylinder to mitigate gas leakage. For example, the M16, M4, and HK416 use three rings. Each of the rings is a split ring that has a gap formed therein to facilitate installation of the ring and to allow the ring to apply an outward spring force that tends to seal the loose fit between the piston and the cylinder.

Contemporary rings possess inherent deficiencies which detract from their overall effectiveness and desirability. For example, the gaps of the three rings occasionally line up in a manner that allows hot gasses to flow readily through the gaps and thereby undesirably bypass the rings. When the hot gases flow through the gaps, the force provided by the gases to extract a spent case from the chamber and to chamber a new cartridge is undesirably reduced. Further, when the hot gases flow through the gaps, the hot gases can burn the ends of the rings and thereby undesirably enlarge the gaps. It is desirable to provide rings that mitigate undesirable gas flow thereby.

Contemporary gas tubes possess inherent deficiencies which detract from their effectiveness and desirability. For example, contemporary gas tubes can overheat and lose strength, particularly during sustained fully automatic fire of the firearm. The higher level of heat associated with sustained fully automatic fire can result in undesirable thermal expansion of the gas tube both radially and longitudinally. Such thermal expansion can be substantially beyond an amount that can be accommodated by the available space in the firearm. Such thermal expansion can result in sliding/clearance fits becoming interference fits. That is, a sliding fit can undesirably become a non-sliding fit, i.e. can freeze or jam. When the gas tube heats up excessively, the weakened and expanded gas tube can bend and be damaged because it is not free to slide, thus causing the firearm to become inoperative. It is desirable to provide methods and systems for mitigating overheating in gas operated firearms.

Forward and rearward bouncing of the bolt carrier can cause the cyclic rate of a firearm to increase substantially. This increase in the cyclic rate can reduce the reliability of the firearm and can increased wear on the firearm. It is desirable to provide methods and systems for mitigating both forward and rearward bouncing of the bolt carrier.

The gas port of a contemporary M16/M4 firearm is subject to erosion caused by bullet scrubbing and propellant bombardment. Such erosion results in enlargement of the gas port and consequently an undesirable increase in the cyclic rate of the firearm over time. M4 carbines, which have the gas port located at a rear band of the front sight, are particularly susceptible to such erosion. This undesirable increase in the cyclic rate can eventually result in malfunction and damage to the firearm. It is desirable to provide for the placement of the gas port and metering of gas in a manner that does not result in an increased cyclic rate over time.

Gas operated firearms, such as those of the M16/M4 family of firearms, have bolt and barrel locking lugs that secure the bolt to the barrel during firing. Failure of the locking lugs can result in the firearm being inoperable. It is desirable to provide more robust locking lugs for such firearms, so as to mitigate the undesirable occurrence of failure.

The cam of a bolt carrier of such firearms cooperates with the cam pin of the bolt to lock and unlock the locking lugs. In instances where pressure of the gas system has increased and the cyclic rate has consequently also increased, such as due to erosion of the gas port, the cam can cooperate with the cam pin to attempt to unlock the locking lugs too early in the firing cycle. In this instance, the gas pressure in the chamber can be too high to allow the locking lugs to rotate fully. When this happens, one or more of the locking lugs can break. Again, this can result in the firearm being inoperable, thereby potentially resulting in loss of life in situations such as during police use and battlefield operations. It is desirable to assure that the gas pressure in the chamber is sufficiently low to allow the locking lugs to rotate fully when the bolt is being unlocked.

These reliability shortcomings of such contemporary firearms can result in the failure thereof. The failure of the firearm, particularly during critical police use and battlefield operations, can result in loss of life. Therefore, it is desirable to provide firearms that do not suffer from these reliability shortcomings.

BRIEF SUMMARY

In accordance with embodiments further described herein, methods and systems are provided for enhancing the reliability of firearms, such as firearms in the M16/M4 family of firearms. For example, an embodiment can comprise a firearm having a bolt with a plurality of locking lugs that are configured to have a shear area that is at least approximately 1.3 times that of a standard M16/M4. A piston can be formed on the bolt and can have a plurality of rings that are configured to cooperate with the piston to mitigate gas leakage past the piston. Each of the rings can have a key formed thereon and a gap formed therein such that the gap of one ring is configured to receive at least a portion of the key of another ring. A bolt carrier can have the bolt movably attached thereto. The bolt carrier can have a double cut cam. The double cut cam can have a starting point in an unlocked position of the bolt that is substantially the same as the standard M16 cam and can have an unlocking cam surface that has sufficient dwell to increase to delay a start of unlocking when the bolt carrier is used in an M4 carbine. Thus, the dwell can be increased with respect to an M4 carbine lacking a double cut cam. A weight can be movably disposed within the bolt carrier. The weight can be configured to inhibit rearward and forward bouncing of the bolt carrier. A long stroke carrier key can be attached to the bolt carrier and can be configured to facilitate a stroke of the bolt carrier that is approximately 0.360 inch longer than that of a standard M16/M4. A gas tube can be configured to provide gas from a barrel of the firearm to the piston via the carrier key. The gas tube can have a heat radiator formed on at least a portion of the gas tube. A gas metering plug can have a gas metering hole configured to meter gas from the barrel of the firearm to the bolt carrier of the firearm. The gas metering hole can be located away from a gas port of the firearm. A front sight block can have a rear band and a front band for attaching the front sight block to the barrel and can have a gas passage formed in the front band for facilitating gas flow from the barrel to a gas tube of the firearm.

According to an embodiment, the bolt carrier assembly may have a bolt carrier with an unlocking cam surface that has sufficient dwell increase to delay the start of unlocking when the bolt carrier is used in an M4 carbine. The lengthened cam is such that when the bolt relative to the bolt carrier is in its most forward unlocked position, the bolt's extractor pin may be fully exposed and not retained by the bolt carrier, thus, the extractor pin is stepped so that, in combination with the bolt's extractor spring and extractor, acts as a detent to retain the extractor pin.

According to an embodiment, a bolt group can have a bolt having a plurality of locking lugs. The locking lugs can be configured to have a shear area that is at least approximately 1.3 times that of a standard M16/M4. A piston can be formed on the bolt and can have a plurality of rings configured to cooperate with the piston to mitigate gas leakage past the piston. Each of the rings can have a key formed thereon and a gap formed therein such that the gap of one ring is configured to receive at least a portion of the key of another ring. A bolt carrier can have the bolt movably attached thereto. The bolt carrier can have a double cut cam. The double cut cam having a starting point in an unlocked position of the bolt that is substantially the same as the standard M16 cam and can have an unlocking cam surface that has sufficient dwell increase to delay a start of unlocking when the bolt carrier is used in an M4 carbine. Thus, the dwell can be increased with respect to an M4 carbine lacking a double cut cam. A weight can be movably disposed within the bolt carrier. The weight can be configured to inhibit rearward and forward bouncing of the bolt carrier. A carrier key can be attached to the bolt carrier and can be configured to facilitate a stroke of the bolt carrier that is approximately 0.360 inch longer than that of a standard M16/M4.

According to an embodiment, a bolt carrier assembly for use in an M4 carbine having a bolt with extended locking lugs and the lengthened bolt is such that when the bolt relative to the bolt carrier is in its most forward unlocked position the bolt's extractor pin is fully exposed and not retained by the bolt carrier, the extractor pin is stepped so that in combination with the bolt's extractor spring and extractor acts as a detent to retain the extractor pin.

According to an embodiment, a barrel extension for use in an M4 carbine with extended locking lugs which require a lengthened bolt such that when the bolt relative to the bolt carrier is in its most forward unlocked position the bolt's extractor pin is fully exposed and not retained by the bolt carrier, the extractor pin is stepped so that in combination with the bolt's extractor spring and extractor acts as a detent to retain the extractor pin.

According to an embodiment, a barrel extension for use in an M4 carbine is provided with extended locking lugs and longer less steep feed ramps than the standard M4 locking lugs and feed ramps to reduce bullet bounce off the feed ramp.

According to an embodiment, a bolt carrier may have a shortened key for increased travel to maintain the M4's original bolt catch over travel.

According to an embodiment, a ring can be configured to be received at least partially within a groove of the piston. A key can be formed upon the ring and a gap can be formed in the ring. The gap of one ring can be configured to receive at least a portion of the key of another ring. Thus, the rings can be interlocked such they cannot rotate to a position where the gaps line up in a manner that allows hot gasses to flow through the gaps.

According to an embodiment, a gas tube can be configured to provide gas from a barrel of a firearm to a piston of the firearm. A heat radiator can be formed on at least a portion of the gas tube, according to an embodiment. The heat radiator can inhibit overheating of the gas tube. The gas tube can be configured such that thermal expansion does not cause the gas tube to bind or be damaged by cycling of the firearm.

According to an embodiment, a tube may provide gas from a barrel of a firearm to a piston of the firearm. A heat radiator may extend from at least a portion of the tube and may have threads.

According to an embodiment, the threads may be formed on a portion of the tube away from ends of the tube.

According to an embodiment, the tube is configured for use on a firearm having a piston formed on a bolt of the firearm, such as a member of an M16/M4 family of firearms.

According to an embodiment, the gas tube may receive gas from a barrel of the firearm via a front sight of the firearm and may provide the gas to a bolt carrier of the firearm via a bolt carrier key. The tube may have an outside interfacing diameter to the bolt carrier key of less than 0.1792 inches. The tube may have a length from a front sight mounting hole thereof to a rear end thereof of less than 9.57 inches for an M4 type of firearm or the tube may have a length from a front sight mounting hole thereof to a rear end thereof of less than 14.95 inches for an M16 type of firearm.

According to an embodiment, a method may include cutting a tube; forming a radiator on the tube; and installing the tube on a firearm such that the tube is configured to provide gas from a barrel of the firearm to a piston thereof.

According to an embodiment, the method may include the heat radiator having threads.

According to an embodiment, a tube may receive gas from a barrel of a firearm that is a member of an M16/M4 family of firearms via a front sight of the firearm and may provide the gas to a bolt carrier of the firearm via a bolt carrier key. The tube may have an outside interfacing diameter to the bolt carrier key of less than 0.1792 inches.

According to an embodiment, a tube may receive gas from a barrel of a firearm that is a member of an M4 family of firearms via a front sight of the firearm and may provide the gas to a bolt carrier of the firearm via a bolt carrier key. The tube may have a length from a front sight mounting hole thereof to a rear end thereof of less than 9.57 inches.

According to an embodiment, a tube may receive gas from a barrel of a firearm that is a member of an M16 family of firearms via a front sight of the firearm and may provide the gas to a bolt carrier of the firearm via a bolt carrier key. The tube may have a length from a front sight mounting hole thereof to a rear end thereof of less than 14.95 inches.

According to an embodiment, a device can comprise a gas metering plug having a gas metering hole that is configured to meter gas from a barrel of a firearm to a bolt carrier of the firearm. The gas metering hole can be located away from a gas port of the firearm, so as not to be subject to erosion caused by bullet scrubbing and propellant bombardment.

According to an embodiment, undesirable forward and rearward bouncing of a bolt carrier of a gas operated firearm can be inhibited. For example, a device can have a bolt carrier and an anti-bounce weight movably disposed within the bolt carrier. The weight can be configured to inhibit both rearward and forward bouncing of the bolt carrier.

According to an embodiment, a bolt carrier can have a double cut cam formed therein. The double cut cam can have a starting point in an unlocked position of the bolt that is substantially the same as the standard M16 cam. The double cut cam can have an unlocking cam surface that has sufficient dwell increase to delay a start of unlocking when the bolt carrier is used in an M4 carbine.

According to an embodiment, a bolt and a barrel extension for an M16/M4 firearm can have a plurality of locking lugs. The locking lugs can be configured to have a shear area that is at least approximately 1.3 times that of a standard M16/M4. A carrier key can be configured to facilitate a stroke of the bolt carrier that is approximately 0.360 inch longer than that of a standard M16/M4. A buffer can be configured to limit travel of the bolt carrier. The buffer can be approximately 0.360 inch shorter than that of the standard M16/M4.

According to an embodiment, the gas port of a firearm can be moved forward along the barrel so as to delay the time at which gas acts upon the bolt of the firearm after a cartridge is fired and so as to reduce the pressure of the gas acting upon the bolt. In this manner, the cyclic rate of the firearm can be reduced and the reliability of the firearm can be enhanced.

These features can cooperate to provide a safer, more reliable firearm. For example, the long or extended locking lugs, gas piston rings, and the gas tube can cooperate to make the gas system of the firearm more robust. As a further example, the anti-bounce weight, the gas metering plug, the gas passage in the forward sight band and double cut cam can cooperate to reduce the cyclic rate and to mitigate undesirable wear on the firearm.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 8B-E are various views of a keyed piston ring, according to an embodiment.

FIG. 14 is a side view of the bolt carrier of FIG. 13A, according to an embodiment.

FIG. 15 is an enlarged side view of the anti-bounce assembly of FIG. 13A showing an anti-bounce weight in a zero or non-impact position, according to an embodiment.

FIG. 16 is an enlarged side view of the anti-bounce assembly of FIG. 13A showing the anti-bounce weight in a rearward impact position, according to an embodiment.

FIG. 17 is an enlarged side view of the anti-bounce assembly of FIG. 13A showing the anti-bounce weight in a forward impact position, according to an embodiment.

FIG. 19 is a top exploded view of plungers, springs, and the anti-bounce weight of FIG. 18, according to an embodiment.

FIG. 20 is a perspective exploded view of the plungers, the springs, and the anti-bounce weight of FIG. 18, according to an embodiment.

FIG. 21 is a top assemble view of the plungers, the springs, and the anti-bounce weight of FIG. 18, according to an embodiment.

FIG. 22 is a perspective assembled view of the plungers, the springs, and the anti-bounce weight of FIG. 18, according to an embodiment.

FIGS. 29A-29C are various views of the anti-bounce weight, according to an embodiment.

FIGS. 31A-31C are various views of the anvil, according to an embodiment.

FIGS. 32A-32F are various views showing a bolt carrier modification, according to an embodiment.

FIG. 34A-34P are various views showing a carrier key, according to an embodiment.

FIG. 37B is an enlarged side view showing the barrel extensions of both the standard M16/M4 5.56 mm firearm (upper barrel extension) and the barrel extension of the improved M16/M4 5.56 mm and 6.8 mm firearm (lower barrel extension), according to an embodiment.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
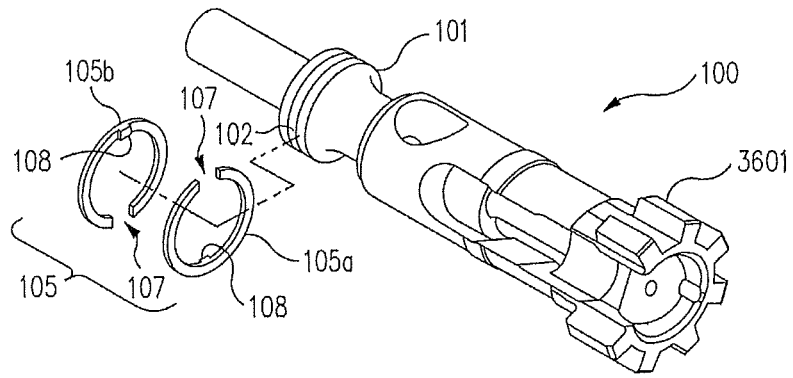
FIG. 1 is a perspective view of a bolt, such as for an M16/M4, showing keyed piston rings exploded therefrom, according to an embodiment.

Methods and systems are provided for enhancing the reliability of firearms, such as firearms in the M16/M4 family of firearms. For example, according to an embodiment a firearm can have a bolt having a plurality of extended locking lugs that are configured to have a shear area that is at least approximately 1.3 times that of a standard M16/M4.

A piston can be formed on the bolt and can have a plurality of rings that are configured to cooperate with the piston to mitigate gas leakage past the piston. Each of the rings can have a key formed thereon and a gap formed therein such that the gap of one ring is configured to receive at least a portion of the key of another ring.

A bolt carrier can have the bolt movably attached thereto. The bolt carrier can have a double cut cam. The double cut cam can have a starting point in an unlocked position of the bolt that is substantially the same as the standard M16 cam and can have an unlocking cam surface that has sufficient dwell increase to delay a start of unlocking when the bolt carrier is used in an M4 carbine (as compared to the delay provided by the standard cam surface). This delay can be as little as 0.00016 seconds, for example. This delay is based on the time it takes for a 62 grain M855 bullet to travel 5.5 inches beyond the gas port in an M16 rifle barrel at an average velocity of 3056 feet per second. During this time the chamber pressure significantly drops in the rifle, but not in the carbine which has the gas port 5½ inches closer to the chamber that does the rifle, thus causing the gas to start to act on the gas system 0.00016 seconds sooner in the carbine than in the rifle. The dwell is increased so as to regain the 0.00016 second delay and the beneficial pressure drop that is present in the rifle and not in the standard carbine. The additional dwell needed in the cam is 0.036 inches if the carrier is at full velocity of 20 feet per second, which is 153 times slower than the bullet since 5.5 inches divided by 153=0.036 inches. Thus, the 0.062 inch dwell increase is more than significant.

The 0.062 additional dwell has two advantages. It provides the time needed to reduce chamber pressure that tends to bind the locking lugs at the start of unlocking and it allows 0.062 additional bolt carrier bounce before safely retracting the firing pin thus reducing the chance of a misfire from occasional carrier bounce.

A weight can be movably disposed within the bolt carrier. The weight can be configured to inhibit rearward and forward bouncing of the bolt carrier. A carrier key can be attached to the bolt carrier and can be configured to facilitate a stroke of the bolt carrier that is approximately 0.360 inch longer than that of a standard M16/M4. A gas tube can be configured to provide gas from a barrel of the firearm to the piston via the carrier key. The gas tube can have a heat radiator formed on at least a portion of the gas tube.

A gas metering plug can have a gas metering hole configured to meter gas from the barrel of the firearm to the bolt carrier of the firearm. The gas metering hole can be located away from a gas port of the firearm. A front sight block can have a rear band and a front band for attaching the front sight block to the barrel and can have a gas passage formed in the front band for facilitating gas flow from the barrel to a gas tube of the firearm. These, as well as other features, and their advantages are discussed in detail herein.

The cooperation of these features can provide a safer, more reliable firearm. For example, the long or extended locking lugs, gas piston rings, and the gas tube can cooperate to make the gas system of the firearm more robust. As a further example, the anti-bounce weight, gas metering plug, gas passage in the forward sight band and the double cut cam can cooperate to reduce the cyclic rate and to better facilitate the use of the extended locking lugs.

Methods and systems for inhibiting undesirable gas leakage and/or heat build up in a gas operated firearm are disclosed. According to an embodiment, a pair of rings can be configured to interlock with respect to one another such that the rings rotate within a groove of a piston of a gas system of a firearm. Since the rings rotate in unison, they do not align in a manner that readily facilitates undesirably increased gas flow past the piston. Such rings can generally be used with both M16/M4 and HK416 types of firearms.

According to an embodiment, a gas tube that better tolerates the heat associated with sustained fully automatic fire of a firearm is disclosed. The gas tube is less prone to overheating and better accommodates thermal expansion. Thus, the firearm cycles and fires more uniformly and is more reliable. Such a gas tube can generally be used with M16/M4 types of firearms and generally cannot be used with HK416 types of firearms since the HK416 types of firearms use a substantially different gas system.

According to an embodiment, methods and systems are provided for inhibiting undesirable forward and rearward bouncing of a bolt carrier of a gas operated firearm, such as a fully automatic gas operated firearm. An anti-bounce assembly, including an anti-bounce weight, can mitigate undesirable speeding up of the cyclic rate of a firearm due to gas port erosion and can thus reduce wear and increase the reliability of the firearm.

According to an embodiment, a gas metering port can prevent the cyclic rate of the firearm from increasing undesirably as the gas port erodes. The gas port can be moved forward, from the rear sight band to the forward sight band, to reduce pressure in the gas system and to reduce the cyclic rate of the firearm.

According to an embodiment, stronger extended locking lugs on the bolt and on the barrel extension can be provided to prevent breakage thereof. The extended locking lugs are particularly useful when the firearm is being operated with cartridges providing higher chamber pressures. A double cut cam can provide increased dwell such that the pressure in the chamber has time to decrease to a point where the locking lugs (whether extended locking lugs or standard locking lugs) can be more reliably and safely disengaged.

Examples of embodiments of keyed gas piston rings are discussed in detail below. Examples that are suitable for use with the M16/M4 rifle are discussed with reference to FIGS. 1-3 and 7. Examples that are suitable for use with the HK416 rifle are discussed with reference to FIGS. 4-6 and 8. The gas piston of the M16 and the M4 is an integrated part of the bolt that is slidably disposed within a gas cylinder formed in the bolt carrier of the firearm. The gas cylinder, i.e. the bolt carrier, moves with respect to the gas piston.

FIG. 1 is a perspective view of a bolt 100 of a gas operated firearm 700 (FIG. 7), according to an embodiment. The bolt 100 can be a bolt of an M16 rifle or an M4 carbine, for example. The bolt 100 can have a piston 101 formed thereon. A groove 102 can be formed circumferentially around the piston 101. A pair of rings 105 are shown exploded from the bolt 100. The rings 105 can comprise a first ring 105a and a second ring 105b. The rings 105 can be configured to be received at least partially within the groove 102 of the piston 101 of the gas operated firearm 700.

A key 108 can be formed upon each of the rings 105. The key 108 can extend generally perpendicularly with respect to a plane of each of the rings 105. The key 108 can have a generally rectangular cross-section when taken in either of two generally orthogonal planes. That is the walls of the ring can generally define a rectangle.

A gap 107 can be formed in each of the rings 105. The gap 107 of each one of the rings 105 can be configured to receive at least a portion of the key 108 of another one of the rings 105. The gap 107 can have a generally rectangular cross-section when taken in either of two generally orthogonal planes. Thus, a pair of the rings 105 can be configured to interlock with one another such that the two rings 105 can rotate, but can only rotate substantially in unison with respect to one another.

In an embodiment, the key 108 and the gap 107 of each of the rings 105 can be formed such that a pair of the rings 105 are nestable with the key 108 of each one of the rings 105 being disposed within the gap 107 of each other one of the rings 105 while the rings 105 are substantially flush with respect to one another. The nesting of the rings 105 interlocks the rings 105 such that the rings 105 rotate in unison.

In an embodiment, the gaps 107 of the two rings 105 can be diametrically opposed with respect to one another when the rings 105 are interlocked. Since the two rings 105 rotate substantially in unison, the gaps 107 do not align in a fashion that facilitates increased gas flow past the rings 105.

In an embodiment, the rings 105 can be formed of stainless steel. For example, the rings 105 can be formed of 17-4 stainless steel. Various other materials, including refractory materials such as ceramics, are contemplated.

In an embodiment, the groove 102 can be substantially rectangular in cross-section. In an embodiment, the rings 105 can also be substantially rectangular in cross-section and thus can be generally complementary in size and shape with respect to the groove 102.

Figure 2:
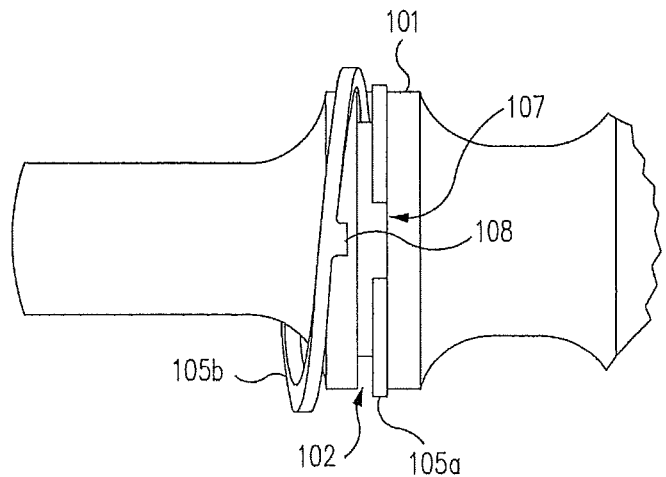
FIG. 2 is an enlarged side view of a piston of FIG. 1 having one keyed piston ring installed thereon and one keyed piston ring partially installed thereon, according to an embodiment.

FIG. 2 is an enlarged side view of the piston 101 having the first ring 105*a* completely installed thereon and having the second ring 105*b* partially installed thereon, according to an embodiment. The rings 105 can be temporarily bent or spring deformed in order to slide over the piston 101 and into the groove 102. The key 108 of the second ring 105*b* is positioned to be received at least partially within the gap 107 of the first ring 105*a*.

Figure 3:
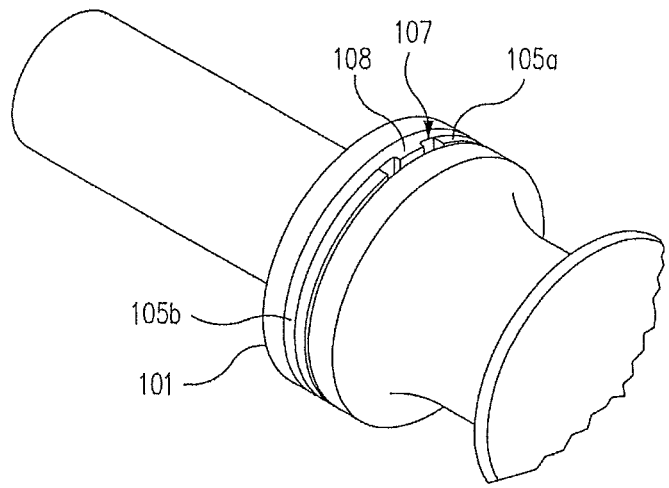
FIG. 3 is an enlarged perspective view of the piston of FIG. 1 having two keyed piston rings installed thereon, according to an embodiment.

FIG. 3 is an enlarged perspective view of the piston 101 having two rings 105 installed thereon, according to an embodiment. The two rings 105 are seated within the groove 102. The key 108 of the second ring 105*b* is disposed at least partially within the gap 107 of the first ring 105*a* and the key 108 of the first ring 105*a* is disposed at least partially within the gap 107 of the second ring 105*b*.

Figure 4:
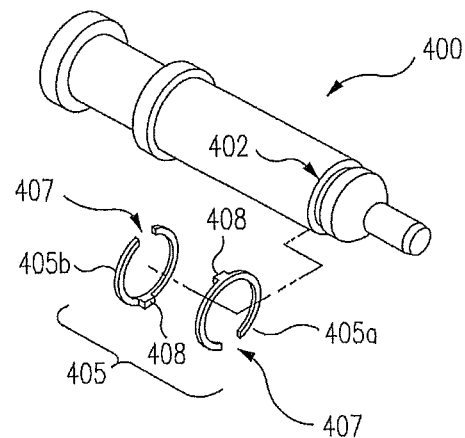
FIG. 4 is a perspective view of a piston, such as for a HK416, showing keyed piston rings exploded therefrom, according to an embodiment.
Figure 5:
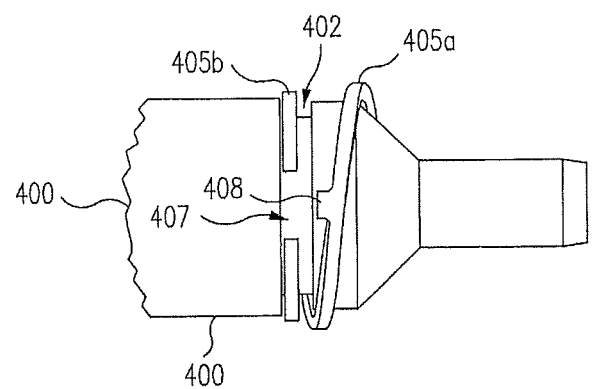
FIG. 5 is an enlarged side view of the piston of FIG. 4 having one keyed piston ring installed thereon and one keyed piston ring partially installed thereon, according to an embodiment.
Figure 6:
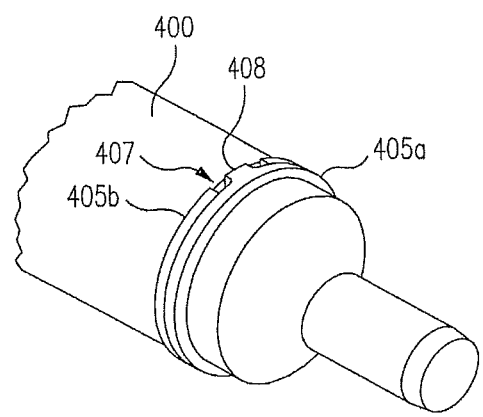
FIG. 6 is an enlarged perspective view of the piston of FIG. 4 having two keyed piston rings installed thereon, according to an embodiment.

The piston of an HK416 is disposed in a gas cylinder of a firearm 800 (see FIG. 8A) rather than in a cylinder of the bolt carrier as discussed herein with respect to the M16/M4. FIGS. 4-6 show a system for inhibiting undesirable gas flow around the piston of an HK416 or the like and are discussed in detail below.

FIG. 4 is a perspective view of the piston 400 of a gas operated firearm 800 (FIG. 8A), according to an embodiment. The piston 400 can be a piston of an HK416 rifle, for example. A groove 402 can be formed circumferentially around the piston 400. A pair of rings 405 are shown exploded from the piston 400. The rings 405 can comprise a first ring 405*a* and a second ring 405*b*. The rings 405 can be configured to be received at least partially within the groove 402.

A key 408 can be formed upon each of the rings 405. The key 408 can extend generally perpendicularly with respect to a plane of the rings 405. The key 408 can have a generally rectangular cross-section when taken in either of two generally orthogonal planes.

A gap 407 can be formed in each of the rings 405. The gap 407 of each one of the rings 405 can be configured to receive at least a portion of the key 408 of another one of the rings 405. The gap 407 can have a generally rectangular cross-section when taken in either of two generally orthogonal planes. Thus, a pair of the rings 405 can be configured to interlock with one another such that the two rings 405 can rotate, but can only rotate substantially in unison with respect to one another.

In an embodiment, the key 408 and the gap 407 of each ring 405 can be formed such that a pair of the rings 405 are nestable with the key 408 of each of the rings 405 being disposed at least partially within the gap 407 of each other of the rings 405 while the rings 405 are substantially flush with respect to one another. The nesting of the rings 405 interlocks the rings 405 such that the rings 405 rotate in unison.

In an embodiment, the gaps 407 of the two rings 405 can be diametrically opposed with respect to one another when the rings 405 are interlocked. Since the two rings 405 rotate substantially in unison, the gaps 407 do not align in a fashion that facilitates increased gas flow past the rings 405.

In an embodiment, the rings 405 can be formed of stainless steel. For example, the rings 405 can be formed of 17-4 stainless steel. Various other materials, including refractory materials such as ceramics, are contemplated.

In an embodiment, the groove 402 can be substantially rectangular in cross-section. In an embodiment, the rings 405 can also be substantially rectangular in cross-section and thus can be generally complementary in size and shape with respect to the groove 402.

FIG. 5 is an enlarged side view of the piston 400 having the first ring 405*a* partially installed thereon and having the second ring 405*b* completely installed thereon, according to an embodiment. The rings 405 can be temporarily bent or spring deformed in order to slide over the piston 400 and into the groove 402. The key 408 of the second ring 405*b* is positioned to be received at least partially within the gap 407 of the first ring 405*a*.

FIG. 6 is an enlarged perspective view of the piston 400 having two rings 405 installed thereon, according to an embodiment. The two rings 405 are seated within the groove 402. The key 408 of the second ring 405*b* is disposed at least partially within the gap 407 of the first ring 405*a*.

According to various embodiments, a device can comprise a first ring 105*a*, 405*a* configured to be at least partially received within a groove 102, 402 of a piston 101, 400 of a gas operated firearm 700, 800. A second ring 105*b*, 405*b* can be configured to be at least partially received within the groove 102, 402. The first ring 105*a*, 405*a* and second ring 105*b*, 405*b* can be configured to interlock with one another such that the first ring 105*a*, 405*a* and second ring 105*b*, 405*b* rotate substantially in unison within the groove 102, 402. Various means for effecting such interlocking are contemplated. The use of a key 108, 408 and a gap 107, 407 as discussed herein are by way of example only, and not by way of limitation.

Any desired number of rings 105, 405 and any desired number of grooves 102, 402 in the piston 101, 400 may be used. For example, two grooves 102, 402, each containing two rings 105, 405 or three rings 105, 405 apiece, may be used. Thus, various embodiments may comprise 2, 3, 4, 5, 6, or more rings 105, 405.

In various embodiments, the gaps 107, 407 can be partial gaps that do not extend entirely though the rings 105, 405. For example, the gaps 107, 407 can be sufficiently sized to receive at least a portion of the keys 108, 408 while not forming a separation in the rings 105, 405. Thus, the gaps 107, 407 may be depressions, indentations, or cutouts, for example. Any desired number and configuration of the gaps 107, 407 and the keys 108, 408 can be used. The gaps 107, 407 and the keys 108, 408 can be generally complementary with respect to one another. The gaps 107, 407 and the keys 108, 408 can be non-complementary with respect to one another.

The piston rings 105, 405 need not be received within a groove 102, 402 of the piston 101, 400. Rather, the piston rings 105, 405 can be placed upon the piston 101, 400 and can be held in position by any means or structure desired. The piston rings 105, 405 can cooperate with the piston 101, 400 to mitigate gas leakage past the piston 101, 400.

According to an embodiment, the piston 400 can be configured to fit within a gas cylinder of a firearm 800 that does not have the piston 400 formed upon a bolt of the firearm 800, for example. The piston 400 can be configured to fit within a gas cylinder of a HK416 type of firearm 800.

Alternatively, the piston 101 can be formed upon a bolt 100 of the firearm 700. The gas cylinder can be formed in a bolt carrier of the firearm 700. The piston 101, 400 can fit within a gas cylinder of an M16/M4 type of firearm, for example.

Figure 7:
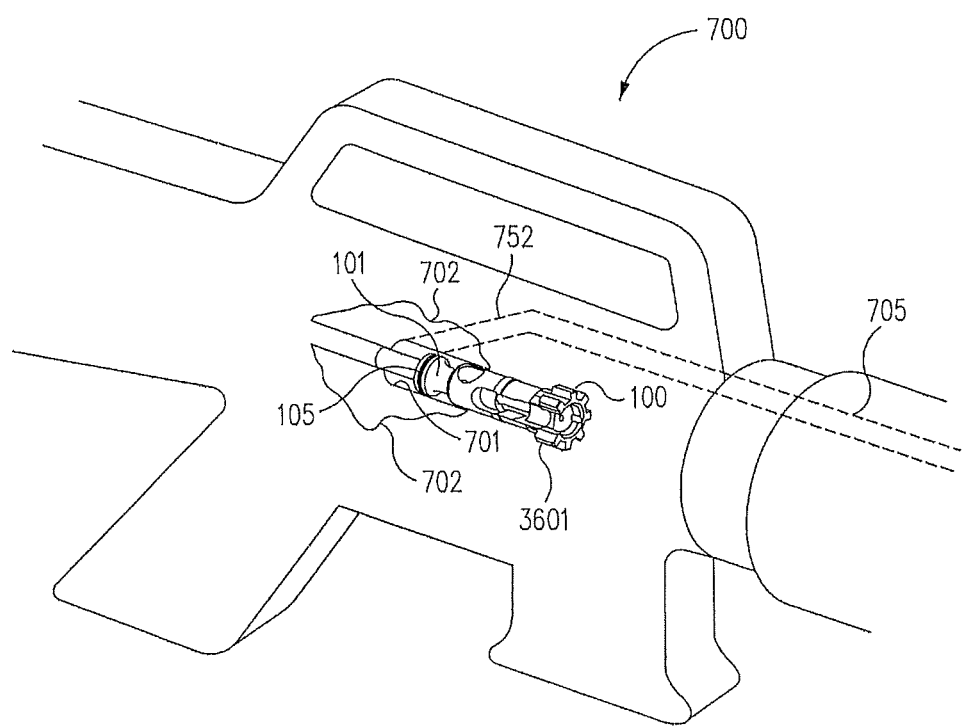
FIG. 7 is a perspective view of a firearm, such as an M16/M4, having the bolt of FIG. 1, according to an embodiment.

FIG. 7 is a perspective view of the firearm 700 having the piston 101 formed on the bolt 100, according to an embodiment. The firearm 700 can be an M16 or an M4, for example. The firearm 700 can have one or more pairs of rings 105 disposed in one or more grooves 102 about the piston 101 thereof to mitigate gas leakage past the piston 101, as discussed herein.

Figure 8A:
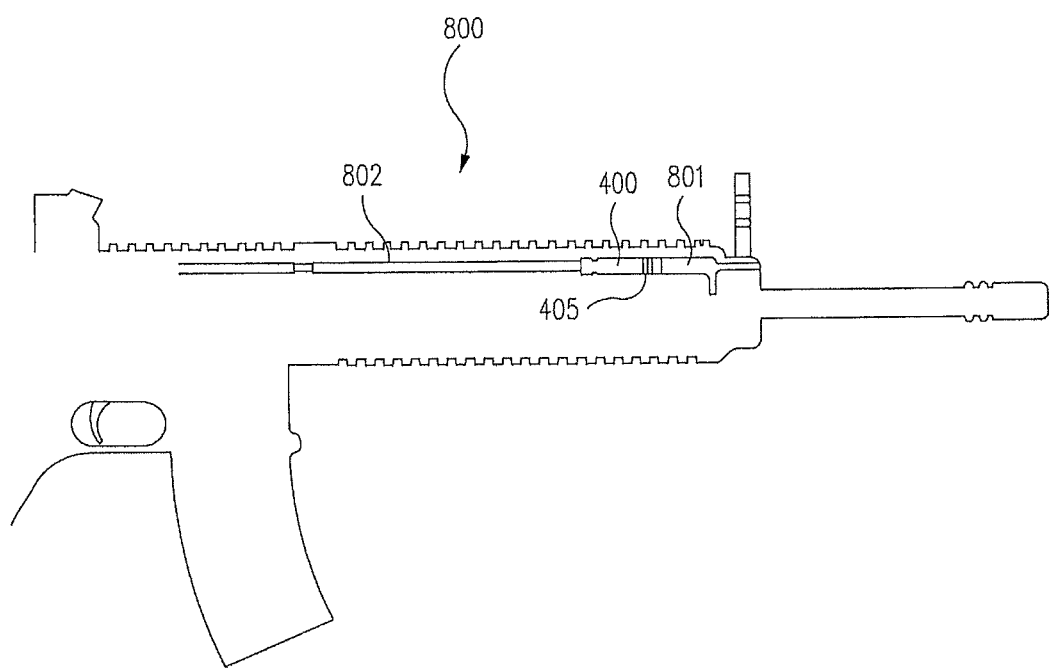
FIG. 8A is a perspective view of a firearm, such as a HK416, having the piston of FIG. 4, according to an embodiment.

FIG. 8A is a perspective view of a firearm 800 having the piston 400, according to an embodiment. The firearm 800 can be an HK416, for example. The firearm 800 can have one or more pairs of rings 405 disposed about the piston 400 thereof to mitigate gas leakage past the piston 400, as discussed herein.

In operation, a shooter fires the firearm 700, 800 and hot, high pressure gas is provided by the cartridge. As shown in FIG. 7 for an M16 or M4 type of rifle, the gas travels through a front sight (FIG. 40) to the gas tube 705, then through the gas tube 705 and a carrier key 752 to the bolt carrier 702, where the gas moves the bolt carrier 702, and consequently the bolt 100, so as to effect extraction of the spent cartridge and chambering of a new cartridge. The bolt 100 is disposed within a gas cylinder 701 formed in the bolt carrier 702. As shown in FIG. 8A for an HK416 type of rifle, the gas moves the piston 400 within the gas cylinder 801 so as to move a tappet or operating rod 802 to effect extraction of a spent cartridge and chambering of a new cartridge.

In either instance, the use of rings 105, 405 having gaps 107, 407 and keys 108, 408 that facilitate nesting or interlocking of the rings 105, 405 substantially mitigates undesirable gas flow past the piston 101, 400. The nested or interlocked rings 105, 405 provide increased resistance to such gas flow by preventing the gaps 107, 407 from aligning with respect to one another. For example, gas can be substantially forced to follow a longer and more contorted path under the rings 105, 405 from which the gas reemerges to flow past the piston 101, 400. This longer and more contorted path around four corners substantially inhibits such gas flow and consequently inhibits gas leakage past the piston 101, 400.

Firearms 700 that have the piston 101 formed on the bolt 100 thereof can be referred to herein as M16/M4's, or M16/M4 types of firearms, or members of an M16/M4 family of firearms. Firearms 800 that do not have the piston 400 formed on a bolt thereof can be referred to herein as HK416's, HK416 types of firearms, or members of an HK416 family of firearms.

Thus, according to one or more embodiments, two rings 105, 405 can be nested such that undesirable gas leakage past the piston 101, 400 is substantially inhibited. In this manner, damage to the rings can be substantially mitigated and fouling of components of the firearm 700, 800, such as within the receiver thereof, can be substantially mitigated. By inhibiting gas leakage past the piston 101, 400 reliability of the firearm is substantially enhanced and operation of the firearm is made more uniform.

Anticipating that 60-shot and 100-shot magazines may soon replace the current standard 30-shot M16/M4 magazines, the consequent heat problems associated with such increased capacity (and the resulting extended rapid firing of the firearm) also need to be addressed. The M4 gas tube 705 can soften and bend (and thus become inoperable) in as few as four 100-shot bursts. The M16 gas piston rings can burn out in as few as two 100-shot bursts. To mitigate such heat problems, the keyed piston rings 104, 405 and a heat dissipating gas tube 705 may be used, as discussed herein.

Contemporary piston rings used in firearms such as the M16/M4 have a gap of approximately 0.05 inches or less. If the gap is larger, more of the ring on the pressure side may be unsupported at the gap with the mating ring. This unsupported area, if much larger than the 0.05 inches, combined with the high pressure of the gas systems will result in failure of the ring at the unsupported area. The gap, by necessity, for a keyed ring of the type described herein, to accept a key from a mating ring, is wider (e.g., 0.09 inches) than for conventional rings used in firearms. If the key of the ring on the pressure side had the exact height so that it supported the ring in the gap area to insure that the ring does not flex under the high pressure, i.e. the majority of the ring is flush against the mating ring and in the gap the key exactly supports the ring so there is no flexing of the ring in the direction of the pressure in or next to the gap, then the ring could survive, but this arrangement may not allow sufficient manufacturing tolerance.

In an embodiment of the present disclosure, keyed rings 805 are provided in which pairs of rings are provided as a matched set and lapped together so that each key 804 has a height (h) that is substantially the same as the thickness 810 of slot 806 of its mating ring as shown in FIGS. 8B, 8C, 8D, and 8E. Key 804 may have a height (h) that is equal to ring thickness 810 (e.g., height (h) may be approximately 0.000 inches to 0.006 inches taller than ring thickness 810). In an embodiment of the present disclosure, key 804 height (h) and width (w) may be, for example, approximately 0.027 inches and approximately 0.024 inches, respectively. The length (l) of key 804 may be relatively equivalent to width 814 of ring 805. In an embodiment, adjoining surfaces 812 of ring 805 and key 804 may each have a curvature. The keyed rings may cooperate with the piston of a gas operated firearm to mitigate gas leakage past the piston.

In this way, the two rings may be formed and maintained as a matched set 808 and may be lapped such that each key has a height that is substantially the same as the thickness (i.e. thickness 810) of its mating ring. The gap into which the mating key fits may span an angle of less than approximately 30 degrees and may have a width of, for example, 0.09 inches. For example, FIG. 8D shows a set of keyed rings 808 lapped together. The mating key may span an angular distance in a direction around the ring of, for example, less than 10 degrees and may have a width (w) of, for example, approximately 0.024 inches and a height (h) of approximately 0.027 inches.

More particularly, some gas operated firearms 700 use the gas tube 705 to deliver high pressure, very hot, gas to the piston 101 formed upon the bolt 100, as discussed herein. The M16 and the M4 are examples of firearms 700 that deliver gas to the piston 101 via the contemporary gas tube 705. When the firearm 700 is shot repeatedly over an extended length of time, such as during extended fully automatic fire using a plurality of high capacity magazines, the contemporary gas tube 705 can heat up substantially. In such instances, the temperature of the contemporary gas tube 705 can be excessive and thus undesirable damage to the contemporary gas tube 705 can result.

When the gas tube 705 heats up, the length and/or diameter of the gas tube 705 can increase substantially due to thermal expansion. Such thermal expansion can interrupt the firing cycle of the firearm 700 and thus result in the firearm 700 becoming inoperative. As such, it is desirable to provide methods and systems for mitigating heat build up and for accommodating thermal expansion of the gas tubes 705 in gas operated firearms.

Figure 9:
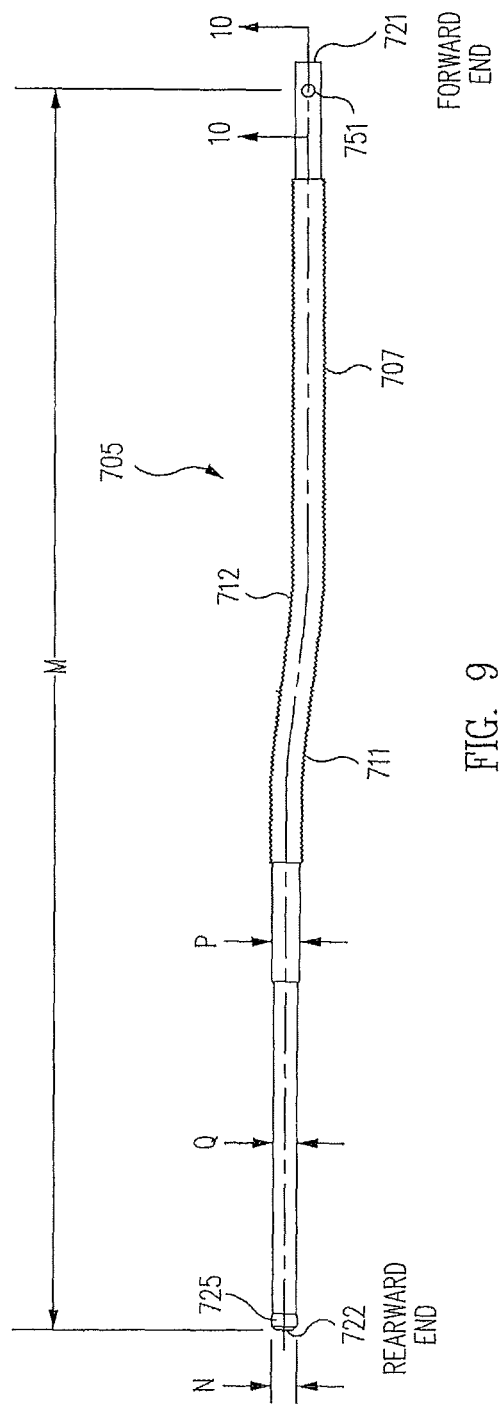
FIG. 9 is side view of a heat dissipating gas tube for a firearm, according to an embodiment.

As shown in FIG. 9, a heat dissipating gas tube 705 can have enhanced heat dissipation such that during extended fully automatic fire the gas tube 705 can remain at a sufficiently low temperature as to not incur substantial damage. The enhanced heat accommodation tends to allow the gas tube 705 to continue to function properly when heated, particularly when heated by sustained fully automatic fire. Examples of embodiments of more heat tolerant and/or heat dissipating gas tubes 705 are discussed in detail below.

FIG. 9 shows the gas tube 705 for an M16 and/or M4 type of firearm 700, according to an embodiment. The gas tube 705 can have a heat dissipater formed thereon. For example, the gas tube 705 can have screw threads 707 formed upon a substantial portion of the length of the gas tube 705.

In an embodiment of the present disclosure, the threads 707 of tube 705 may form an equilateral triangle that doubles the heat radiating surface of the tube regardless of the thread pitch. In addition, the triangular radiating surfaces do not face each other and are thus much more efficient than typical cooling fins which work best with air passing through them, which in this case is not available.

Other examples of heat dissipaters can include fins, fingers, flanges, protrusions, and any other structures that tend to increase the surface area of the gas tube 705 and thus enhance radiation of heat from the gas tube 705. A plurality of spaced apart annular fins can substantially encircle the gas tube 705, for example. A plurality of longitudinal fins can extend along a length of the gas tube 705, for example. A spiral fin can extend around a length of the gas tube 705, for example. The fins can form a V-notch with approximately 60 degrees between opposing walls, for example.

The outer diameter and/or the inner diameter of the gas tube 705 can be increased to enhance the ability of the gas tube 705 to operate under extended fully automatic fire. For example, in one embodiment, the outer diameter of the gas tube 705 or a portion of the gas tube 705 can be increased from the standard 0.180 inch to approximately 0.218 inch.

According to an embodiment, the threads 707 can be a uniform standard thread form, such as ¼-32 UNEF (Unified National Extra Fine) threads, for example. The threads 707 can be helical threads, for example. Various other types of the threads 707 are contemplated. More than one type of the threads 707 can be used. Any desired combination of the threads 707 or types of the threads 707 can be used. In one embodiment, the threads 707 can extend along a portion of the length of the gas tube 705. For example, the threads 707 can extend along a portion of the gas tube 705 that is away from ends, 721 and 722, of the gas tube 705. Thus, the ends 721 and 722 of the gas tube 705 can have no threads 707 formed thereon. In one embodiment, the threads 707 can extend along the entire gas tube 705.

The threads 707 need not be conventional threads. The threads 707 need not be any type of standard threads, e.g., threads made according to an accepted standard. The threads 707 can be formed with a die. The threads 707 can be formed by machining. The threads 707 can be formed by laser cutting. The threads 707 can be formed by any desired method.

The threads 707 can be integral with the gas tube 705. The threads 707 can be formed separately from the gas tube 705 and/or can be attached to the tube 705. The threads 707 can be formed of either the same material as the gas tube 705 or can be formed of a different material with respect to the gas tube 705.

In one embodiment, the threads 707 can be solely for heat dissipation. In one embodiment, the threads 707 can have another use other than heat dissipation. For example, the threads 707 can be used to mount the gas tube 705 to the firearm 700. Thus, at least one end of the gas tube 705 can screw into a threaded opening on the firearm 700.

The gas tube 705 can be configured to attach to a contemporary firearm 700. For example, the gas tube 705 can have a first bend 711 and a second bend 712 formed therein to facilitate mounting of the gas tube 705 to a contemporary firearm 700. The first bend 711 and the second bend 712 can align the forward end and the rearward end of the gas tube 705 with their respective connections to the firearm 700. A bead 725 can be formed on the reward end of the gas tube 705 to facilitate a desired fit into the carrier key 752 (FIGS. 10A and 11) of the firearm 700.

In one embodiment, the gas tube 705 can be formed of stainless steel. For example, the gas tube 705 can be formed of 347 stainless steel. In one embodiment, the gas tube 705 can be formed of a refractory material, such as a ceramic material.

The gas tube 705, and more particularly the threads 707, can have any desired finish. For example, various textures, coatings, and treatments that enhance heat dissipation are contemplated. Different parts of the gas tube 705 can have different textures, coatings, or treatments.

Figure 10A:
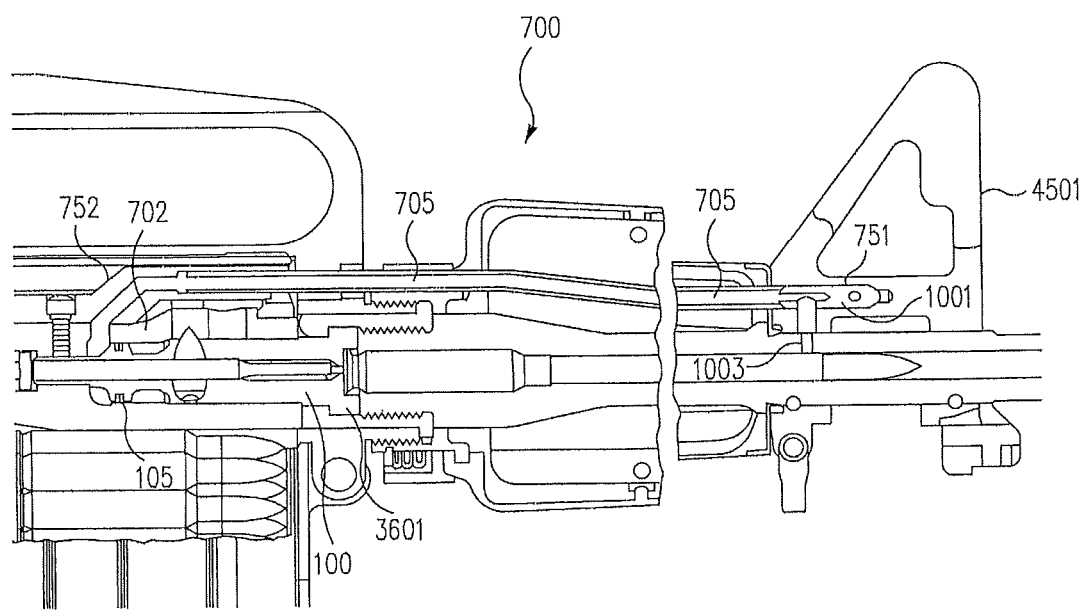
FIGS. 10A-10C are cross-sectional views showing the heat dissipating gas tube and a gas metering plug, according to an embodiment.
Figure 10C:
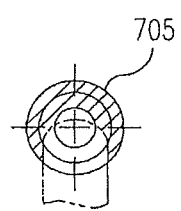
Figure 10B:
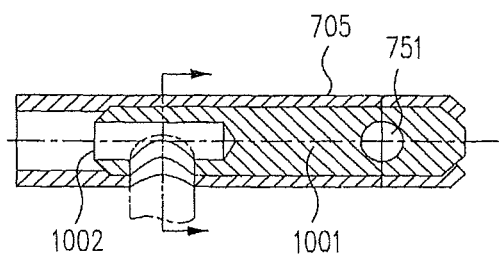

FIGS. 10A-10C are cross-sectional side views of portions of the firearm 700 having the gas tube 705, according to an embodiment. The gas tube 705 and/or the rings 105 (FIGS. 1-3) can be provided as a kit for upgrading contemporary firearms such as the M16 and M4. Thus, the gas tube 705 and the rings 105 can be provided and installed together. Such upgrading can be performed in the field, at an armory, or at a maintenance depot. The gas tube 705 and/or the rings 105 can be changed together. Either the gas tube 705 or the rings 105 can be changed alone (without changing the other). Thus, the gas tube 705 and the rings 105 can be changed or used independently with respect to one another.

In operation, a shooter fires the firearm 700, 800 and hot, high pressure gas is provided by the cartridge. For an M16 or M4 type of rifle, the gas travels through a front sight 4501 to the gas tube 705, then through the gas tube 705 and the bolt carrier key 752 to the bolt carrier 702, where the gas moves the bolt carrier 702, and consequently the bolt 100, so as to effect extraction of the spent cartridge and chambering of a new cartridge. The bolt 100 is disposed within a gas cylinder 701 formed in the bolt carrier 702. During sustained fully automatic fire, the gas tube 705 is exposed to a substantial quantity of hot gases from the fired cartridges. According to an embodiment, the threads 707 provide increase surface area for radiating this heat so that the temperature of the gas tube 705 can be maintained within an acceptable range.

Referring again to FIG. 9, as the gas tube 705 heats ups, it expands both in length and diameter. According to an embodiment, the length, Dimension M, of the gas tube 705 is sufficiently short so as to accommodate thermal expansion of the gas tube 705 in length without causing the firearm 700 to malfunction. Such malfunction can occur when the length, Dimension M, of the gas tube 705 is long enough such that thermal expansion makes it too long and the rear end thereof impacts the carrier key 752 when the firearm cycles. Such impacting of the gas tube 705 can result in the gas tube 705 deforming and failing.

According to an embodiment, the diameter, Dimension N, of the gas tube 705 is sufficiently small so as to accommodate thermal expansion of the gas tube 705 in diameter, particularly at the carrier key 752 interface thereof, without causing the firearm 700 to malfunction. Such malfunction can occur when the diameter, Dimension N, of the gas tube 705 is great enough such that thermal expansion makes it too tight within the carrier key 752 and the rear end thereof binds or freezes instead of sliding within the carrier key 752. Such binding of the gas tube 705 can result it the gas tube 705 deforming and failing. The rearward end of the gas tube 705 can be a bead 725.

Figure 11:
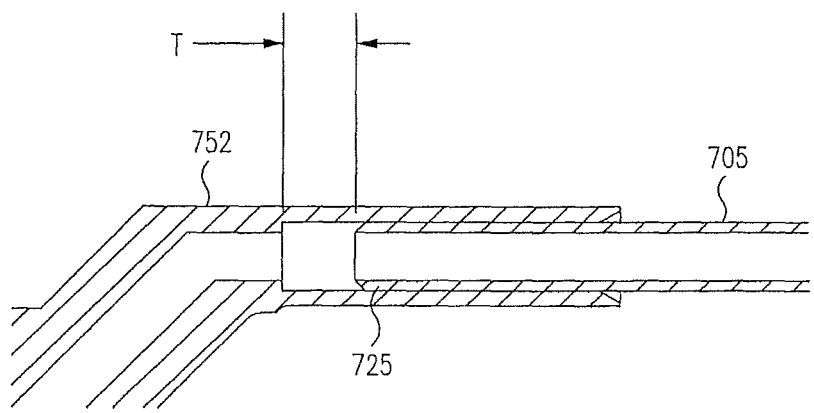
FIG. 11 is a cross-sectional side view of a rear end of the gas tube and a carrier key that receives the rear end of the gas tube, according to an embodiment.

FIG. 11 is a cross-sectional side view of a rearward end of the carrier key 752 of FIG. 10. The rearward end or bead 725 of the gas tube 705 is received within the carrier key 752. When a contemporary gas tube 705 expands in length, such as due to the heat of sustained fully automatic fire, it may bottom out or interfere within the carrier key 752, such that the gas tube 705 bends undesirably due to such expansion. Such bottoming out and/or bending can inhibit uniform cycling or otherwise prevent desired operation of the firearm 700.

According to an embodiment, the gas tube 705 can be shorter in length, Dimension M of FIG. 9, such that additional or desirable clearance, Dimension T of FIG. 11, is provided between the bead 725 and any portions of the carrier key 752 that the bead 725 can bottom out or interfere with during such expansion. Dimension T is partially defined by Dimension M, which is discussed further herein. Dimension M is sized such that Dimension T does not decrease to zero as the firearm 700 heats up. Dimension T can be 0.227-0.289 inch based on the maximum temperature difference between the M16 rifle's gas tube and barrel of 2380° F.×0.00000636 (Thermal Expansion Coefficient for Steel)×15 inch length (M)+0.062 tolerance.

According to an embodiment, the gas tube 705 can be shorter in length, Dimension M and the bead 725 can have a reduced diameter, Dimension N. Thus, undesirable interferences can be mitigated and uniformity of cycling can be enhanced and a more reliable firearm can be provided.

Figure 12:
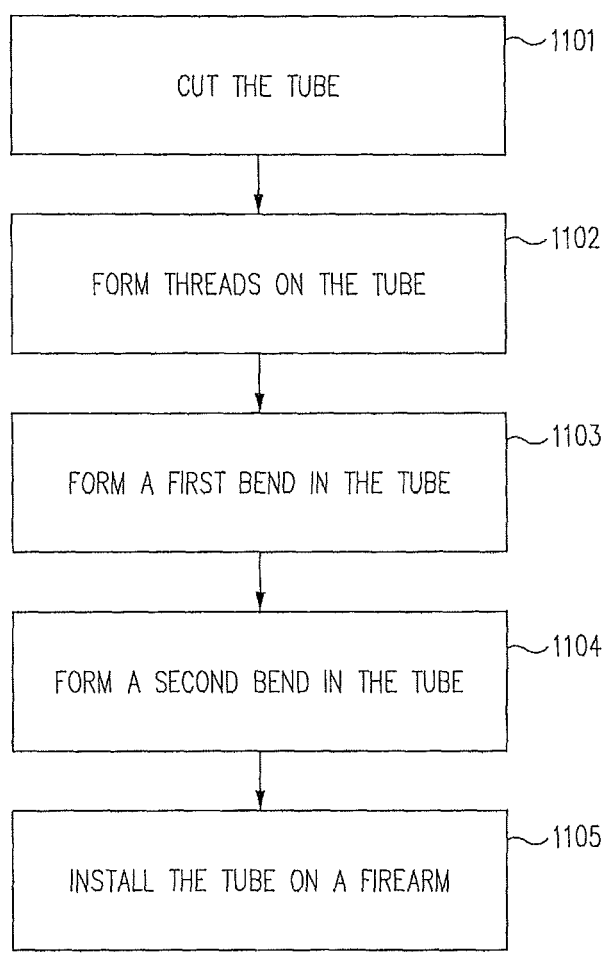
FIG. 12 is a flow chart showing a method for making a firearm having a heat dissipating gas tube, according to an embodiment.

FIG. 12 is a flow chart showing a method for making a firearm 700 having the gas tube 705, according to an embodiment. The method can comprise cutting a piece of ¼ OD×0.065 wall, stainless steel tubing, for example, to a desired length as shown in block 1101. For example, the tubing can be cut to a length of approximately 9.668 inches. The tubing can be cut with a tubing cutter or a saw, for example.

The method can further comprise forming threads 707 upon the cut tubing, as indicated in block 1102. For example, ¼-32 threads can be formed upon a section of tubing having a diameter of approximately 0.250 inch. The threads 707 can be formed with a lathe or with a die, for example.

The method can further comprise forming a first bend 711 in the tubing, as indicated in block 1103. A second bend 712 can be formed in the tubing, as indicated in block 1104 to define the gas tube 705. The first bend 711 and the second bend 712 can be formed consecutively or simultaneously. The first bend 711 and the second bend 712 can be formed using a fixture, jig, or tubing bend, for example.

The gas tube 705 can be installed in a firearm 700 as indicated in block 1105. For example, the gas tube 705 can be installed in an M16 or an M4 type of firearm 700. The bead 725 can be formed on the reward end of the tube 705 to facilitate a desired fit into a gas block interface of the firearm 700. The bead 725 can be formed at any desired point in the fabrication process. For example, the bead 725 can be formed either before or after the threads 707 are formed.

Referring again to FIG. 9, the gas tube 705 can comprise a gas tube retention hole 751 that is used to pin (attach) the tube to the front sight block 4501. According to an embodiment, the length, Dimension M, of the gas tube 705 from the center of the gas tube retention hole 751 to the rear end of the gas tube 705 and/or the rear end diameter, dimension N, of the bead 725 can be approximately the same as for a contemporary gas tube 705 for an M16 and/or M4. For example, Dimension M can be approximately 9.600 inches for an M4 and can be approximately 14.98 inches for an M16. For example, Dimension N can be approximately 0.180 inch. Thus, in one or more embodiments the gas tube 705 can readily replace the contemporary gas tube of an M16 and/or M4.

According to an embodiment, the length, Dimension M, and/or the rear end diameter, Dimension N, of the bead 725 can be less than for a contemporary gas tube 705 for an M16 and/or M4. For example, Dimension M can be less than 9.570 inches for an M4 and can be less than 14.95 inches for an M16. For example, Dimension N can be less than 0.1792 inch diameter. Thus, the gas tube 705 can be approximately 0.100 inch shorter and can have an outer diameter of approximately 0.001 inch less at the rear end, i.e. the bead 725, as compared to a standard gas tube 705 for the same firearm 700. One or more embodiments can fit within the carrier key 752 of an M16 and/or M4 and can readily replace contemporary gas tubes 705. The shorter length, Dimension M, and the smaller outer diameter, Dimension N, can better accommodate thermal expansion, such as can be caused by using larger capacity magazines. Thus, the gas tube 705 can have further enhanced heat resistance.

According to an embodiment, the outer diameter, Dimension Q, of a portion of the gas tube 705 at the rear end thereof can be approximately 0.171 inch. The diameter, Dimension P, of the gas tube 705 can be 0.186 inch.

The dimensions of the gas tube 705, as well as the configuration thereof, including any bends therein, can be whatever is necessary to fit a particular firearm. More or less than two bends can be used. Thus, the gas tube 705 can have any desired shape and configuration.

One or more embodiments can provide a replacement for contemporary gas tubes 705. Such embodiments are less prone to overheating and less likely to malfunction due to heat induced weakness and/or heat induced thermal expansion, particularly during sustained fully, automatic fire of the firearm 700. Thus, the firearm 700 can cycle and fire more uniformly and can be substantially more reliable.

One or more embodiments can provide a replacement for contemporary gas tubes 705 that can withstand the heat of firing at least as well as other components of the firearm 700. Thus, a failure or problem with the gas tube will be substantially less likely to be the cause of a malfunction of the firearm 700.

An often neglected problem in gas operated firearms is gas port erosion. Gas port erosion causes the gas port to become larger, which allows more gas to be used and thus gradually speeds up the gun cycle. Speeding up the gun cycle can cause feed jams, failures to extract, and carrier bounce misfires. It can also increase wear on the firearm and reduce accuracy during use of the firearm.

The M4 carbine has more trouble with gas port erosion than the M16 rifle, even though both of these firearms use the same bolt carrier group. The M4's gas port location is closer to the chamber, where gas port erosion is more aggressive. Because of gas port erosion, the M4's unlocking cam can begin to unlock too early in the firing cycle and thus can cause a bolt with standard locking lugs to break at the lugs or cam pin hole. This typically does not occur in the M16 rifle and typically does occur in new M4s. It generally only occurs in M4s that have fired enough to substantially erode the gas port. In addition to reliability problems, the resulting high rate of fire makes the gun less controllable on full auto, wastes ammunition, and intensifies heat problems.

Contemporary M16/M4 firearms have a gas tube 705 with a plug 706 (FIG. 40) at the front end of the gas tube 705. However, the plug 706 of a contemporary M16/M4 firearm does not substantially restrict gas flow. Contemporary M16/M4 firearms rely upon the gas port 1003 formed in the barrel to perform a gas metering function. The gas port 1003 is subject to erosion as discussed herein and thus suffers from substantial disadvantages with regard to this metering function.

More particularly, the M16 and M4 use the gas port 1003 diameter as the means to control the amount of gas flow. However, the forward corner of the gas port 1003 intersection with barrel bore is eroded from its original sharp corner into an enlarging triangle by the scrubbing of each passing bullet and the bombardment of propellant grains. This erosion of the gas port 1003 increases its size and thus undesirably allows the gas flow therethrough to increase over time. As the gas flow increases, the gun cycle speeds up, undesirably resulting in feed jams, extraction failures, and/or carrier bounce. Misfires begin and grow worse over time until the gun cripples itself from excessively worn and/or broken parts.

As shown in FIG. 10B, a gas metering plug 1001 can be installed in the front end of the gas tube 705 to mitigate the undesirable effects of gas port erosion. The gas metering plug 1001 can have a gas metering hole 1002 that the gas from the barrel must flow through before entering the gas tube 705. According to an embodiment, the gas metering hole 1002 is out of reach of bullet scrubbing and the impact of propellant grains. The gas metering plug 1001 can be made of a heat resistant material, so that it remains substantially unchanged by any amount of firing.

According to an embodiment, the gas metering hole 1002 is always smaller, e.g., has a smaller diameter, than the hole of the gas port 1003 (such that the gas metering hole 1002 always performs a gas metering function). Thus, although the gas port 1003 continues to erode so that the gas flow that reaches the gas metering hole 1002 continues to increase in pressure, the gas metering hole 1002 meters the gas and thus mitigates the undesirable effects of gas port erosion so as to the extend the useful life of the gun.

As discussed herein, the M16 service rifle and the M4 carbine have a variety of reliability shortcomings. Undesirable forward and rearward bouncing of the bolt carrier 702 is one such shortcoming. Insufficient dwell and early unlocking of the bolt 100 are another shortcoming. Methods and systems disclosed herein can be used in combination with one another to mitigate shortcomings of the M16/M4. For example, a drop in replacement kit can be provided to address this and others of these shortcomings.

Figure 13A:
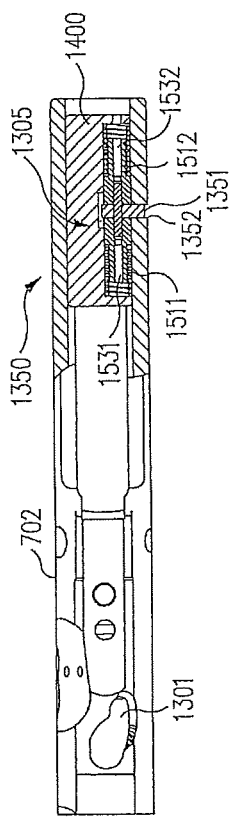
FIG. 13A is a top view of a bolt carrier having an anti-bounce assembly, according to an embodiment.

FIGS. 13A and 14 show a bolt carrier 702 having a longer dwell, double cut cam 1301 (FIG. 33B) and an anti-bounce assembly 1305, according to an embodiment. The double cut cam 1301 is particularly useful when applied to the M4 bolt due to the insufficient dwell of the M4. To prevent broken bolts, the double cut cam 1301 can have a 0.062 longer dwell (e.g., an overall dwell of approximately 0.132 inch) as compared to the standard M4 cam. Thus, the bolt 100 can be delayed substantially before the unlocking cam surface 3301 (FIG. 33B) begins to rotate the bolt 100 to its unlocked position. This longer dwell at least partially compensates for the time differences between the M16 unlocking start and the early start of the M4 due to its rearward gas port location, as discussed herein. The force on the extended bolt locking lugs 3601 (FIG. 1) that would cause the extended bolt locking lugs 3601 to bind is thus reduced to the same resistance as in the M16 rifle, so that the cause of broken bolts is substantially eliminated.

However, if care is not taken, the longer locking dwell and longer cam may be a hindrance in that it defeats one of the features of the M4/M16 bolt carrier assembly's design. When the bolt is in the most forward (unlocked) position relative to the bolt carrier, the extractor pin for the extractor that also retains the extractor is trapped by the bolt carrier body. If the extractor pin is not trapped at all times by the bolt carrier body, it may result in a gun stoppage if the pin moves towards disengaging with the extractor and bolt.

Therefore, in one or more embodiments of the present disclosure, a stepped extractor pin 1302/1312 is used to insure retention of the extractor pin as shown in FIGS. 13B-13E. The stepped pin 1302/1312, in combination with the extractor spring and extractor, form a spring loaded detent to secure the pin rather than relying on the pin being trapped inside the bore of the bolt carrier.

Figure 13B:
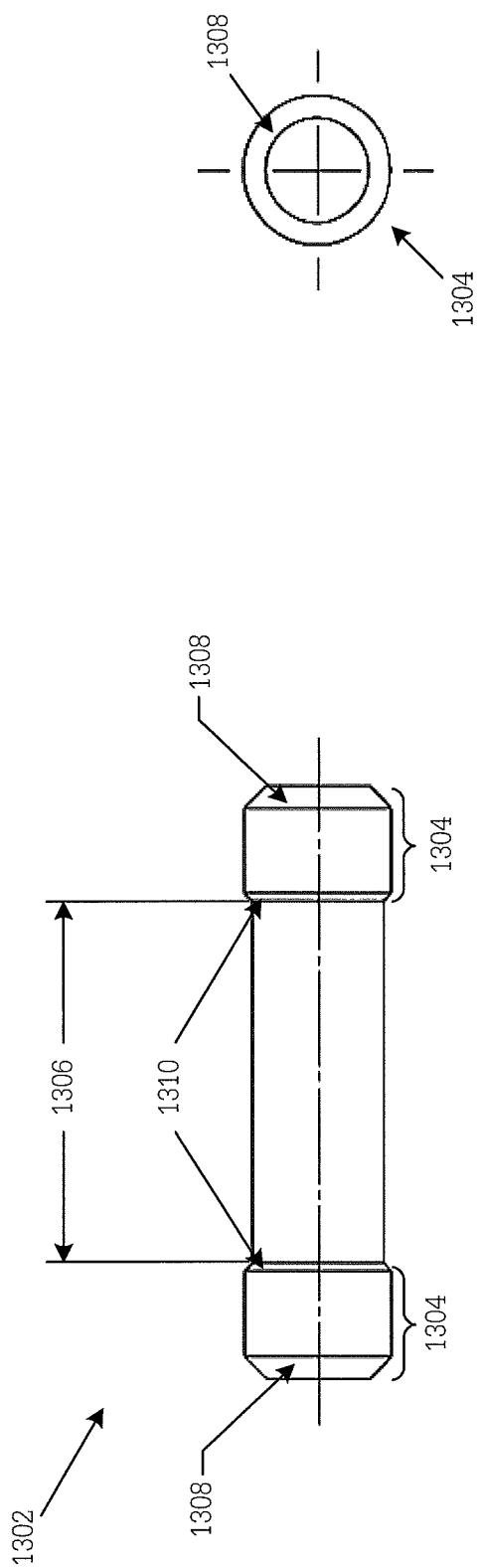
FIG. 13B is a front view of a stepped extractor pin, according to an embodiment.

FIG. 13B illustrates a detent feature which traps pin 1302. Stepped extractor pin 1302 may have opposing ends 1304 that are radially elevated about the longitudinally traversing center portion 1306 of pin 1302. Elevated ends 1304 may be adjoined to center portion 1306 via radial steps 1310. End portions 1304 may have beveled edges, such as faces 1308, on either side of the elevated area.

Figure 13C:
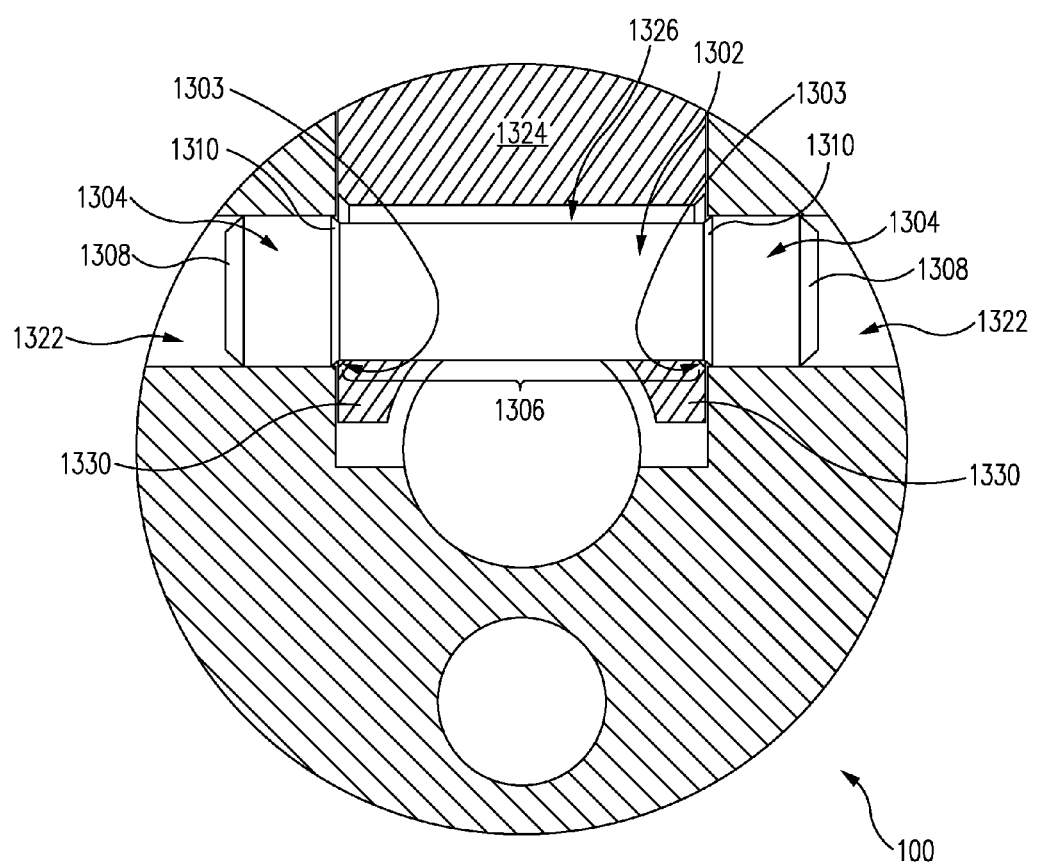
FIG. 13C a cross-sectional view of the stepped extractor pin disposed in a bolt, according to an embodiment.
Figure 13D:
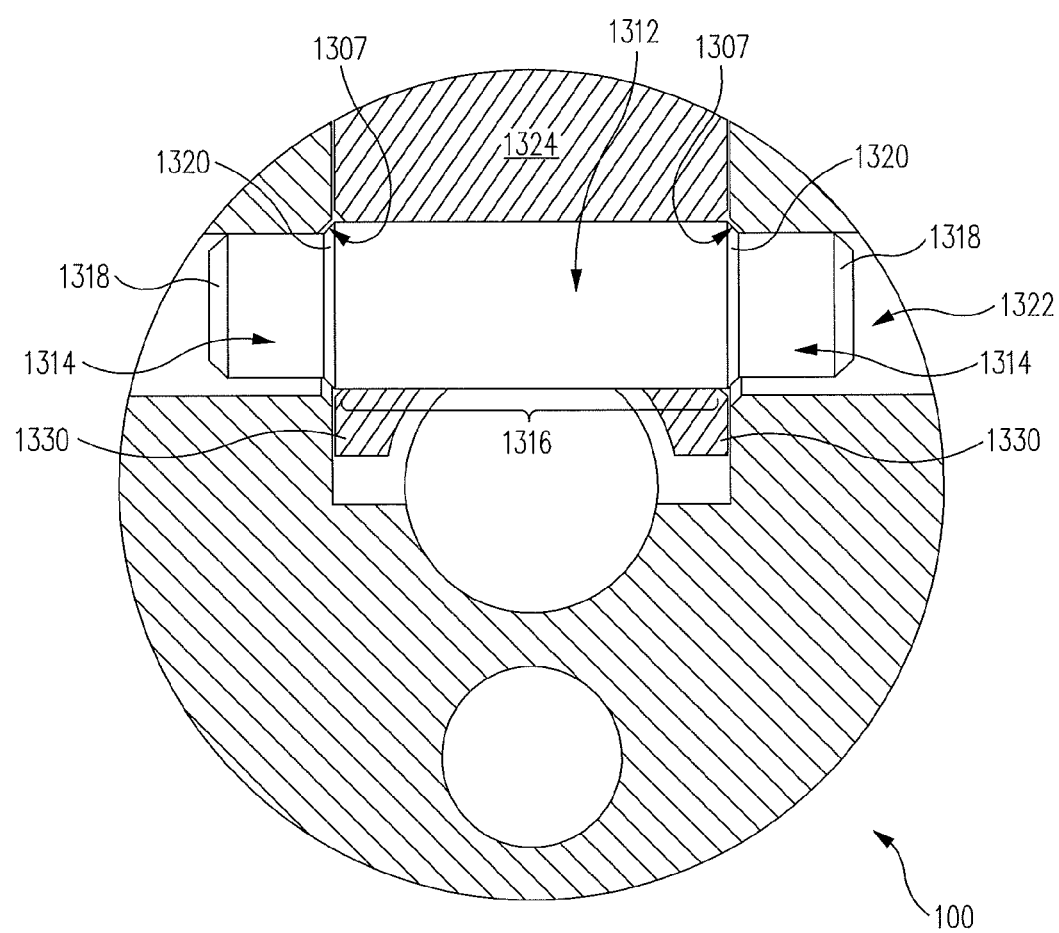
FIG. 13D is a cross-sectional view of a stepped extractor pin disposed in a bolt, according to an embodiment.

FIG. 13C shows a bolt assembly cross section through an extractor pin hole (e.g., section is rotated 67.5 degrees to show the extractor on the top and only shows features at the cross section). Pin 1302 may be disposed in pin hole 1322 in bolt 100. Pin 1302 may be disposed within hole 1322 and hole 1326 to prevent extractor 1324 from separating from bolt 100. Edges 1310 may engage with corresponding steps 1303. As shown, the extractor pin includes first and second ends and a central portion that extends between the first and second ends, where the first and second ends have a common diameter, wherein the central portion has a diameter, and wherein the common diameter of the first and second ends is larger than the diameter of the central portion. In this configuration, the extractor and the extractor pin cooperate to provide a force on the extractor pin that misaligns the extractor pin with a hole in the extractor. For example, the extractor spring force pushes extractor 1324 outward so that edges 1310 of end portions 1304 abut corresponding surfaces of an inner portion 1330 of the extractor that is pressed against smaller center portion 1306, thus, misaligning pin 1302 with hole 1326 in the extractor and preventing pin 1302 from passing completely through extractor pin hole 1326 and resulting in disassembly. Pin 1302 may be removed by using a punch or by pressing the extractor inward until the diameters are aligned In another embodiment of the present disclosure, as shown in FIG. 13D, stepped extractor pin 1312 may have a center portion 1316 that is elevated radially relative to end portions 1314. As shown, extractor pin 1312 includes first and second ends and a central portion that extends between the first and second ends, where the first and second ends have a common diameter, wherein the central portion has a diameter, and wherein the common diameter of the first and second ends is smaller than the diameter of the central portion. In this configuration, the extractor and the extractor pin cooperate to provide a force on the extractor pin that misaligns the extractor pin with a hole in the bolt. For example, the extractor spring force pushes extractor 1324 outward so that the larger diameter of center portion 1316 is misaligned with bolt pin hole 1322, thus, steps 1320 engage with corresponding surfaces 1307 of the bolt preventing pin 1312 from passing completely through hole 1322 and resulting in disassembly. Pin 1312 may be removed by using a punch or by pressing the extractor inward until the diameters are aligned.

Figure 13E:
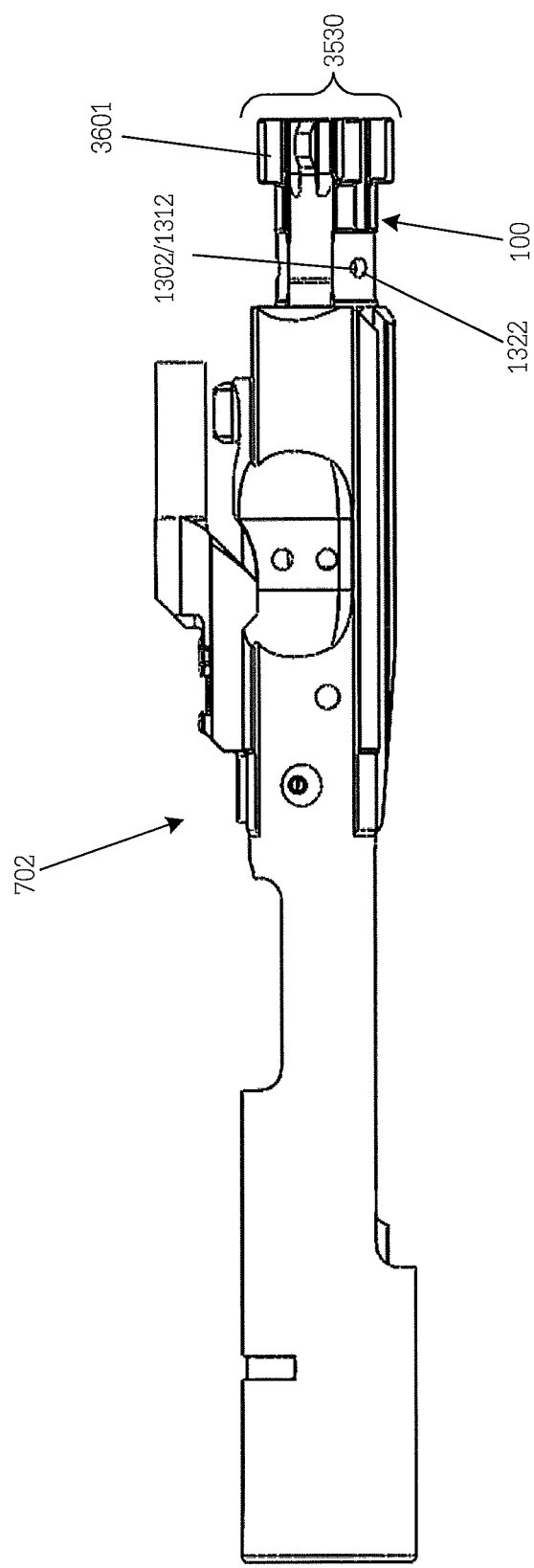
FIG. 13E is a side view of a bolt carrier assembly with a stepped extractor pin, according to an embodiment.

FIG. 13E shows a bolt carrier assembly with a stepped extractor pin that is not trapped by the bolt carrier body because the bolt has extended to a position at which opening 1322, in which the pin is disposed, is outside the body of bolt carrier 702. In the arrangement of FIG. 13E, the stepped features of the extractor pin may prevent the extractor pin from disengaging and falling out of hole 1322.

A single cut cam of the same new length with 0.062 longer dwell would have the same timing advantage, but the double cut has two additional advantages. The helix portion 3102 (FIG. 33B) of the cam has wider clearance for dust and dirt. Although the unlocking cam surface 3301 has 0.062 longer time dwell, the cam pin and bolt head location on the locking side have the same starting location as the standard cam so that the bolt head overtravels beyond the bolt holdopen device by the same amount giving the holdopen enough time to rise into position.

According to an embodiment, the adverse effects of gas port erosion and higher rate of fire (excessive cycle speed) can be substantially mitigated by three compatible but separate features. First, a gas metering plug 1001 can be installed in the end of the gas tube 705 and the gas metering plug 1001 can have a gas metering hole 1002 that the gas must flow through.

Second, undesirable bounce of the bolt carrier 702 can be substantially mitigated. It is not surprising that gas port erosion speeds up the firearm cycle, because the bolt group (comprising the bolt 100 and related components) is thrown more vigorously to the rear. However, it is important to also appreciate that the forward cycle of the bolt group also undesirably speeds up. Faster forward movement is caused by bouncing of the bolt carrier 702 as the buffer 3503 (FIG. 35) and the bolt carrier 702 impact the rear wall 3577 of the firearm 700. The buffer 3503 doesn't bounce, but bolt carrier 702 does bounce. If rear bouncing of the bolt carrier 702 can be eliminated, then approximately half the rate of fire gain can be desirably eliminated.

For example, assume that the cyclic rate of fire of a new M4 is 800 shots per minute and that the firearm has fired enough rounds to erode the gas port sufficiently to speed up the cyclic rate to 1000 shots per minute. This represents an increase of 200 shots per minute in the cyclic rate. If that increase were cut in half, the gain would only be 100 shots per minute. Thus, the firearm would have a cyclic rate of 900 shots per minute instead of 1000 shots per minute and the useful life of the firearm would be substantially extended.

When the bolt group begins to move forward slowly, it starts to push the top cartridge in the magazine forward, so that the top cartridge enters the feed ramp at a slow speed and is smoothly cammed upward into the chamber opening. By way of contrast, if the bolt group bounces forward at high speed, then the bullet point hits the feed ramp (which is 7° steeper in the M4 than in the M16) at high speed. The bullet tends to bounce higher as the cyclic rate increase. When the cyclic rate increases sufficiently, the bullet will miss the chamber opening and jams the firearm 700. Although this commonly occurs with contemporary 30-shot magazines, high capacity magazine provided by SureFire, LLC of Fountain Valley, Calif. are designed to feed reliably at a very wide range of cyclic rates.

Figure 18:
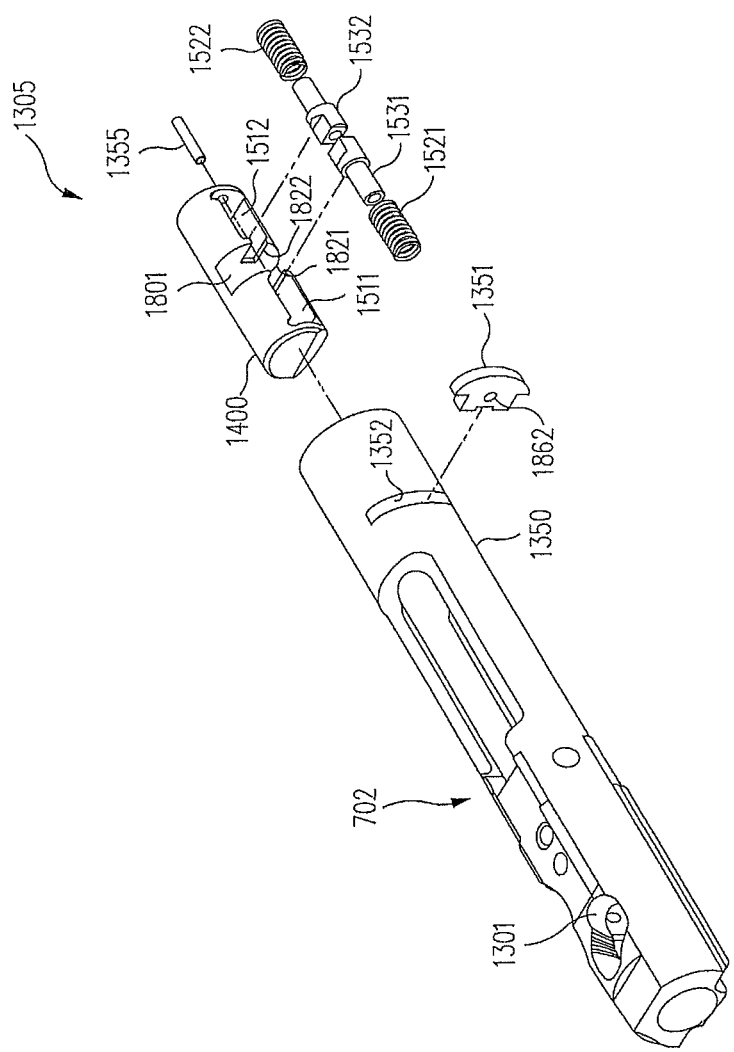
FIG. 18 is an exploded view of the bolt carrier of FIG. 13A, according to an embodiment.

Referring to FIGS. 13A-33A, a combination rate reducer and anti-bounce assembly, referred to herein as anti-bounce assembly 1305, can be mounted in the rear tubular section 1350 that is common to both the M16 and M4 bolt carrier 702, according to an embodiment. The only modification needed to be made to the bolt carrier 702 is a vertical cut or slot 1352 formed through the left side wall of the bolt carrier 702 as shown in FIG. 18.

As shown in FIGS. 15-17, the anti-bounce assembly 1305 can comprise a steel cylinder or anti-bounce weight 1400 having a first cavity 1511 and second cavity 1512 formed therein. A first spring 1521 can be disposed in the first cavity 1511 upon a first plunger 1531 and a second spring 1522 can be disposed in the second cavity 1512 upon a second plunger 1532. The first plunger 1531 and the second plunger 1532 can be substantially hollow. A spring pin 1355 can interconnect the first plunger 1531 and the second plunger 1532 and can pass through an opening 1862 in an anvil 1351.

The anti-bounce weight 1400 can be free to slide within the bolt carrier 702 and can be biased centrally by the first spring 1521 and the second spring 1522, which can bear upon the anvil 1351. The anvil 1351 can be fixed with respect to the bolt carrier 702. The anvil 1351 can be received within the slot 1352 formed in the bolt carrier 702. The first cavity 1511 and the second cavity 1512 can have a first blocking shoulder 1541 and a second blocking shoulder 1542 that prevent the first plunger 1531 and the second plunger 1532 from moving beyond their centering positions, so that when inertia moves the anti-bounce weight 1400 beyond center, then one plunger 1531, 1532 compresses its associated spring 1521, 1522 so as to provide a force that tends to return the anti-bounce weight 1400 to center while the other plunger 1532, 1531 and spring 1522, 1521 are blocked from acting upon the anti-bounce weight 1400.

As shown in FIG. 15, the anti-bounce weight 1400 is in a zero or non-impact position. This is the position of the anti-bounce weight 1400 prior to firing the firearm 700 and after the firearm 700 has completed a firing cycle.

As shown in FIG. 16, the anti-bounce weight 1400 is in a rearward impact. This is the position of the anti-bounce weight 1400 after firing the firearm 700 once the bolt carrier 702 has moved rearwardly sufficiently to cause the anti-bounce weight 1400 contact the anvil 1351. The anvil 1351 has traveled rearward with the bolt carrier 702 to cause the impact.

As shown in FIG. 17, the anti-bounce weight 1400 is in a forward impact. This is the position of the anti-bounce weight 1400 after firing the firearm 700 once the bolt carrier 702 has ceased moving rearwardly to cause the anti-bounce weight 1400 to again contact the anvil 1351 on the opposite side of the anvil 1351 with respect to that shown in FIG. 16. The anvil 1351 has traveled forward with the bolt carrier 702 to cause the impact.

As shown in FIG. 18, a central cavity 1801 can be formed between the two cavities 1511 and 1512 of the anti-bounce weight. The central cavity 1801 can define a continuous passage between the two cavities 1501 and 1502. The anvil 1351 is disposed within the central cavity 1801. The anvil 1351 moves within the central cavity 1801 as the bolt carrier 702 travels rearward and forward.

The two plungers 1531 and 1532 can extend through corresponding openings 1821 and 1822 into the central cavity 1801. The anti-bounce assembly 1305 can be secured within the bolt carrier 702 by inserting the anti-bounce assembly 1305 into the tubular section 1350 of the bolt carrier 702, then placing the anvil 1351 into the slot 1352 in the bolt carrier 702 and on into the central cavity 1801, and then inserting the spring pin 1355 through the hollow plungers 1531, 1532 and through the hole 1862 in the anvil 1351.

The anti-bounce weight 1400 can slide forward and rearward within the tubular portion 1350 of the bolt carrier 702. The springs 1521 and 1522 can tend to center the anti-bounce weight 1400. The dimensions of the central cavity 1801 can allow the anti-bounce weight 1400 to move fore and aft approximately 0.10 inches, for example, before the anti-bounce weight 1400 impacts the anvil 1351. Such motion is resisted in either direction by the force of each spring 1521, 1522 and by the fact that each plunger 1531, 1532 has a travel limiting stop or blocking shoulder 1541 (FIG. 19) formed thereon. Thus, when inertia drives the anti-bounce weight 1400 forward to strike the anvil 1351, then only the rearward spring 1522 is compressed (as shown in FIG. 17), while the forward spring 1521 and plunger 1531 move away from the anvil 1351 and the opposite occurs when the weight 1400 move rearward (as shown in FIG. 16). In this way, the springs 1521 and 1522 are preloaded and biased to hold the anti-bounce weight 1400 in mid position, e.g., approximately centered (as shown in FIG. 15) within its limits of travel.

When the bolt carrier 702 impacts forward and tends to bounce rearward, the anti-bounce weight 1400 impacts forward again (as shown in FIG. 17) and vice-versa (as shown in FIG. 16). Thus, the anti-bounce weight 1400 partially defines an anti-bounce device in both directions, not just in the forward direction. Since the anti-bounce assembly 1305 mitigates rearward bounce, it is also a rate reducer (it tends to reduce the cyclic rate of a firearm). According to one or more embodiments, the anti-bounce assembly 1305 can be a semi-permanent installation. That is, the anti-bounce assembly 1305 can be removed by driving the spring pin 1355 into the forward plunger 1532 or the anti-bounce assembly 1305 can remain in place since standard disassembly of the firing pin, cam pin, and bolt can be performed with the device installed.

Figure 23:
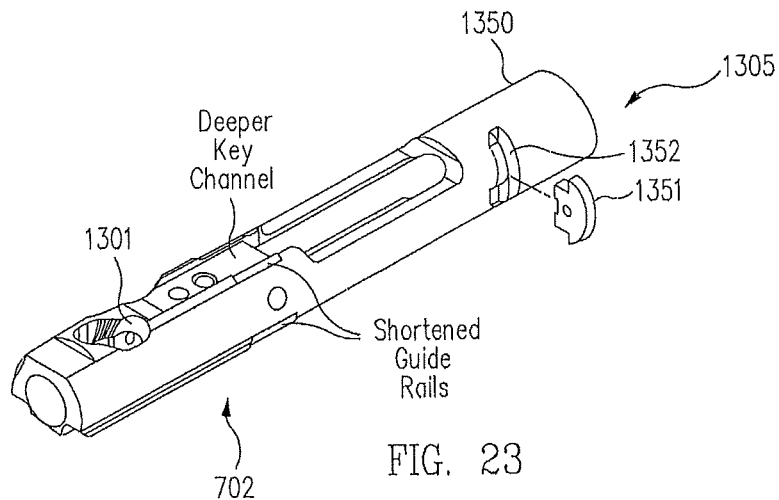
FIG. 23 is a perspective view of a modified bolt carrier, according to an embodiment.

FIGS. 19-23 show further detail regarding the construction of the anti-bounce assembly 1305. The anvil 1351 is removed from FIGS. 19-22 for clarity. The anvil 1351 is shown in FIG. 23 positioned for insertion into slot 1352 formed in the bolt carrier 702. The anvil 1351 both maintains desired positioning of the anti-bounce weight 1400 within the bolt carrier 702 and provides a stop for defining the limits of motion of the anti-bounce weight 1400. The anti-bounce weight 1400 strikes the anvil 1351 as the anti-bounce weight 1400 functions to mitigate undesirable bouncing of the bolt carrier 702.

Figure 24:
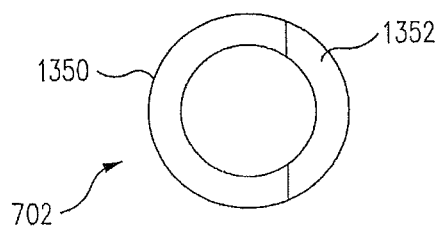
FIG. 24 is an end view of the modified bolt carrier of FIG. 23, according to an embodiment.
Figure 25:
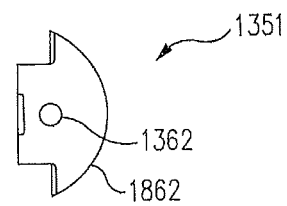
FIG. 25 is a side view of an anvil of FIG. 23, according to an embodiment.

FIG. 24 shows a cross section of the modified bolt carrier 702. The cross section is taken where the slot 1352 is formed to receive the anvil 1351.

FIG. 25 and FIGS. 31A-31C show the anvil 1351. The anvil 1351 can be generally crescent shaped with a hole 1862 proximate the middle thereof. The anvil can have a curved outer surface 1362 which can conform generally to the curvature of the bolt carrier 702 within which the anvil 1351 is disposed. The anvil 1351 can have any desired shape. The hole 1862 receives the spring pin 1355.

Figure 26:
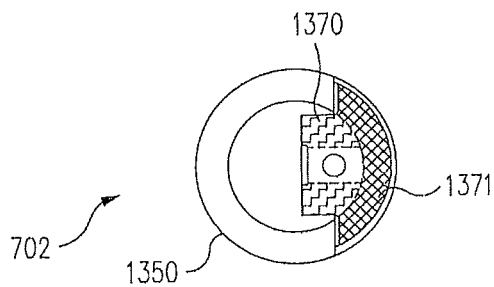
FIG. 26 is an end view of the modified bolt carrier of FIG. 23 showing an impact area and a bearing area, according to an embodiment.

FIG. 26 shows an impact area 1370 where the anti-bounce weight 1400 strikes the bolt carrier 702 during cycling of the firearm 700. A bearing surface 1371 of the bolt carrier 702 where the anvil contacts the bolt carrier 702 when the anvil is installed in the bolt carrier 702 is also shown.

Figure 27:
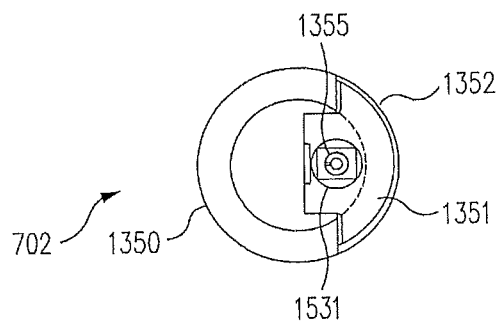
FIG. 27 is an end view of the modified bolt carrier of FIG. 23 showing a plunger, according to an embodiment.

FIG. 27 shows a cross section of the bolt carrier 1350 with the anvil 1351 installed in the slot 1352. The spring pin 1355 is installed in the plungers 1531 and 1532.

Figure 28C:
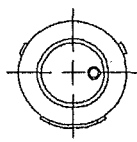
FIGS. 28A-28C are various views of the anti-bounce assembly, according to an embodiment.
Figure 28A:
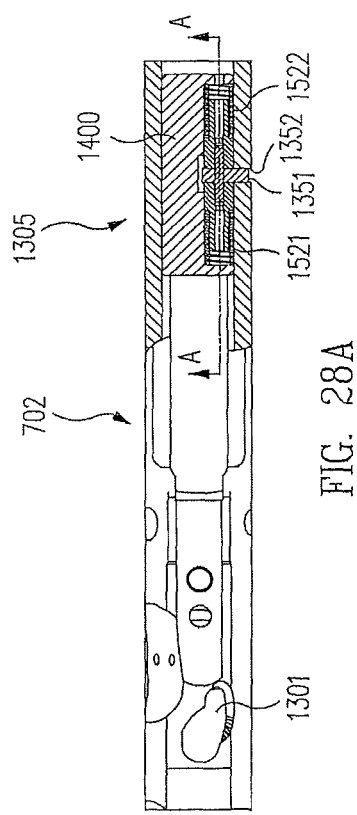
Figure 28B:
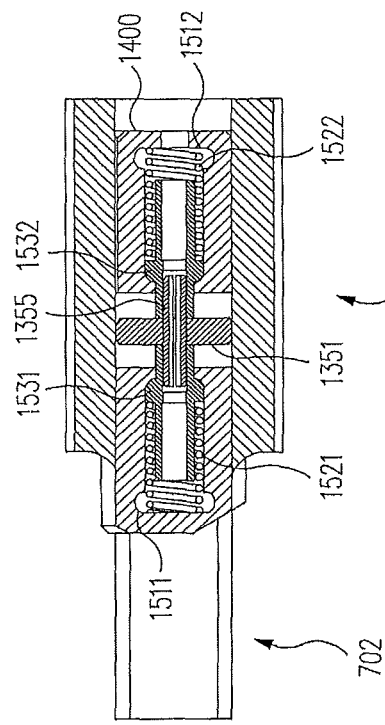
Figure 30D:
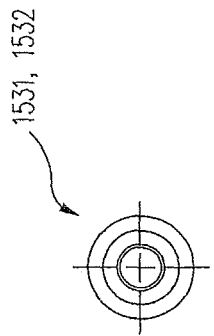
FIGS. 30A-30D are various views of the plunger, according to an embodiment.
Figure 30A:
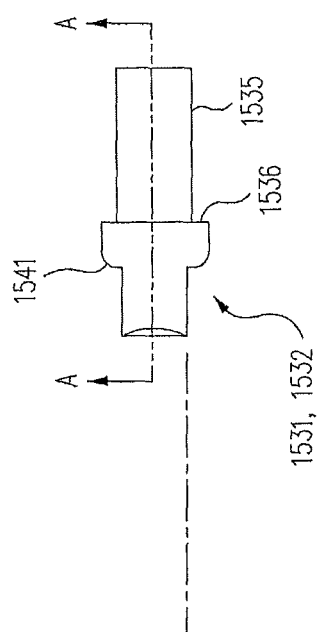
Figure 30B:
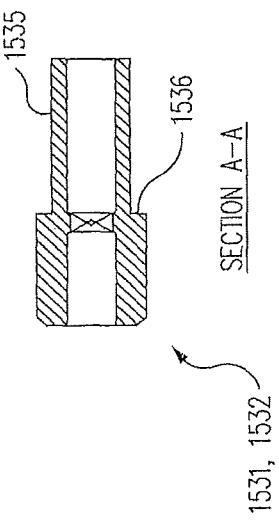
Figure 30C:
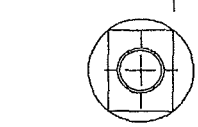

FIGS. 28A and 28B show the anti-bounce assembly 1305 in cross section. The anti-bounce weight 1400, the plungers 1531 and 1532, the springs 1521 and 1522, the anvil 1351, and the spring pin 1355 are installed in the bolt carrier 702.

FIGS. 29A-29C show the cavities 1511 and 1512 of the anti-bounce weight 1400 where the plungers 1531 and 1532 are disposed. The plungers 1531 and 1532 are removed for clarity.

FIGS. 30A-30D show a plunger 1531, 1532. The plunger 1531, 1532 comprises a generally cylindrical shaft or spring guide 1535 upon which the spring 1521, 1522 is compressibly disposed and a shoulder 1536 against which the spring 1531, 1532 bears. A limiting stop 1541 partially defines the limit of travel of the anti-bounce weight 1400, as discussed herein. FIG. 31A-31C show the anvil 1351. FIG. 31B is a side view of the anvil 1351. FIG. 31C shows a cross-section of the anvil through the hole 1862.

FIGS. 32A-32F are various views showing a modification of the bolt carrier 702, according to an embodiment. The slot 1352 can be cut into a standard bolt carrier 702 to receive the anvil 1351. The slot 1352 can be milled into the bolt carrier 702, for example. The anti-bounce assembly 1305 can thus be easily added to a standard bolt carrier 702.

Figure 33A:
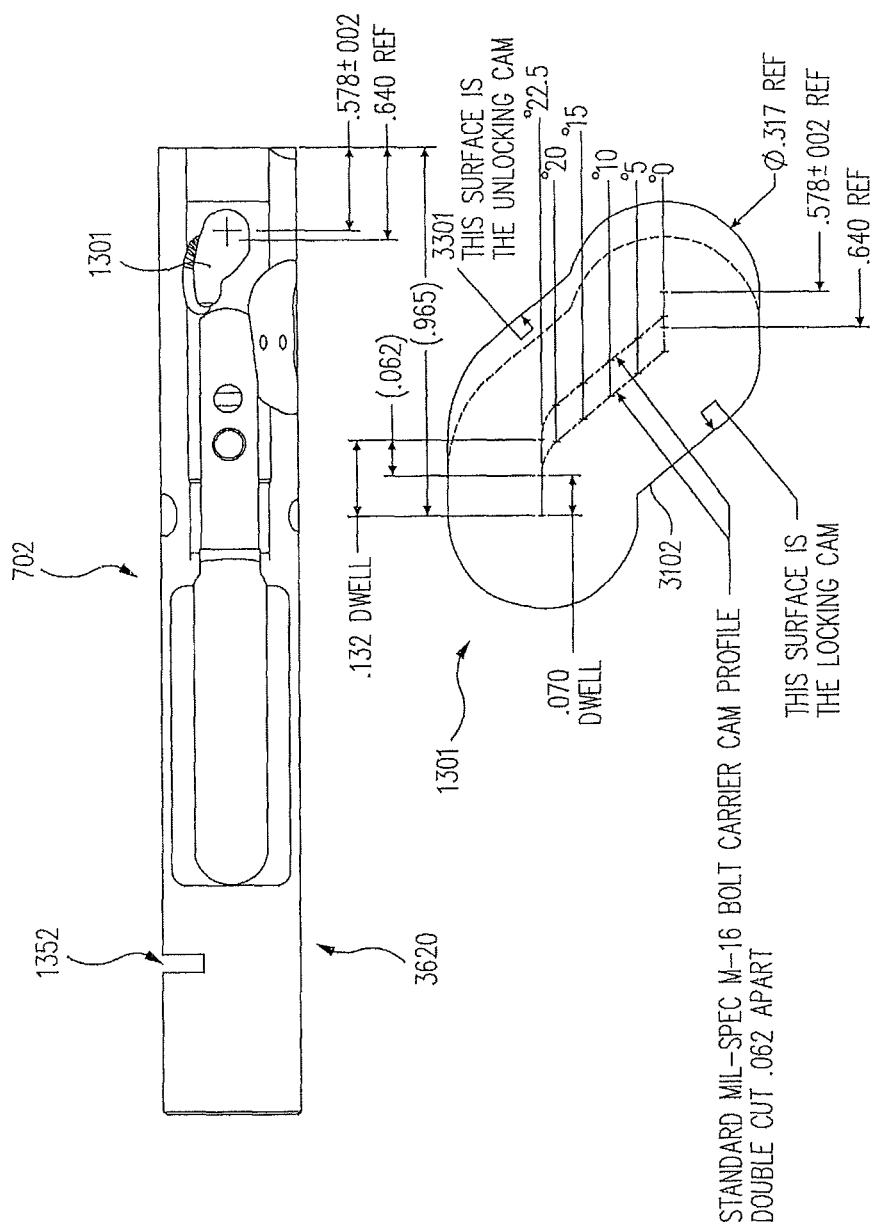
FIGS. 33A and 33B are various views showing a double cut cam, according to an embodiment.
Figure 33B:
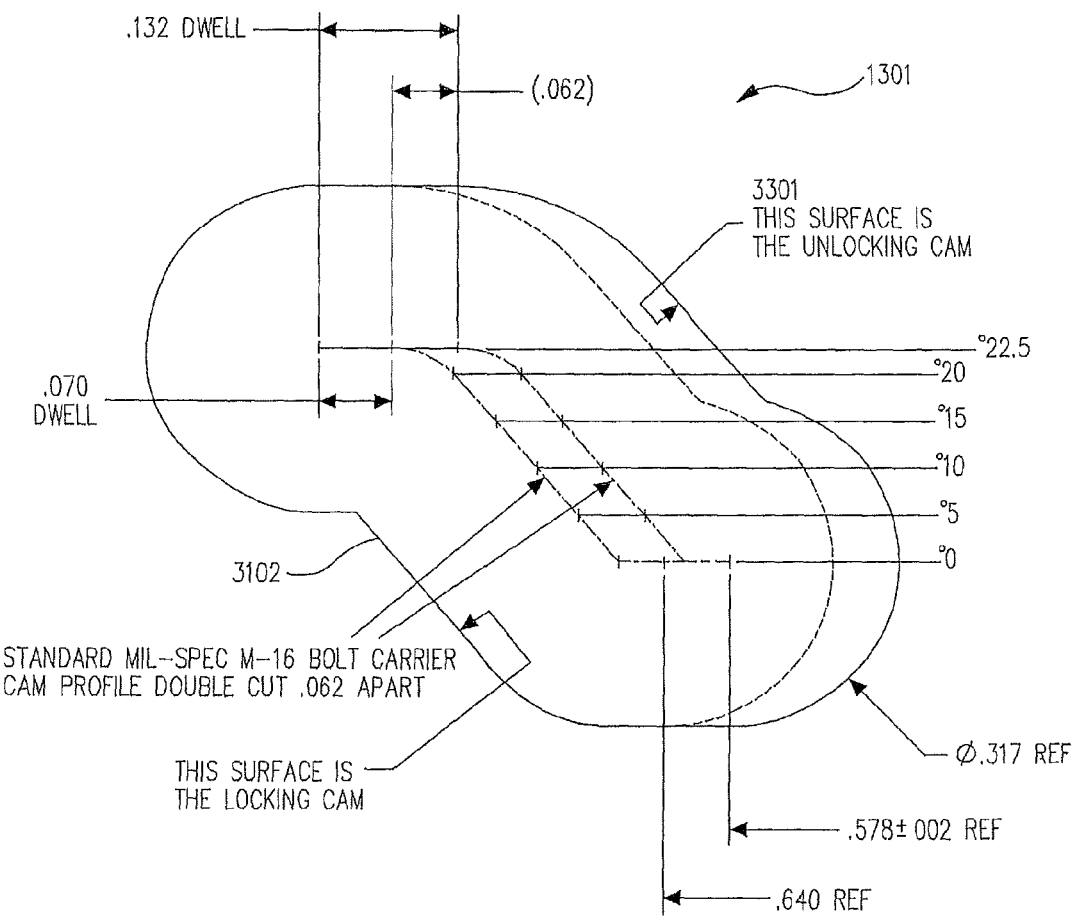

FIGS. 33A-33B show a longer dwell, double cut cam 1301, according to an embodiment. Exemplary dimensions for the double cut cam 1301 are provided. Double cutting the cam 1301 delays unlocking of the bolt 100 and provides other advantages, as discussed herein.

The longer dwell of the double cut cam 1301 allows the chamber pressure to drop more that is allowed by the single cut cam of a standard M4 carbine, so as to better assure that the pressure is low enough to safely and reliably disengage the extended bolt locking lugs 3601. The anti-bounce weight makes the firearm 700 more controllable and reduces the cyclic rate as compared to a standard M16/M4.

Figure 35:
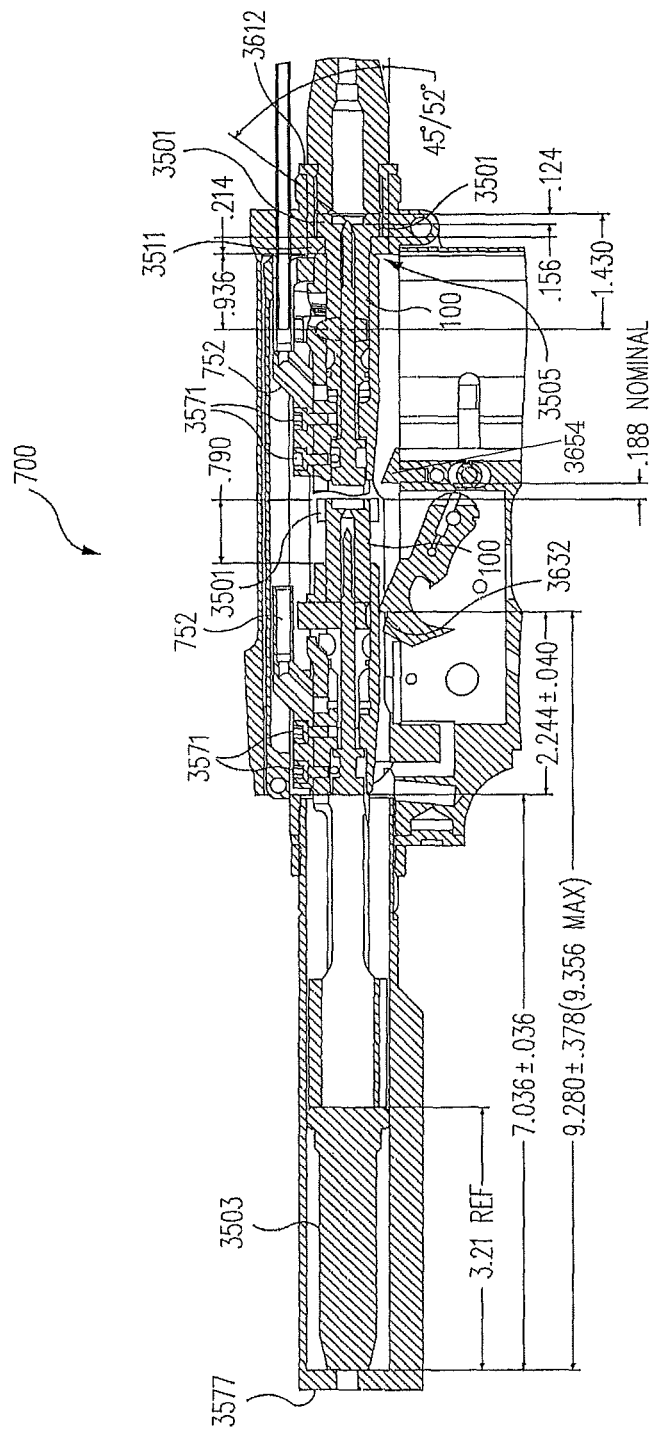
FIG. 35 is a cross-sectional side view of a portion of a standard, i.e. contemporary, M16/M4 5.56 mm firearm with the bolt group shown in its full forward position and full rear position.

Double cutting the cam 1301 extends the bolt head 3530 (FIG. 36A) approximately 0.062 inch forward. This extended amount adds 0.130 inch of additional length to the extended bolt locking lugs 3601 for an additional total extension of approximately 0.192 inch out of the front of the bolt carrier 702 compared to standard M16/M4. In the standard M16/M4 firearm 700 (FIG. 35), such double cutting of the cam 1301 and such extended bolt locking lugs 3601 eliminates the 0.188 nominal over travel of the bolt head 3530 beyond the bolt catch 3654 and thus blocks proper functioning of the bolt catch 3654 (FIG. 35).

A bolt group 3650 can include the bolt 3610, the bolt carrier 702, and the carrier key 752, among other items. To facilitate proper functioning of the bolt catch 3654 and to improve on such functioning without undesirably mitigating the benefits of the more robust extended bolt locking lugs 3601, as well as the delayed unlocking that results from the extended bolt locking lugs 3601 and the double cut cam 1301, a shortened buffer 3503 and modified carrier key 752 allow the bolt group 3650 to travel approximately an additional 0.360 inch rearward.

With particular reference to FIG. 33B, examples of dimension are provided for the double cut cam 1301. These dimensions provided the longer dwell. Other dimensions can similarly provide a longer dwell.

The helix portion 3102 of the double cut cam 1301 can provide wider clearance to better accommodate soiling, e.g., dust and dirt. The unlocking cam surface 3301 can have 0.062 longer time dwell. The cam pin and bolt head location (not shown) on the locking side can have the same starting location as the standard cam so that the bolt head overtravels beyond the bolt holdopen device by the same amount giving the bolt holdopen device sufficient time to rise into position.

Figure 36A:
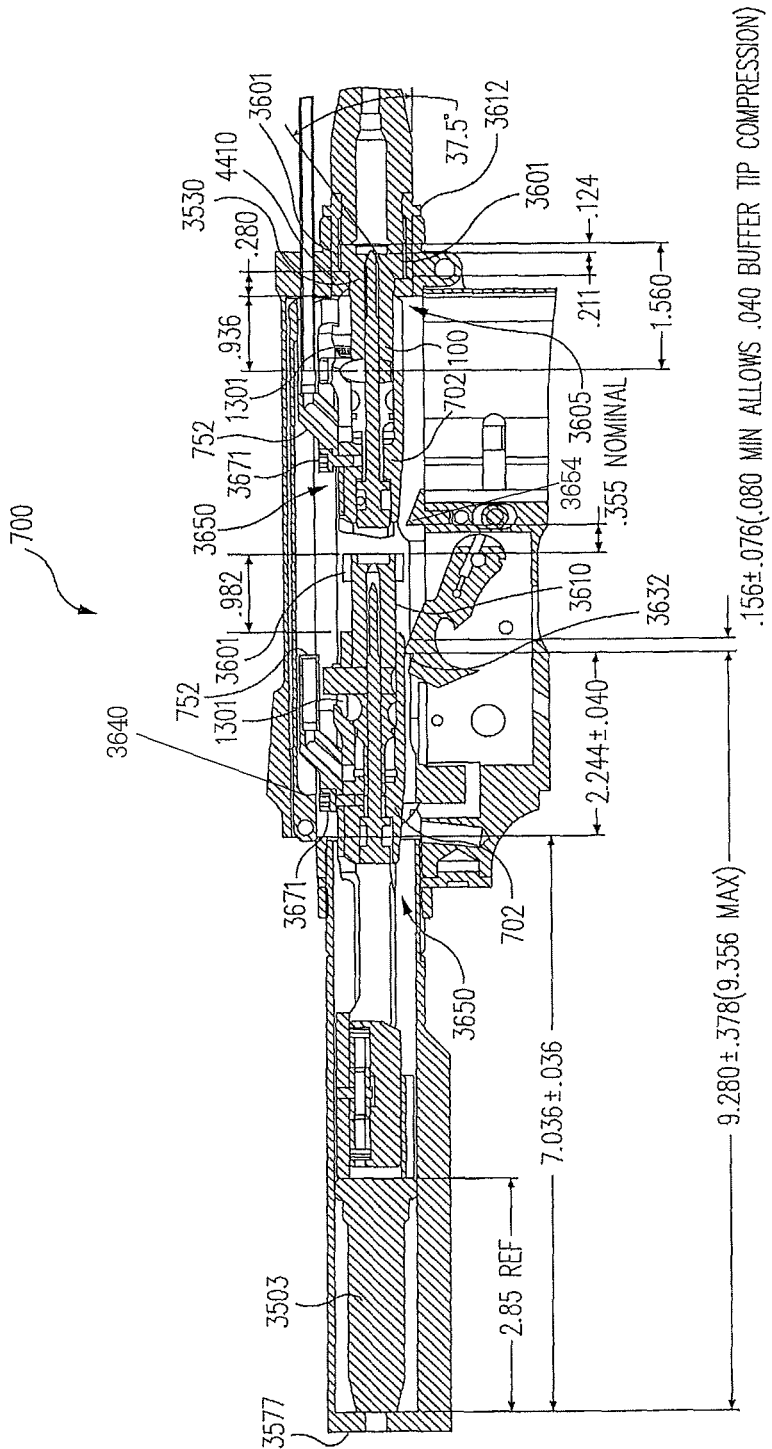
FIG. 36A is a cross-sectional side view of a portion of an M16/M4 5.56 mm and 6.8 mm firearm having a bolt and barrel extension with more robust extended locking lugs and other improved features, with the bolt group shown in two positions, according to an embodiment.
Figures 36B, 36C, 36D, 36E:
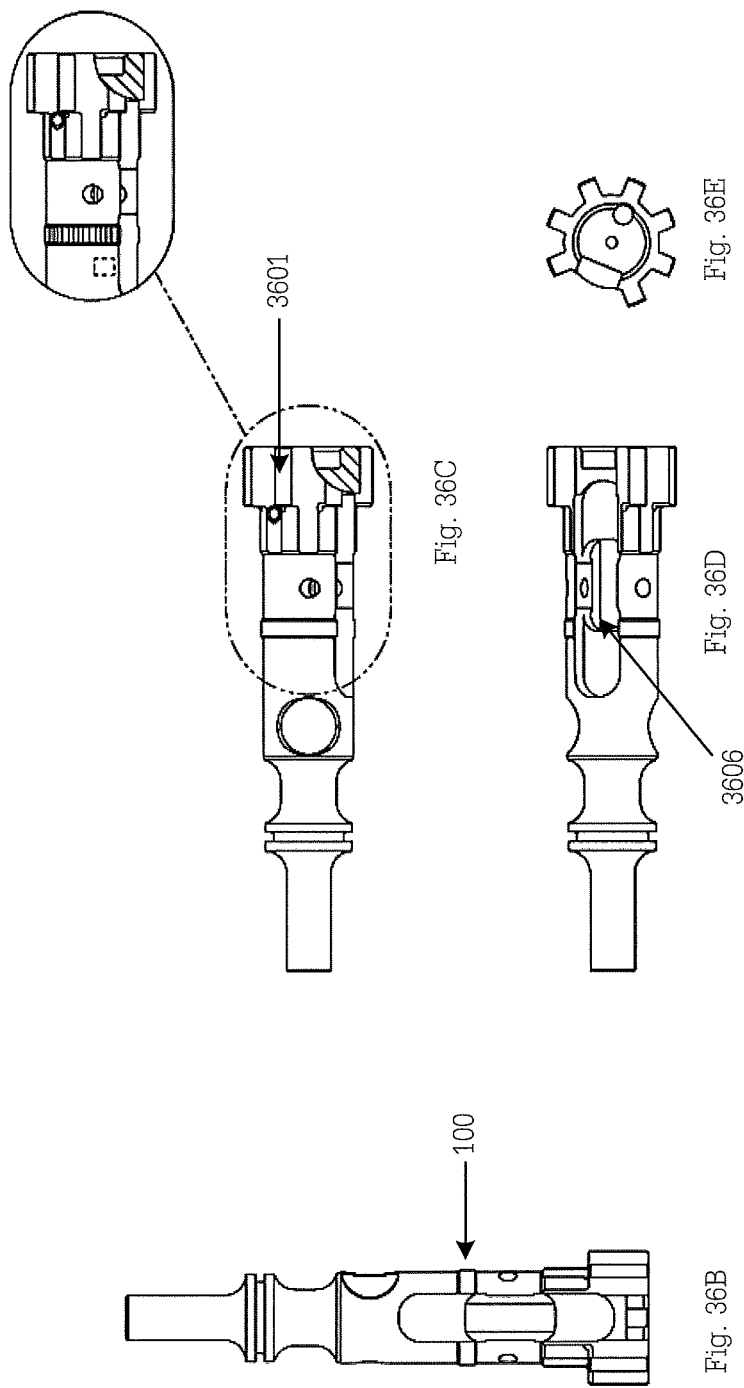
FIGS. 36B-36Y are various views of extended locking lugs of a bolt carrier assembly, according to an embodiment.
Figure 36V:
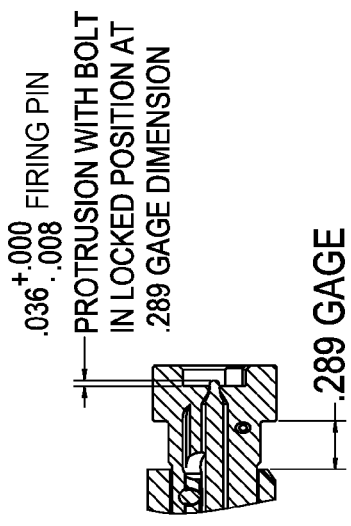
Figure 36U:
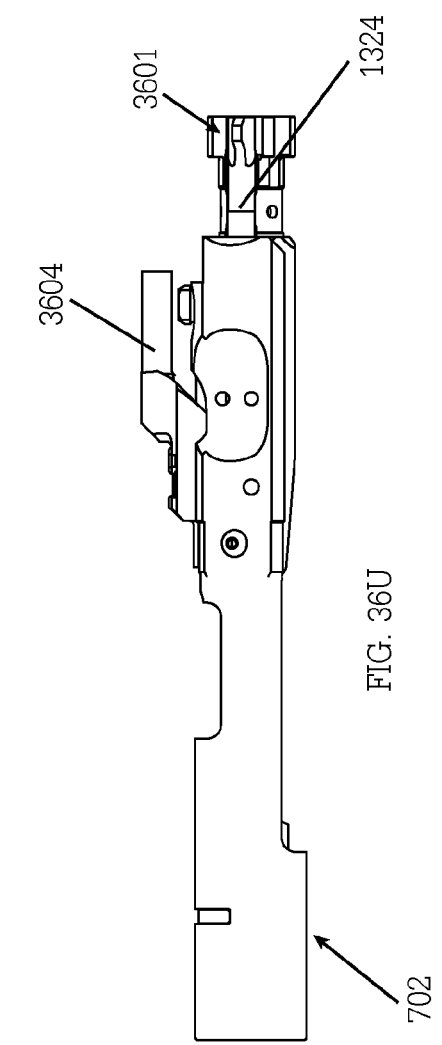
Figure 36W:
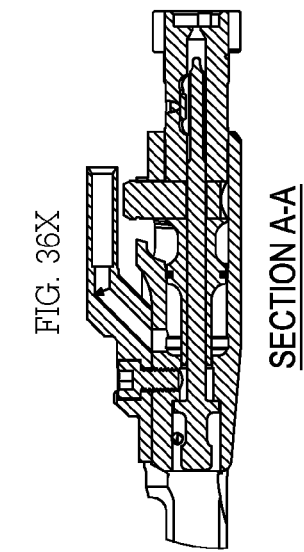
Figures 36U, 36V, 36W, 36X, 36Y:
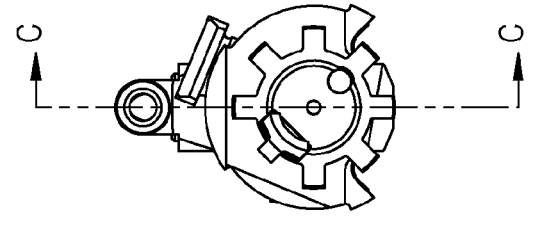

Referring now to FIGS. 34A-34P, the carrier key 752 can have a reduced profile that avoids interference, e.g., impacting of the carrier key 752 with a lower receiver's rear band 3640 (FIG. 36A). The reduced profile of the carrier key 752 can be necessitated by the longer extended bolt lugs 3601. For example, the carrier key may be shortened by approximately 0.400 inch to facilitate an increased stroke.

The carrier key 752 can have a single bolt hole 3421, as opposed to a contemporary carrier key which has two bolt holes. It has been found that the use of a single mounting bolt is sufficient for securely attaching the carrier key 752 to the bolt carrier 702 and the use of a single mounting bolt facilitates increase travel of the bolt carrier 702 due to the use of the longer extended bolt locking lugs 3601, as discussed herein. The use of a single mounting bolt facilitates additional clearance to define low profile 3422 to prevent the rear portion of the carrier key 752 from contacting the receiver's rear band 3640 when the firearm 700 cycles. Further, the carrier key 752 can be mounted in a deeper cut channel of the bolt carrier 702.

The use of a 0.500 inch shorter carrier key 752, a shortened buffer 3503 (FIG. 36A) can increase the bolt carrier 702 allowable travel by approximately 13% and can reduce the rate of fire of the firearm 700 to about 80% of what it otherwise is. Except for the design of the key 752, the only change to the carrier 702 can be that two number 8 screw holes are replaced with a single 10-32 screw hole.

Although this alone does not necessarily reduce parts wear, it can increase full auto controllability and hit probability, conserve ammunition and reduce heat buildup. Thus, operation and reliability can be enhanced. The use of such a carrier key 752 can comply and work normally without the shortened buffer 3503 (FIG. 36A). It can therefore be offered to create the option to use a shortened buffer and spring stack for a reduced rate of fire.

The carrier key 752 is shown during various manufacturing steps thereof. More particularly, FIGS. 34A-34C show a block shape of the carrier key 752. FIGS. 34D-34G show the carrier key 752 after a drill and ream processes. FIGS. 34H-34J show the carrier key 752 after lath turning. FIGS. 34K-34N show the carrier key 752 after form cutting. FIGS. 34O-34P show the profile of the finished carrier key 752.

According to an embodiment, more robust extended bolt locking lugs 3601 can be formed upon the bolt and more robust extended barrel locking lugs 4410 can be formed upon the barrel extension 3612, as discussed herein. The use of more robust extended bolt locking lugs 3601 and more robust extended barrel locking lugs 4410 mitigates failure thereof. Such failure of the extended bolt locking lugs 3601 and the extended barrel locking lugs 4410 can result in damage to the firearm 700, as well as possibly lose of life, particularly in police use and battlefield operations.

It has been determined that extended locking lugs used in combination with a barrel extension in a firearm, such as an M4 carbine, and a longer, less steep feed ramp than the standard M4 feed ramp reduced bullet bounce off of the feed ramp. However, the longer locking lugs of both the bolt and/or barrel extension, whether only one is lengthened or both are lengthened, may create a similar dilemma as the longer cam (e.g., the extractor pin becomes exposed) as discussed above in connection with FIG. 13A. If care is not taken, whether used with the longer cam or with a standard M4 cam, the longer locking lugs overcome the extractor pin retention feature of being trapped within the bolt carrier body. A stepped pin such as stepped pin 1302/1312 in combination with the extractor spring and extractor forms a spring loaded detent to secure the extractor pin rather than trap the pin inside the bore of the bolt carrier as described above that becomes particularly beneficial when using the extended bolt locking lugs, extended barrel extension lugs, or the longer cam whether used individually or in combination with each other.

For example, a barrel extension for use in a firearm (e.g., M4 carbine) with extended locking lugs, which require a lengthened bolt such that when the bolt relative to the bolt carrier is in its most forward unlocked position the bolt's extractor pin is fully exposed and not retained by the bolt carrier (see, e.g., FIG. 13E), the extractor pin is stepped so that in combination with the bolt's extractor spring and extractor acts as a detent to retain the extractor pin as shown in, for example, FIGS. 13B-D.

As shown in FIGS. 36B-L, in various embodiments, a bolt carrier assembly for use in an M4 carbine may have a bolt with extended locking lugs, and the lengthened bolt is such that when the bolt relative to the bolt carrier is in its most forward, unlocked position the bolt's extractor pin is fully exposed and not retained by the bolt carrier. The extractor pin is thus stepped and, in combination with the bolt's extractor spring and extractor, acts as a detent to retain the extractor pin.

In an embodiment of the present disclosure, bolt 100 may have extended locking lugs 3601 (e.g., extended locking lugs having a length of approximately 0.335 inches). Bolt 100 may have pin hole 1322 to receive a stepped pin such as one of stepped pin 1302 or stepped pin 1312 described herein. As shown in FIGS. 36M-36P, extractor 1324 may be disposed in a slot 3606 of bolt 100 and secured by a stepped pin and force provided by extractor spring 3602.

In another embodiment of the present disclosure, as shown in FIG. 36U-36Y, a bolt carrier 702 with a shortened key 3604 for increased travel may be included to maintain the M4's original bolt catch over travel. The limit of increased bolt group travel is reached at approximately 0.156 inch before the bottom front chamfer of the bolt carrier 702 over travels the notch 3632 in semi auto hammers. The approximate 2.85 inch length of the buffer 3503 prevents this over travel.

An approximately 0.188 inch standard over travel of the bolt head 3530 with respect to the bolt catch 3654 provides sufficient time to operate the bolt catch 3654, unless the cyclic rate of the firearm 700 increases. The cyclic rate can increase due to gas port erosion or the use of a sound suppressor. According to an embodiment, the over travel is increased to approximately 0.355 inch for greater reliability.

The additional approximately 0.360 inch bolt group travel reduces the rate of fire (cyclic rate) and increases the reliability of the firearm 700. The anti-bounce assembly, gas metering tube, and improved gas tube discussed herein also increase the reliability of the firearm 700.

FIG. 35 is a cross-sectional side view of a portion of a standard M16/M4 5.56 mm firearm 7000. The bolt locking lugs 3501, the carrier key 752, the buffer 3503, the cam 1301, the ramps 3505, the bolt 100, the barrel extension 3612, and the bolt carrier 702 are standard (contemporary). That is, the firearm 700 has not been modified according to an embodiment. The carrier key 752 has two screws 3571 that provide attachment of the carrier key 752 to the bolt carrier 702. FIG. 35 is provided to better facilitate a contrast with respect to embodiments described herein.

FIG. 36A is a cross-sectional side view of a portion of an M16/M4 5.56 mm and 6.8 mm firearm 700, according to an embodiment. FIG. 36A shows the use of the buffer 3503 that is 0.360 inch shorter than standard, the use of the carrier key 752 that is mounted via a single screw 3671 in a deeper cut carrier channel to facilitate the use of the anti-bounce assembly 1305.

The bolt carriers 702 in both FIG. 35 and FIG. 36A are shown in both the forwardmost (locked) and rearwardmost positions. These are the two extremes of travel for the bolt carrier 702.

The extended bolt locking lugs 3601, carrier key 752, buffer 3503, cam 1301, and ramps 3505 have been modified to provide more robust operation of the firearm 700. More particularly, a bolt 3610 having more robust extended bolt locking lugs 3601 and a barrel extension 3512 having more robust extended barrel locking lugs 4410. For example, the extended bolt locking lugs 3601 can be lengthened so as to provide at least approximately 1.3 times (such as approximately 1.35 times) the shear area as compared to those of the standard M16/M4 firearm (FIG. 35).

Figure 37A:
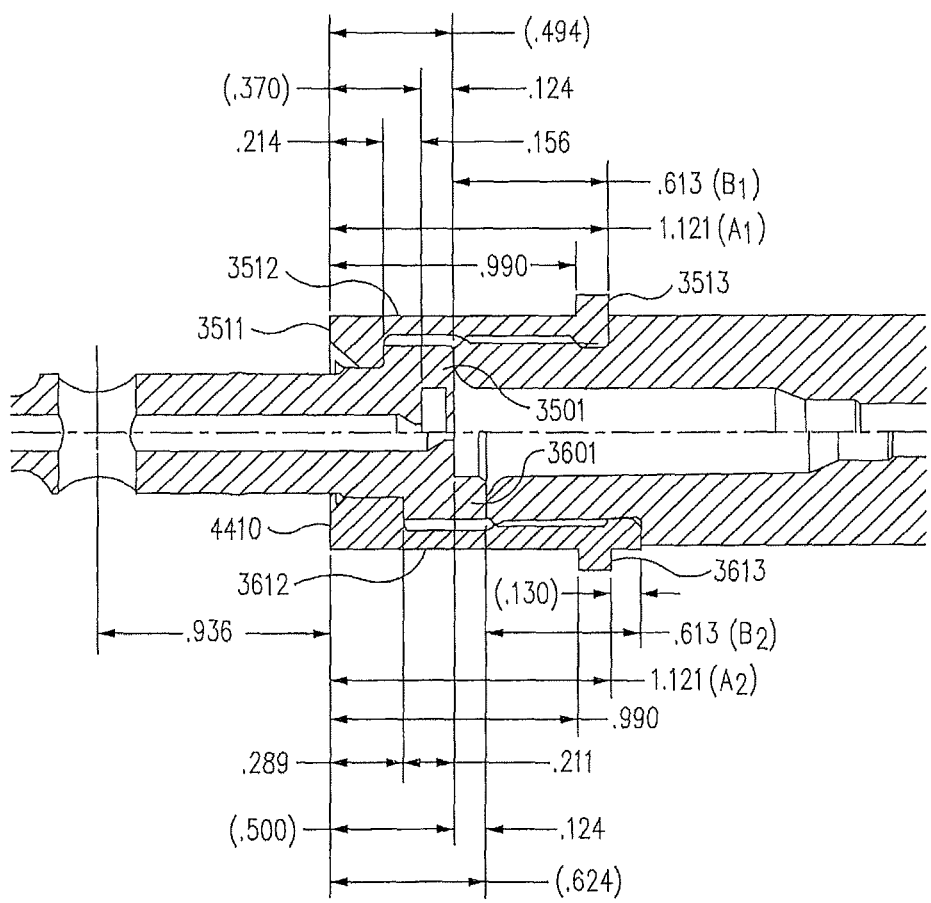
FIG. 37A is an enlarged cross-sectional side view showing the locking lugs of both the standard M16/M4 5.56 mm firearm (upper portion) and the more robust extended locking lugs of the improved M16/M4 5.56 mm and 6.8 mm firearm (lower portion), according to an embodiment.

FIG. 37A is an enlarged cross-sectional side view showing the unmodified or standard bolt locking lugs 3501 of the standard M16/M4 5.56 mm firearm in the upper portion of the figure and showing the more robust extended bolt locking lugs 3601 of the M16/M4 5.56 mm and 6.8 mm firearm, according to an embodiment, in the lower portion of the figure. The standard bolt locking lugs 3501 and the more robust extended bolt locking lugs 3601 are shown engaged with the complementary standard barrel extension locking lugs 3511 and the more robust extended barrel locking lugs 4410, respectively.

As shown in FIGS. 37A and 37B, a flange 3613 can be formed upon the barrel extension 3612 such that the flange 3613 is approximately 0.130 inch from a forward end of the barrel extension 3612. Thus, instead of the flange 3613 of an embodiment being at the forward end of the barrel extension 3612, as is the flange 3513 of a standard M16, the flange 3613 is rearward of the forward end of the barrel extension 3612 by an amount approximately equal to the added length of the bolt lugs 3601 and the barrel extension lugs 4410. In this manner, the threaded length of the barrel is maintained and the strength of the barrel is not compromised. This is done without requiring any change to the receiver body, the barrel nut, the fore end of the firearm, or the position of the gas block.

Figure 38:
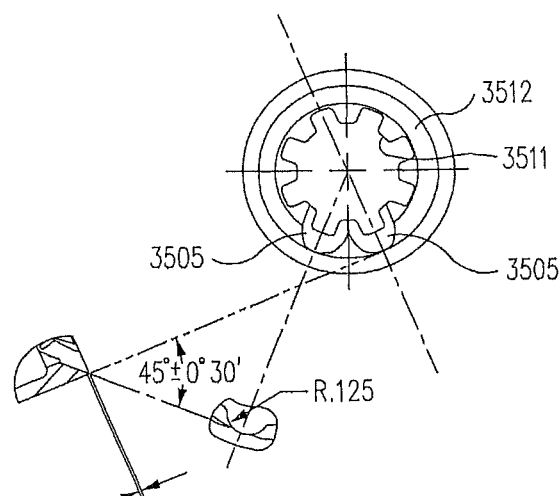
FIG. 38 is an end view showing the feed ramps of a standard, i.e. contemporary, M16/M4 5.56 mm firearm.

FIG. 38 shows the feed ramps 3505 and standard barrel locking lugs 3511 of the standard M16/M4 5.56 mm firearm 700. The feed ramps 3505 are formed in the barrel extension 3512. The narrower, steeper feed ramps 3505 decrease the reliability of the firearm 700 by allowing bullets to bounce high and occasionally miss the chamber, thus causing a feed jam.

Figure 39:
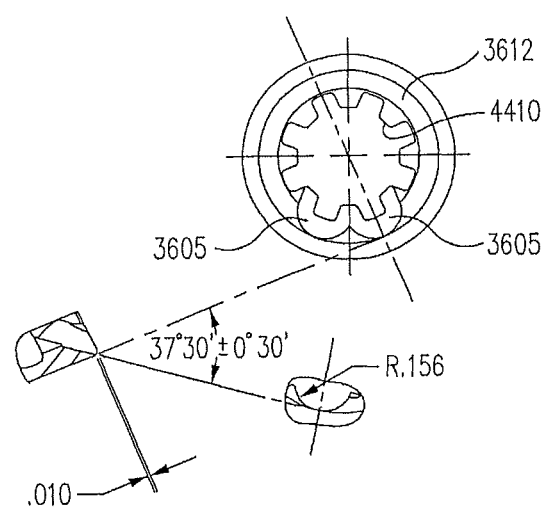
FIG. 39 is an end view showing the feed ramps of the M16/M4 5.56 mm and 6.8 mm firearm, according to an embodiment.

FIG. 39 is an end view showing the feed ramps 3605 and extended barrel locking lugs 4410 for an M16/M4 5.56 mm and 6.8 mm firearm 700, according to an embodiment. The feed ramps 3605 are formed in the barrel extension 3612. The stronger extended barrel locking lugs 4410 and the wider and longer (less steep) feed ramps 3605 facilitate more reliable operation of the firearm 700. The wider and longer feed ramps 3505 provide a better feed angle for the firearm 700 and are thus less likely to cause a jam. Examples of parameters used to define the wider and longer feed ramps 3505 are shown. For example, the length of the barrel extension locking lugs and feed ramps may be approximately 0.289 inch and the steepness may range from approximately 37 degrees to 45 degrees to reduce bullet bounce off the feed ramps (e.g., a ramp steepness of 37.5 degrees rather than the 45-degree ramp steepness of an M16 firearm or 52-degree ramp steepness for an M4 firearm).

Referring now to FIGS. 40-44, a rearwardly positioned gas port 1003 of a contemporary M16/M4 type of firearm 700 can be moved forward, away from the receiver, so as to increase the time between firing a cartridge and cycling the bolt of the firearm and so as to reduce the pressure used to cycle the firearm 700. The cyclic rate of the firearm 700 can be reduced and stress on components of the firearm 700 can be reduced. In this manner the reliability of the firearm 700 can be substantially enhanced, as discussed herein.

Figure 40:
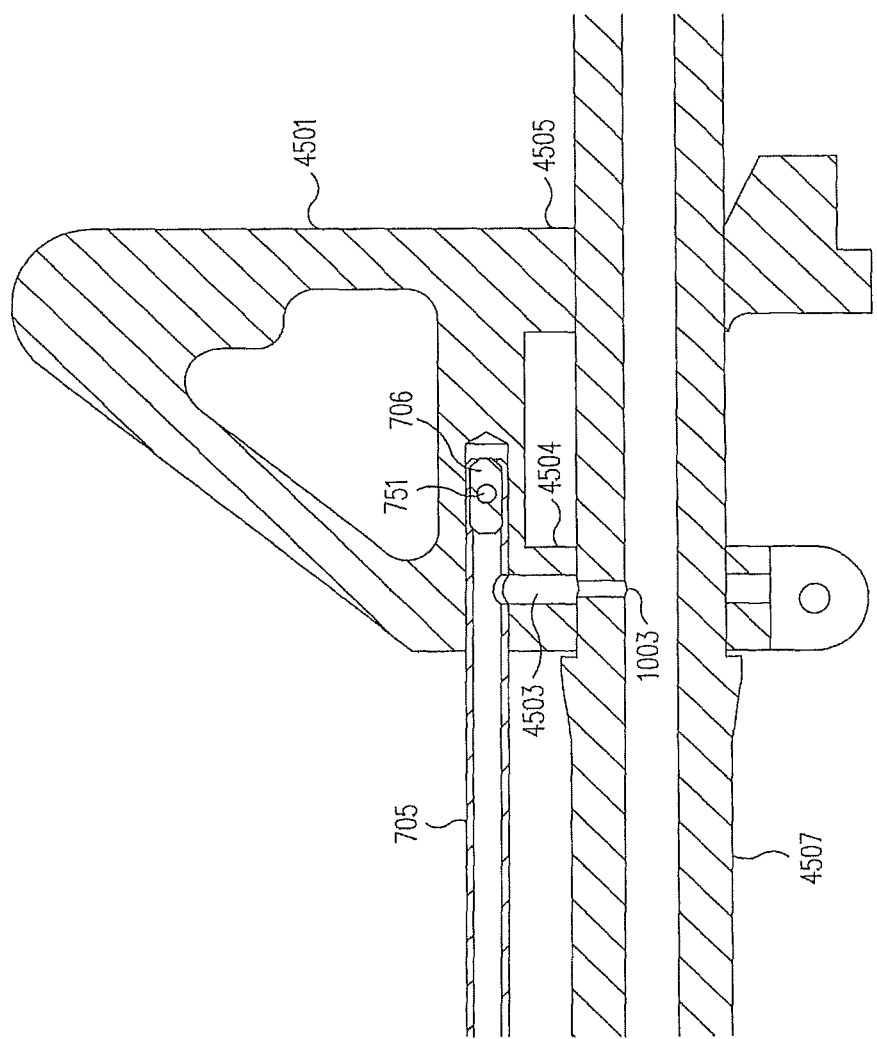
FIG. 40 shows the front sight block and gas tube of a standard, i.e. contemporary, M4 carbine.
Figure 41:
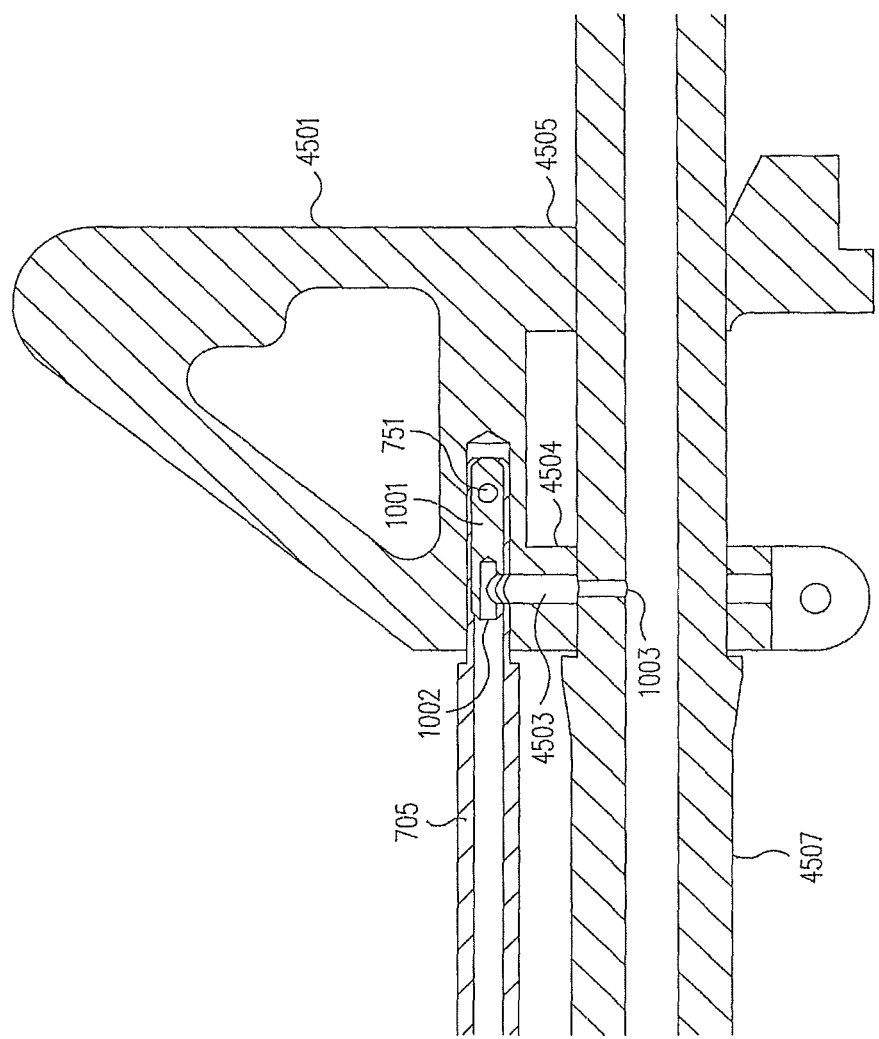
FIG. 41 shows a metering plug installed in a front sight block having the gas port in the standard location and showing the use of a thick wall gas tube, according to an embodiment.
Figure 42:
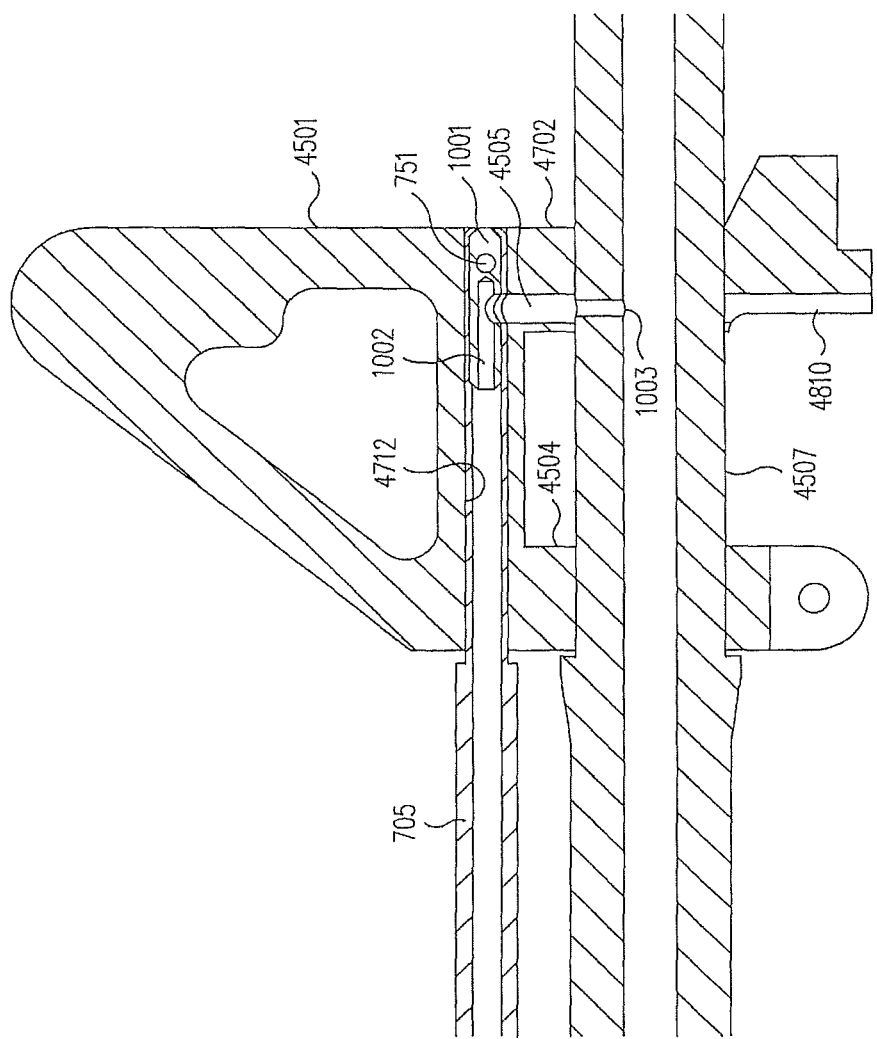
FIG. 42 shows a metering plug installed in a front sight block having the gas port moved to a forward location and showing the use of a thick wall gas tube, according to an embodiment.
Figure 43:
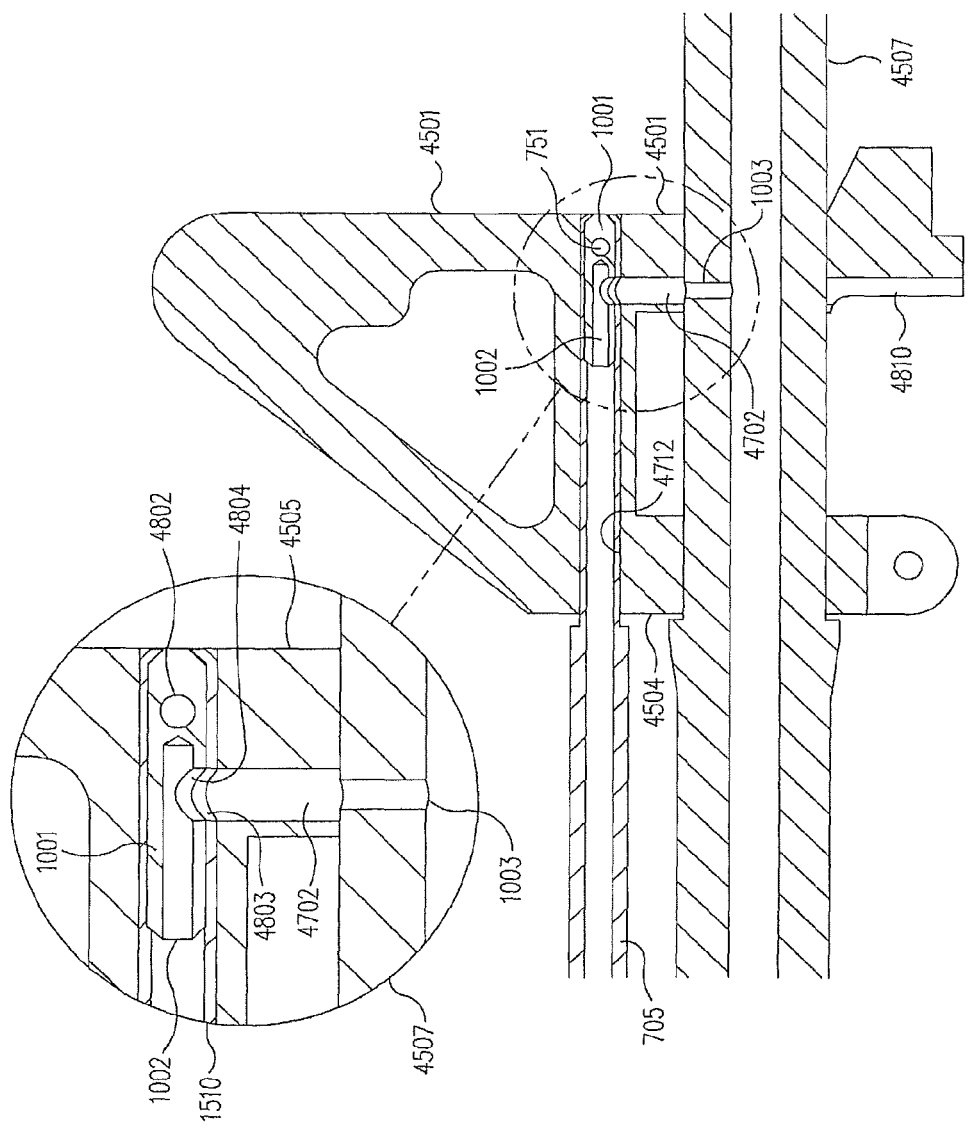
FIG. 43 shows a metering plug installed in a front sight block having the gas port moved to a forward location (with an enlarged view of the installed metering plug) and showing the use of a thick wall gas tube, according to an embodiment.
Figure 44:
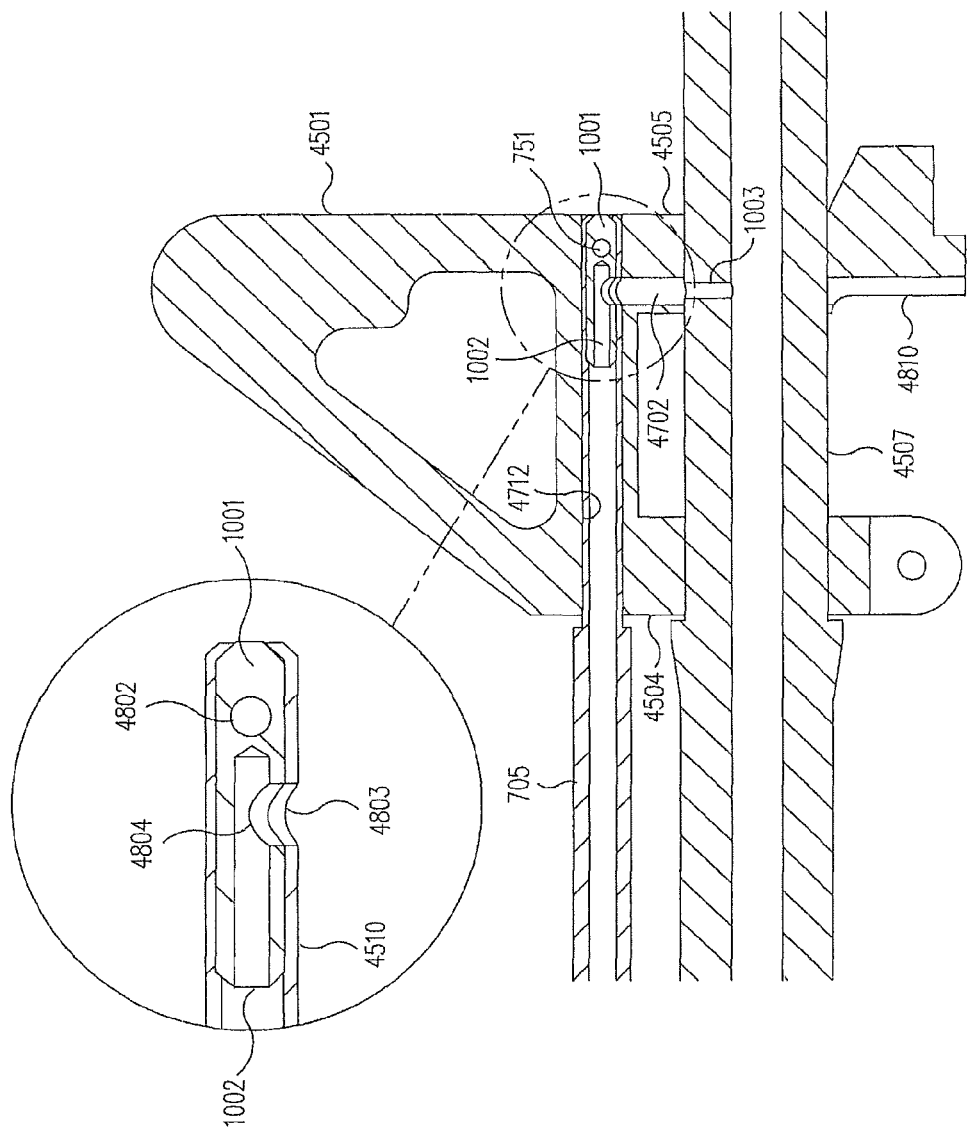
FIG. 44 shows a metering plug installed in a front sight block having the gas port moved to a forward location (with an enlarged view of the uninstalled metering plug and gas tube) and showing the use of a thick wall gas tube, according to an embodiment.

FIGS. 40 and 41 show the rearwardly positioned gas port 1003 as it is positioned in a contemporary M4 firearm. FIG. 41 additionally shows the use of the gas metering plug 1001, according to an embodiment. FIGS. 42-44 show the gas port 1003 moved forward as well as showing the use of the gas metering plug 1001, according to an embodiment.

With particular reference to FIG. 40, the front sight block (also know as a gas block or forging) 4501 and gas tube 705 of a contemporary firearm 700, i.e. an M4 carbine, are shown. Firearms of the M16/M4 family are constructed such that the rearwardly positioned gas port 1003 of the barrel 4507 is located proximate the rear band 4504 of the sight block 4501. Gas from the barrel 4507 passes through the rearwardly positioned gas port 1003 and through a gas passage 4503 in the rear band 4504 to reach the gas tube 705. The gas port 1003 performs the gas metering function and is subject to wear, thus causing problems as discussed herein.

With particular reference to FIG. 41, the gas port 1003 is again located proximate the rear band 4504 of the sight block 4501. The gas metering plug 1001 has been added to the gas tube 705 to regulate the flow of gas from the gas port 1003 to the gas cylinder 701 (FIG. 7), to compensate for wear of the gas port 1003 as discussed herein. Thus, the gas metering plug 1001 can be installed in a firearm 700 that has the gas port 1003 in the standard location, i.e. proximate the rear band 4504.

A thick wall gas tube 705 can additionally be used, according to an embodiment. The gas metering plug 1001 can be disposed within the front sight block 4501, such as within that portion of the thick wall gas tube 705 that is received within the front sight block 4501. The gas metering plug 1001 can be installed anywhere along the path of the gas from the gas port 1003 to the gas cylinder 701 as long as the gas metering plug 1001 is installed sufficiently far away from the gas port 1003 so as to not be substantially subject to wear cause by the hot gases and burning propellant.

With particular reference to FIGS. 42-44, a gas passage 4702 can be formed in the front band 4505 of the sight block 4501. Moving the gas passage 4702 to the front band 4505 allows the gas port 1003 to be moved forward in the barrel 4507, thus delaying the time at which the gas acts upon the piston 101 (FIG. 1) and decreasing the pressure of the gas. In this manner, the cyclic rate of the firearm 700 can be reduced and undesirable forces acting upon components of the firearm 700 can be reduced.

The gas port 1003 can be re-located to this more forward position without moving or changing the shape of the front sight block 4501 or the rear 4504 and front 4505 bands, which surround the barrel 4507 to attach the front sight block 4501 to the barrel 4507. The gas passage 4702 is drilled in the front band 4505 instead of in the rear band 4504. Clearance 4810 can be provided in the lower portion of the front band 4505 either prior to such drilling or by the drilling process itself so as to facilitate such drilling.

The rear band 4504 and the front band 4505 can be formed integrally with the front sight block 4501 (as a single forging or casting, for example). Alternatively, the rear band 4504 and the front band 4505 can be formed separately with respect to the front sight block 4501.

The gas port 1003 (FIG. 40) of a contemporary firearm was originally located in the rear band 4504 when the front sight block 4501 was designed for the longer barrel of the M16 rifle. Then, the same front sight block 4501 and the rearwardly positioned gas port 1003 configuration was used for the 5½ inch shorter carbine barrel. In the carbine, the front sight block 4501 was moved rearward 5½ inches (with respect to the rifle) to maintain the standard distance from the bayonet lug to the muzzle. The rearwardly positioned gas port 1003 was also moved rearward 5½ inches.

The distance from bullet start (firing) to the gas port determines the available pressure and the distance from gas port to the muzzle determines the time that pressure is available, thus the ratio between the two distances determines the impulse (force multiplied by time) of the gas system for the gun. The ratio for an 18½ inch bullet travel length of the rifle barrel is 63/37 (63% from the bullet start to the gas port and 37% from the gas port to the muzzle). The ratio for the 13 inch bullet travel length of the carbine barrel is 47/53. Since the ratio used for the rifle barrel proved to be reliable over decades of service, this reliability suggests that the distance from bullet start to the gas port used on the carbine barrel is two inches shorter than necessary to maintain the same ratio as the rifle. It thus indicates that the gas port is much closer to the firing chamber (bullet start position) in contemporary M16/M4 firearms than it needs to be.

Placing the gas port 1003 closer to the chamber causes the gas port 1003 (FIG. 46) to be subjected to higher pressure and temperature than necessary. This is because the closer the gas port 1003 is to the chamber, the higher the temperature and pressure to which the gas port 1003 is exposed. Higher temperatures and pressures undesirably cause more aggressive gas port erosion. Additionally, as the carbine's gas system starts unlocking the bolt while there is higher pressure in the chamber (compared to the rifle), the bolt's cam pin hole and standard bolt locking lugs 3501 are undesirably subjected to more stress, which can cause them wear prematurely, bind, and ultimately fail.

Without changing the external dimensions of the front sight block 4501 (these dimensions need to remain the same to accommodate the bayonet, tripod, barrel launched grenade and separate grenade launcher) a full two inch correction isn't feasible. However, it is feasible to reposition the gas port 1.23 inches further forward as discussed herein, thus gaining substantial benefit. Thus, by moving the barrel's gas port and the gas block's passageway hole from the rear band 1.23 inches forward into the front band 4505, problems associated with contemporary firearms can be substantially mitigated.

A bore 4712 can be formed in the front sight block 4501 for receiving the gas tube 705. The bore 4712 can extend completely through the front sight block 4501.

As best shown in FIGS. 43 and 44, the gas metering plug 1001 can comprise a bore or gas metering hole 1002 and an inlet 4804. The inlet 4804 and/or gas metering hole 1002 are sized and configured to provide the desire gas metering function. That is, either the inlet 4804, gas metering hole 1002, or both are configured to allow a desired amount of gas to flow from the gas port 1003 to the gas tube 705. The inlet 4804 and/or gas metering hole 1002 can define a fixed, calibrated orifice for determining the amount of gas flow through the gas metering plug 1001. Thus, the amount of gas used to cycle the firearm can be better controlled, e.g., can be fine tuned.

An opening 4803 can be formed in the gas tube 4791 to facilitate gas flow from the gas passage 4702 to the gas metering plug 1001. A hole 4802 can be provided through the gas metering plug 1001 and/or the gas tube 705 to facilitate attachment, e.g., pinning, of the gas tube 705 and/or the gas metering plug 1001 to the front sight block 4501.

Figure 45:
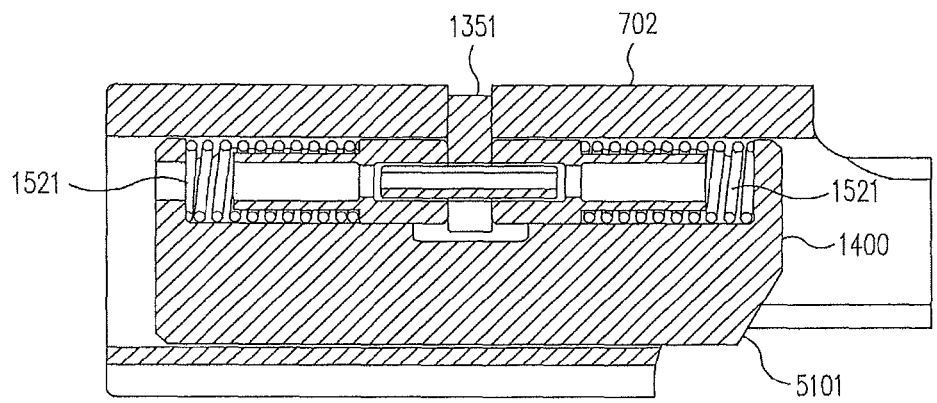
FIG. 45 shows the anti-bounce weight having a chamfer formed thereon to provide clearance for the hammer, according to an embodiment.

FIG. 45 shows the anti-bounce weight 1400 having a chamfer 5101 formed thereon to provide clearance for the hammer of the firearm 700, according to an embodiment. According to other embodiments, the chamfer 5101 can be omitted, such a when the anti-bounce weight 1400 will not interferer with desired movement of the hammer.

Figure 46:
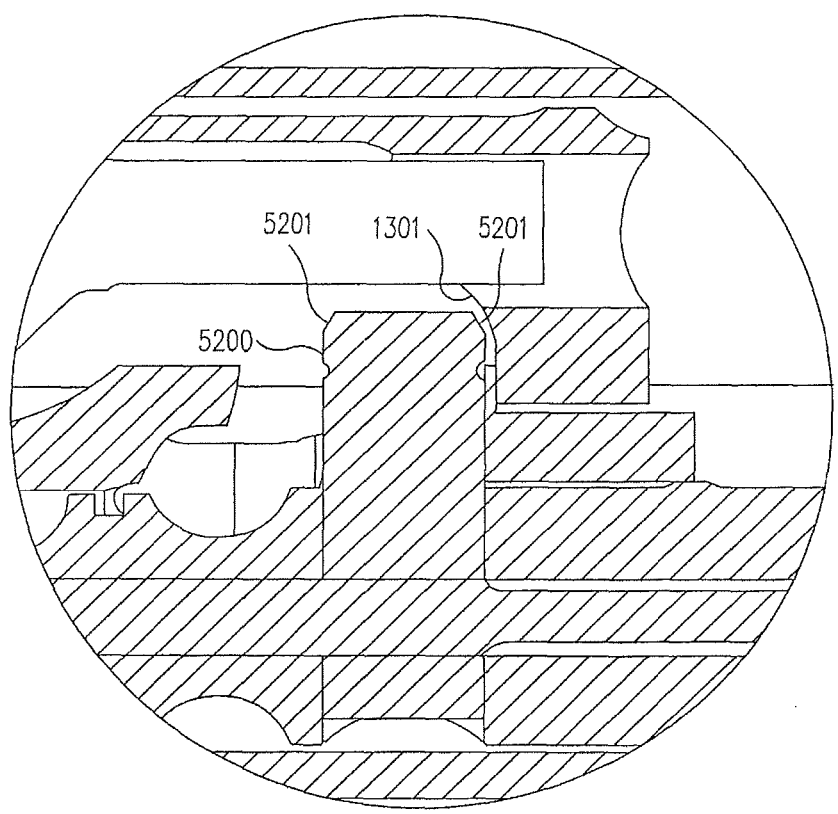
FIG. 46 shows a cam pin having a chamfer formed thereon to provide clearance for the cam, according to an embodiment.

FIG. 46 shows a cam pin 5200 having a chamfer 5201 formed thereon to provide clearance for the cam 1301, according to an embodiment. The chamfer 5201 can extend around the periphery of the end of the camp pin 5200 that extends into the cam 1301. The chamfer 5201 can be omitted in embodiments where tolerances permit.

One or more embodiments can be used in various different gas operated rifles, carbines, pistols, and the like. Although embodiments are discussed herein with respect to the M16/M4 and HK416, such discussion is by way of illustration only and not by way of limitation. Various embodiments can be used with various gas operated firearms, including rifles, carbines, and pistols.

One or more of the embodiments described herein can be used to modify standard M16/M4 firearms. The embodiments can mitigate problems with the M16/M4 firearms and/or can enhance the performance of M16/M4 firearms. The embodiments tend to required little change to the production gun or its production tooling, so that an M16/M4 manufacturer can, with comparatively little expense and effort, convert the fifty-two year old design of the M16 into a higher performance product. This higher performance product can reliably fire the SureFire 60 and 100 round high capacity magazines. These high capacity magazines provide one to three times the firepower of the present twenty shot standard magazines. Thus, such high capacity magazines can be used the without burning out the gas tube, piston rings, or barrel gas port and without increasing the cycle rate beyond a point where the magazine can reliably feed. Such embodiments can be provided with small, cheap, easy modifications to standard M16 and M4 production parts.

More robust long lugs are provided so that the firearm can fire a more powerful cartridge, such as the 6.8 mm cartridge. The 6.8 mm cartridge applies 1.3 times the force on the lugs as compared to the 5.56 cartridge, which the firearm was originally designed to use. The increased surface are of the lugs is provided by lengthening the bolt lugs and barrel extension lugs 1.35 times. This provides the greater shear area and longer feed ramps, as discussed herein.

The more robust locking lugs are provided without moving the breach of the barrel forward. Moving the breach of the barrel forward would undesirably either shorten the threaded length of the barrel and reduce the strength of the barrel attachment to the barrel extension or would require a longer barrel extension which would need an unwanted change to the main gun body.

Rather, according to an embodiment, the barrel extension's inner length and overall length are changed, while leaving the outer length of the rearward face to the flange the same. No change to the main gun body, barrel nut assembly and forward assembly, sight block or gas tube is needed.

The features described herein can be used individually or in any desired combination to provide a safer, more reliable firearm. One or more of these features can be used to modify an existing firearm. One or more of these features can be used to manufacture a new firearm.

Comparisons are made herein to the standard M16. For such comparisons, the standard M16 can be the M16 manufactured by FN Manufacturing LLC (FNM), PO Box 24257, Columbia, S.C. 29224.

Comparisons are made herein to the standard M4. For such comparisons, the standard M4 can be the M4 carbine manufactured by Colt's Manufacturing Company Inc., Firearms Division PO Box 1868, Hartford, Conn. 06144.

The standard M16 can be that defined by any M16 rifle Technical Data Package (TDP) adopted by the US Military as the standard for the M16 rifle, M4 carbine, or AR15 civilian model. The standard M4 can be that defined by an M4 carbine TDP adopted by the US Military as the standard when features differ from those of the M16 rifle TDP.

A firearm can comprise: a bolt having a plurality of locking lugs, the locking lugs being configured to have a shear area that is at least approximately 1.3 times that of a standard M16/M4; a piston formed on the bolt and having a plurality of rings configured to cooperate with the piston to mitigate gas leakage past the piston, each of the rings having a key formed thereon and a gap formed therein such that the gap of one ring is configured to receive at least a portion of the key of another ring; a bolt carrier to which the bolt is movably attached, the bolt carrier having a double cut cam, the double cut cam having a starting point in an unlocked position of the bolt that is substantially the same as the standard M16 cam and having an unlocking cam surface that has sufficient dwell increase to delay a start of unlocking when the bolt carrier is used in an M16/M4 rifle or carbine; a weight movably disposed within the bolt carrier, the weight being configured to inhibit rearward and forward bouncing of the bolt carrier; a carrier key attached to the bolt carrier and configured to facilitate a stroke of the bolt carrier that is approximately 0.360 inch longer than that of the standard M16/M4; a buffer having a length that is approximately 0.360 inch shorter than a standard buffer for the M16/M4 buffer; a tube configured to provide gas from a barrel of the firearm to the piston via the carrier key, the tube having a heat radiator formed on at least a portion of the tube; a gas metering plug having a gas metering hole configured to meter gas from the barrel of a firearm to the bolt carrier of the firearm, wherein the gas metering hole is located away from a gas port of the firearm; and a front sight block having a rear band and a front band for attaching the sight block to the barrel and having a gas passage formed in the front band for facilitating gas flow from the barrel to a gas tube of the firearm.

A bolt group can comprise: a bolt having a plurality of locking lugs, the locking lugs being configured to have a shear area that is at least approximately 1.3 times that of a standard M16/M4; a piston formed on the bolt and having a plurality of rings configured to cooperate with the piston to mitigate gas leakage past the piston, each of the rings having a key formed thereon and a gap formed therein such that the gap of one ring is configured to receive at least a portion of the key of another ring; a bolt carrier to which the bolt is movably attached, the bolt carrier having a double cut cam, the double cut cam having a starting point in an unlocked position of the bolt that is substantially the same as the standard M16 cam and having an unlocking cam surface that has sufficient dwell increase to delay a start of unlocking when the bolt carrier is used in an M16 rifle or an M4 carbine; a weight movably disposed within the bolt carrier, the weight being configured to inhibit rearward and forward bouncing of the bolt carrier; and a carrier key attached to the bolt carrier and configured to facilitate a stroke of the bolt carrier that is approximately 0.360 inch longer than that of the standard M16/M4.

A device can comprise: a ring configured to cooperate with a piston of a gas operated firearm to mitigate gas leakage past the piston; a key formed upon the ring; and a gap formed in the ring and configured to receive at least a portion of a key of another ring; wherein the key is substantially opposite the gap on the ring; wherein the key and the gap are formed such that a pair of the rings is nestable with the key of each of the rings disposed within the gap of each other of the rings; wherein the key is substantially rectangular in cross-section; wherein the gap is substantially rectangular in cross-section; wherein the walls of the ring are substantially rectangular in cross-section; wherein the ring is formed of stainless steel; wherein the ring is configured to be received at least partially within a groove of the piston; wherein the device is a firearm.

A device can comprise: a piston for a gas operated firearm; a first ring configured to be received on the piston; a second ring configured to be received on the piston; and wherein the first ring and second ring are configured to interlock with one another such that the first ring and second ring rotate substantially in unison about the piston.

A method can comprise: placing one ring having a key and a gap on a piston of a gas operated firearm; placing another ring having a key and a gap on the piston; and wherein the key of each one of the rings is disposed at least partially within the gap of each of the other rings.

A method can comprise: mitigating gas leakage past a piston of a firearm using a plurality of rings, each one of the rings having a key formed thereon and a gap formed therein; and wherein the gap of one of the rings receives at least a portion of the key of another of the rings.

A device can comprise: a tube configured to provide gas from a barrel of a firearm to a piston of the firearm via the carrier key; and a heat radiator extending from at least a portion of the tube; wherein the heat radiator comprises fins that form a V-notch with approximately 60 degrees between opposing walls; wherein the heat radiator comprises threads;

The device wherein the tube has an outer diameter of 0.250 inch; wherein the tube is formed of 347 stainless steel; wherein the tube is configured for use on a firearm having a piston formed on a bolt of the firearm; wherein the tube is configured for use on a member of an M16/M4 family of firearms; wherein the tube is configured to receive gas from a barrel of a firearm that is a member of an M16/M4 family of firearms via a front sight of the firearm and to provide the gas to a bolt carrier of the firearm via a bolt carrier key, the tube having an outside interfacing diameter to the bolt carrier key of less than 0.1792 inches, the tube having a length from a front sight mounting hole thereof to a rear end thereof of less than 9.57 inches for an M4 type of firearm, and the tube having a length from a front sight mounting hole thereof to a rear end thereof of less than 14.95 inches for an M16 type of firearm; wherein the device is a firearm; wherein the threads are a uniform standard thread form; wherein the threads comprises helical threads. Therefore, thermal expansion clearance for sustained full auto fire with successive 60 and 100 round high capacity magazines is ensured.

A method can comprise: cutting a tube; forming a radiator on the tube; and installing the tube on a firearm such that the tube is configured to provide gas from a barrel of the firearm to a piston thereof; forming a first bend in the tube; and forming a second bend in the tube; wherein the heat radiator comprises threads; wherein the threads are uniform standard thread form; wherein the threads are formed on a portion of the tube away from ends of the tube; wherein the threads are not formed on ends of the tube; wherein the tube has an outer diameter of 0.250 inch; wherein the tube is formed of 347 stainless steel.

A device can comprise a tube configured to receive gas from a barrel of a firearm that is a member of an M16/M4 family of firearms via a front sight of the firearm and to provide the gas to a bolt carrier of the firearm via a bolt carrier key, the tube having an outside interfacing diameter to the bolt carrier key of less than 0.1792 inches to insure thermal expansion clearance for sustained full auto fire with successive 60 and 100 round high capacity magazines.

A device can comprise a tube configured to receive gas from a barrel of a firearm that is a member of an M4 family of firearms via a front sight of the firearm and to provide the gas to a bolt carrier of the firearm via a bolt carrier key, the tube having a length from a front sight mounting hole thereof to a rear end thereof of less than 9.57 inches to insure thermal expansion clearance for sustained full auto fire with successive 60 and 100 round high capacity magazines.

A device can comprise a tube configured to receive gas from a barrel of a firearm that is a member of an M16 family of firearms via a front sight of the firearm and to provide the gas to a bolt carrier of the firearm via a bolt carrier key, the tube having a length from a front sight mounting hole thereof to a rear end thereof of less than 14.95 inches to insure thermal expansion clearance for sustained full auto fire with successive 60 and 100 round high capacity magazines.

A method can comprise: providing gas from a barrel of a firearm to a piston of the firearm; and wherein a heat radiator extends from at least a portion of the tube.

A device can comprise: a gas metering hole configured to meter gas from a barrel of a firearm to a bolt carrier of the firearm; and wherein the gas metering hole is located away from a gas port of the firearm; wherein the gas metering hole is located sufficiently away from the gas port of the firearm so as to be substantially unaffected by erosion; wherein the gas metering hole is located sufficiently away from the gas port of the firearm so as to be substantially unaffected by erosion caused by scrubbing of passing bullets and/or bombardment of propellant grains; wherein the gas metering hole is configured such that gas passes therethrough prior to entering a gas tube of the firearm; wherein the gas metering hole is smaller than a gas port of the firearm; wherein the gas metering hole is formed in a plug at a front of a gas tube; wherein the gas metering hole is formed of a heat resistant material; wherein the device is a firearm.

A method can comprise: placing a gas metering hole in a path of gas from a barrel of a firearm to a bolt carrier of the firearm; wherein the gas metering hole is located away from a gas port of the firearm; and wherein the gas metering hole is configured to meter gas.

A method can comprise: metering gas from a barrel of a firearm through a gas metering hole; providing the gas to a bolt carrier of the firearm; and wherein the gas metering hole is located away from a gas port of the firearm.

A device can comprise: a front sight block for a firearm; a rear band and a front band for attaching the sight block to a barrel of the firearm; and a gas passage formed in the front band for facilitating gas flow from the barrel to a gas tube of the firearm; the device wherein the gas passage is configured to substantially align with a gas port of the barrel and to receive gas from the gas port; can comprise a gas metering plug configured to be received within the front sight block and configured to meter gas from the gas port; wherein the gas metering plug comprises a fixed orifice; wherein the gas metering plug comprises a calibrated orifice; can comprise a gas tube configured to mate with the front sight block; can comprise a heat exchanger formed upon the gas tube; can comprise threads formed upon the gas tube; wherein the front sight block is configured for use with a member of the M16/M4 family of firearms; wherein the device is a firearm.

A method can comprise: forming a gas passage in a front band of a front sight block; forming a gas port in a barrel; and attaching the front sight block to the barrel such that the gas passage is substantially aligned with respect to the gas port; the device can comprise installing a gas metering plug in the front sight block; the device can comprise can comprise installing a gas metering plug in the gas tube and installing the gas tube partially within the front sight block.

A method can comprise: communicating gas from a barrel of a firearm to a gas tube of the firearm; and wherein the gas is communicated through a front band of a front sight block; the device can comprise metering gas through a gas metering plug.

A device can comprise: a bolt carrier; a double cut cam formed in the bolt carrier; and wherein the cam has a starting point in an unlocked position of the bolt that is substantially the same as the standard M16 cam and has an unlocking cam surface that has sufficient dwell increase to delay a start of unlocking when the bolt carrier is used in an M16 rifle or an M4 carbine; wherein the device is a firearm.

A method can comprise: assembling a bolt carrier into a firearm; wherein a double cut cam is formed in the bolt carrier; and wherein the double cut cam has a starting point in an unlocked position of the bolt that is substantially the same as the standard M16 cam and has an unlocking cam surface that has sufficient dwell increase to delay a start of unlocking when the bolt carrier is used in an M16 rifle or an M4 carbine.

A method can comprise: moving a double cut cam with respect to a cam pin from an unlocked position of a bolt to a locked position of the bolt; and wherein the double cut cam has a starting point in the unlocked position of the bolt that is substantially the same as the standard M16 cam and has an unlocking cam surface that has sufficient dwell increase to delay a start of unlocking when the bolt carrier is used in an M16 rifle or an M4 carbine.

A device can comprise: a bolt carrier; a weight movably disposed within the bolt carrier; and wherein the weight is configured to inhibit rearward and forward bouncing of the bolt carrier; wherein the weight is configured to slide within the bolt carrier; wherein the weight is configured to impact an anvil after the bolt carrier begins to bounce away from a forwardmost position of the bolt carrier so as to inhibit bouncing of the bolt carrier; wherein the weight is configured to impact an anvil after the bolt carrier begins to bounce away from a rearwardmost position of the bolt carrier so as to inhibit bouncing of the bolt carrier; wherein the weight is configured to impact an anvil after a bolt engages bolt lugs of a firearm so as to inhibit bouncing of the bolt carrier; wherein the weight is configured to impact an anvil after a buffer of the bolt carrier contacts a rear wall of a receiver of a firearm so as to inhibit bouncing of the bolt carrier; the device can comprise: a cavity formed within the bolt carrier and within which the weight slides; and at least one spring configured to generally center the weight within the cavity; the device can comprise: a cavity formed within the bolt carrier and within which the weight slides; two springs configured to generally center the weight within the cavity; and two plungers upon which the springs are disposed; wherein the weight is generally cylindrical in shape; the device can comprise: a first cavity formed within the bolt carrier and within which the weight slides; two springs configured to generally center the weight within the first cavity; two plungers upon which the springs are disposed; a second cavity and a third cavity formed within the weight, one spring and one plunger being disposed within each of the second cavity and the third cavity; and wherein the second cavity and the third cavity have blocking shoulders that prevent the plunger disposed therein from moving beyond a centered position of the plunger so that when inertia moves the weight beyond a centered position of the weight one plunger compresses a spring to return the weight to center while the other plunger and spring are blocked from acting upon the weight; The device as recited in claim 76, further can comprise an anvil configured to hold the weight, the springs, and the plungers within the bolt carrier; wherein the weight is configured to impact against the anvil during forward and rearward travel of the weight; the device can comprise a pin configured to hold the anvil at least partially within the bolt carrier; wherein the bolt carrier is configured for use in a firearm selected from the group consisting of: a member of an M16/M4 family of firearms; a copy of a member of an M16/M4 family of firearms; and any firearm in which the bolt carrier will function; wherein the bolt carrier is modified to function in guns that are driven by an operating rod and piston; wherein the device is a firearm.

A method can comprise: providing a bolt carrier; movably disposing a weight within the bolt carrier; and wherein the weight is configured to inhibit rearward and forward bouncing of the bolt carrier; wherein the weight is configured to slide within the bolt carrier; wherein the weight is configured to impact an anvil after the bolt carrier begins to bounce away from a forwardmost position of the bolt carrier so as to inhibit bouncing of the bolt carrier; wherein the weight is configured to impact an anvil after the bolt carrier begins to bounce away from a rearwardmost position of the bolt carrier so as to inhibit bouncing of the bolt carrier; wherein the weight is configured to impact an anvil after the bolt engages bolt lugs of a firearm so as to inhibit bouncing of the bolt carrier; wherein the weight is configured to impact an anvil after a buffer of the bolt carrier contacts a rear wall of a receiver of a firearm so as to inhibit bouncing of the bolt carrier; the device can comprise: forming a cavity formed within the bolt carrier such that the weight is slidable with the cavity; and centering the weight within the cavity using at least one spring; the device can comprise: forming a first cavity within the bolt carrier such that the weight is slidable with the first cavity; centering the weight within the first cavity using two springs that are disposed upon two plungers; and wherein the weight comprises a second cavity and the third cavity that each have one of the plungers and one of the springs disposed therein and that have blocking shoulders that prevent the plunger disposed therein from moving beyond a centered position of the plunger so that when inertia moves the weight beyond a centered position of the weight one plunger compresses a spring to return the weight to center while the other plunger and spring are blocked from acting upon the weight; wherein the weight is generally cylindrical in shape; the device can comprise: forming a first cavity within the bolt carrier such that the weight is slidable with the first cavity; forming a second cavity and a third cavity within the weight; centering the weight within the first cavity using two springs that are disposed upon two plungers; wherein one of the springs and one of the plungers are disposed within each of the second cavity and the third cavity; and wherein the second cavity and the third cavity have blocking shoulders that prevent the plunger disposed therein from moving beyond a centered position of the plunger so that when inertia moves the weight beyond a centered position of the weight one plunger compresses a spring to return the weight to center while the other plunger and spring are blocked from acting upon the weight; the device can comprise using an anvil to hold the weight, the springs, and the plungers within the bolt carrier; wherein the weight is configured to impact against the anvil during forward and rearward travel of the weight; the device can comprise using a pin to hold the anvil at least partially within the bolt carrier; wherein the bolt carrier is configured for use in a member of an M16/M4 family of firearms.

A method can comprise: firing a firearm so as to cause a weight to move within a bolt carrier; and wherein the weight is configured to inhibit rearward and forward bouncing of the bolt carrier; wherein the weight is configured to slide within the bolt carrier; wherein the weight is configured to impact an anvil after the bolt carrier begins to bounce away from a forwardmost position of the bolt carrier so as to inhibit bouncing of the bolt; wherein the weight is configured to impact an anvil after the bolt carrier begins to bounce away from a rearwardmost position of the bolt carrier so as to inhibit bouncing of the bolt carrier; wherein the weight is configured to impact an anvil after the bolt engages bolt lugs of a firearm so as to inhibit bouncing of the bolt carrier; wherein the weight is configured to impact an anvil after a buffer of the bolt carrier contacts a rear wall of a receiver of a firearm so as to inhibit bouncing of the bolt carrier; wherein: the weight slides within a cavity formed within the bolt carrier; and at least one spring generally centers the weight within the cavity; wherein: the weight slides within a cavity formed within the bolt carrier; two springs generally center the weight within the cavity; the two springs are disposed within two cavities upon two plungers; and wherein the two cavities have blocking shoulders that prevent the plunger disposed therein from moving beyond a centered position of the plunger so that when inertia moves the weight beyond a centered position of the weight one plunger compresses one spring to return the weight to center while the other plunger and the other spring are blocked from acting upon the weight; wherein the weight is generally cylindrical in shape; wherein: the weight slides within a first cavity formed within the bolt carrier; two springs generally center the weight within the first cavity; the two springs are disposed upon two plungers; one of the springs and one of the plungers are disposed within each of a second cavity and a third cavity formed in the weight; and wherein the second cavity and the third cavity have blocking shoulders that prevent the plunger disposed therein from moving beyond a centered position of the plunger so that when inertia moves the weight beyond a centered position of the weight one plunger compresses a spring to return the weight to center while the other plunger and spring are blocked from acting upon the weight; the device can comprise holding the weight, the springs, and the plungers within the bolt carrier using an anvil; wherein the weight is configured to impact against the anvil during forward and rearward travel of the weight; the device can comprise holding the anvil at least partially within the bolt carrier using a pin; wherein the bolt carrier is configured for use in a member of an M16/M4 family of firearms.

A device can comprise a bolt carrier having a weight disposed therein so as to inhibit both forward and rearward bouncing of the bolt carrier.

A method can comprise sliding a weight within a bolt carrier so as to inhibit both forward and rearward bouncing of the bolt carrier.

A device can comprise: a bolt for an M16/M4 firearm, the bolt can comprise: a plurality of locking lugs formed upon the bolt; a barrel extension; a plurality of locking lugs formed upon the barrel extension; wherein the locking lugs are configured to have a shear area that is at least approximately 1.3 times that of a standard M16/M4; wherein the shear area is increased with respect to that of a standard M16/M4 by lengthening the locking lugs; the device can comprise: a flange formed upon the barrel extension such that the flange is approximately 0.130 inch from a forward end of the barrel extension; a carrier key configured to facilitate a stroke of a bolt carrier within which the bolt is partially disposed, the carrier key being approximately 0.360 inch longer than that of a standard M16/M4; and a buffer having a length that is approximately 0.360 inch shorter buffer than a standard buffer for the M16/M4 buffer; wherein the device is a firearm.

A bolt group can comprise: a bolt having a plurality of locking lugs; and wherein the locking lugs are configured to have a shear area that is at least approximately 1.3 times that of a standard M16/M4; wherein the shear area is increased with respect to that of the standard M16/M4 by lengthening the locking lugs; the device can comprise: a bolt catch; and wherein an over travel of the bolt catch is approximately 0.355 inch so as to provide sufficient time for the bolt catch to engage in an event of increased fire rate; wherein a travel of the bolt is increased by 0.360 inch with respect to the travel of the standard M16/M4 to reduce a rate of fire of a firearm.

A method can comprise: assembling a bolt for an M16/M4 firearm into the firearm; and wherein the bolt comprises a plurality of locking lugs configured to have a shear area that is at least approximately 1.3 times that of a standard M16/M4.

A method for operating a firearm, the method can comprise: engaging locking lugs of a bolt with complementary locking lugs of a barrel extension; and wherein the locking lugs of the bolt and the locking lugs of the barrel extension are configured to have a shear area that is at least approximately 1.3 times that of the shear area of a standard M16/M4; wherein the shear area is increased with respect to that of the standard M16/M4 by lengthening the locking lugs; the device can comprise moving the bolt with an over travel of the bolt catch of approximately 0.355 inch so as to provide sufficient time for the bolt catch to engage in the event of increased gas pressure, firing rate, or bolt group travel speed; the device can comprise moving the bolt with a travel that is increased by 0.360 inch with respect to the travel of the standard M16/M4 to reduce a rate of fire of a firearm; the device can comprise feeding cartridges via two feed ramps that are longer and wider than feed ramps of the standard M16/M4; the device can comprise unlocking the bolt after approximately the same delay and at approximately the same pressure drop as that of the standard M16 using a double cut cam.

A device can comprise: a carrier key configured to facilitate a stroke of the bolt carrier that is approximately 0.360 inch longer than that of a standard M16/M4; and a buffer having a length that is approximately 0.360 inch shorter buffer than a standard buffer for the M16/M4 buffer; wherein the carrier key is configured to attach to a bolt carrier with only one fastener; wherein the carrier key is configured to avoid interference with a portion of a lower receiver when the carrier and key are in a rearmost position; wherein the device is a firearm.

A method can comprise: attaching a carrier key to a bolt carrier for an M16/M4 firearm, wherein the carrier key is configured to facilitate a stroke of the bolt carrier that is approximately 0.360 inch longer than that of a standard M16/M4; and placing a buffer in the firearm, the buffer having a length that is approximately 0.360 inch shorter buffer than a standard buffer for the M16/M4 buffer.

A method can comprise: cycling a bolt carrier for an M16/M4 firearm, wherein the carrier key is configured to facilitate a stroke of the bolt carrier that is approximately 0.360 inch longer than that of a standard M16/M4; and wherein the bolt carrier abuts a buffer having a length that is approximately 0.360 inch shorter buffer than a standard buffer for the M16/M4 buffer.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A bolt carrier assembly, comprising:
a bolt comprising an extractor and an extractor spring;
an extractor pin disposed in the bolt, the extractor pin comprising first and second ends and a central portion that extends between the first and second ends, wherein a diameter of each of the first and second ends is larger than a diameter of the central portion;
a bolt carrier with an unlocking cam surface;
wherein the unlocking cam surface is arranged such that when the bolt, relative to the bolt carrier, is in its most forward unlocked position, the extractor pin is fully exposed and not retained by the bolt carrier; and
wherein the extractor and the extractor spring cooperate to provide a force on the extractor pin that misaligns the extractor pin with a hole in the extractor such that the extractor pin, being stepped and in combination with the extractor spring and the extractor, acts as a detent to retain the extractor pin in the bolt.

2. The bolt carrier assembly of claim 1, wherein the bolt comprises a plurality of locking lugs, the locking lugs being configured to each have a length of approximately 0.335 inches.

3. The bolt carrier assembly of claim 2, wherein the unlocking cam surface is configured to have a dwell of approximately 0.132 inch, instead of a dwell of 0.070 inch, to delay the start of unlocking of the locking lugs by at least an additional 0.060 inch of bolt carrier travel.

4. The bolt carrier assembly of claim 1, wherein the unlocking cam surface is a surface of a double cut cam.

5. A firearm comprising the bolt carrier assembly of claim 1, wherein the firearm further comprises a piston formed on the bolt.

6. The firearm of claim 5, wherein the bolt comprises:
a plurality of rings configured to cooperate with the piston to mitigate gas leakage past the piston, each of the rings having a key formed thereon and a gap formed therein such that the gap of one ring is configured to receive at least a portion of the key of another ring;

wherein the plurality of rings comprises a pair of rings that are formed and maintained as a matched set such that each key has a height that is substantially the same as a thickness of the corresponding mating ring.

7. The firearm of claim 6, further comprising a tube configured to provide gas from a barrel of the firearm to the piston via a carrier key attached to the bolt carrier, the tube having a heat radiator formed on at least a portion of the tube.

8. The firearm of claim 7, wherein the heat radiator comprises threads on the tube, the threads having a triangular shape.

9. A bolt carrier assembly for use in a firearm, the bolt carrier assembly comprising:
a bolt carrier;
a bolt having an extractor, an extractor pin, an extractor spring, and locking lugs;
wherein the locking lugs are configured to have a length such that when the bolt, relative to the bolt carrier, is in its most forward unlocked position the extractor pin is fully exposed and not retained by the bolt carrier;
wherein the extractor pin comprises first and second ends and a central portion that extends between the first and second ends, with a diameter of each of the first and second ends larger than a diameter of the central portion; and
wherein the extractor and the extractor spring cooperate to provide a force on the extractor pin that misaligns the extractor pin with a hole in the extractor such that the extractor pin, being stepped and in combination with the extractor spring and the extractor, acts as a detent to retain the extractor pin in the bolt.

10. The bolt carrier assembly of claim 9, wherein a length of each of the locking lugs is approximately 0.335 inches.

11. The bolt carrier assembly of claim 9, wherein the bolt carrier comprises an unlocking cam surface that has a dwell of approximately 0.132 inch to delay the start of unlocking of locking lugs by at least an additional 0.060 inch of bolt carrier travel.

12. The bolt carrier assembly of claim 9, further comprising a carrier key attached to the bolt carrier, wherein the carrier key has a length so that the carrier key facilitates an over travel of at least 0.188 inch.

13. A firearm comprising the bolt carrier assembly of claim 12, the firearm further comprising:
a piston formed on the bolt and having a plurality of rings configured to cooperate with the piston to mitigate gas leakage past the piston;
each of the rings having a key formed thereon and a gap formed therein such that the gap of one ring is configured to receive at least a portion of the key of another ring;
wherein the plurality of rings comprises a pair of rings that are formed and maintained as a matched set such that each key has a height that is substantially the same as a thickness of its mating ring; and
a gas tube configured to provide gas from a barrel of the firearm to the piston via the carrier key.

14. A barrel extension comprising:
locking lugs configured to engage with corresponding locking lugs of a bolt having an extractor, an extractor pin, and an extractor spring such that when the bolt, relative to a bolt carrier, is in its most forward unlocked position, the extractor pin is fully exposed and not retained by the bolt carrier;
wherein the extractor in comprises first and second ends and a central portion that extends between the first and second ends, with a diameter of each of the first and second ends larger than a diameter of the central portion; and
wherein the extractor and the extractor spring cooperate to provide a force on the extractor pin that misaligns the extractor pin with a hole in the extractor such that the extractor pin being stepped so that, in combination with the extractor spring and the extractor, acts as a detent to retain the extractor pin.

15. A firearm comprising the barrel extension of claim 14, the firearm further comprising:
the bolt;
the bolt carrier;
a carrier key attached to the bolt carrier; and
wherein the carrier key has a length that facilitates increased travel of at least 0.192 inch to maintain at least 0.188 inch bolt catch over travel.

16. The firearm of claim 15, further comprising
a tube configured to provide gas from a barrel of the firearm via the carrier key to a piston of the firearm; and
a heat radiator formed on at least a portion of the tube, wherein the heat radiator comprises threads having a triangular shape on the tube.

17. The barrel extension of claim 14, further comprising feed ramps having a length and a steepness, wherein the length of the feed ramps is at least approximately 0.289 inch, and wherein the steepness is approximately 37.5 degrees to reduce bullet bounce off the feed ramps that would occur with 45-degree ramps.

18. A firearm comprising:
a bolt carrier;
a bolt movably attached to the bolt carrier, the bolt having an extractor, an extractor pin, and an extractor spring;
wherein the extractor pin comprises first and second ends and a central portion that extends between the first and second ends, wherein a diameter of each of the first and second ends is larger than a diameter of the central portion; and
wherein the extractor and the extractor spring cooperate to provide a force on the extractor pin that misaligns the extractor pin with the hole in the extractor such that the extractor pin, being stepped and in combination with the extractor spring and the extractor, acts as a detent to retain the extractor pin in the bolt.

19. The firearm of claim 18, further comprising:
a pair of mating rings configured to cooperate with a piston of a gas operated the firearm to mitigate gas leakage past the piston, each ring comprising:
a key formed on the ring, the key spanning an angular distance, in a direction around the ring, of less than 10 degrees;
a gap formed in the ring and configured to receive the key of the mating ring, the gap spanning an angular distance, in a direction around the ring, of less than 30 degrees; and
wherein the pair of mating rings are maintained as a matched set such that each key has a height that is equal to a thickness of its mating ring.

20. A method of making the pair of mating rings of claim 19, the method comprising:
forming the key and the gap on each ring;
combining the pair of mating rings as a matched set such that the gap of the ring receives the key of the mating ring; and
lapping the pair of mating rings such that the key has a height of a thickness of the mating ring.

21. The firearm comprising of claim 18, wherein:
the bolt comprises locking lugs configured to have a length such that when the bolt, relative to the bolt carrier, is in its most forward unlocked position, the extractor in of the bolt is fully exposed and not retained by the bolt carrier; and
the locking lugs are configured to each have a length of approximately 0.335 inch.

22. The firearm of claim 18, further comprising:
a tube configured to provide gas from a barrel of the firearm via a carrier key to a piston of the firearm;
a heat radiator formed on at least a portion of the tube;
wherein the heat radiator comprises threads on the tube; and
wherein the threads have a triangular shape.

23. The firearm of claim 22, wherein the threads are formed on a portion of the tube away from ends of the tube.

24. The firearm of claim 22, wherein the tube is configured for use on the firearm having the piston formed on the bolt of the firearm.

25. The firearm of claim 22, wherein the tube is configured for use on a carbine.

26. The firearm of claim 22, wherein the tube is configured to receive gas from the barrel of the firearm via a front sight of the firearm and to provide the gas to the bolt carrier of the firearm via the carrier key, the tube having an outside interfacing diameter to the bolt carrier key of less than 0.1792 inches, the tube having a length from a front sight mounting hole thereof to a rear end thereof of less than 9.57 inches for an M4 sight block location, and the tube having a length from a front sight mounting hole thereof to a rear end thereof of less than 14.95 inches for an M16 sight block location.

27. A method of making the tube of claim 22, the method comprising:
cutting the tube;
forming the heat radiator on the tube; and
installing the tube on the firearm such that the tube is configured to provide gas from the barrel of the firearm to the piston thereof;
wherein the forming of the heat radiator comprises forming threads on the tube having the triangular shape.

28. The firearm of claim 18, further comprising:
a tube configured to receive gas from a barrel of the firearm via a front sight of the firearm and to provide the gas to the bolt carrier of the firearm via a bolt carrier key;
wherein the tube has an outside interfacing diameter to the bolt carrier key of less than 0.1792 inch.

29. The firearm of claim 18, further comprising:
a tube configured to receive gas from a barrel of the firearm via a front sight of the firearm and to provide the gas to the bolt carrier of the firearm via a bolt carrier key; and
wherein the tube has a length from a front sight mounting hole thereof to a rear end thereof of less than 9.57 inches, and wherein the front sight mounting hole corresponds to an M4 firearm sight block location.

30. The firearm of claim 18, further comprising:
a tube configured to receive gas from a barrel of the firearm via a front sight of the firearm and to provide the gas to the bolt carrier of the firearm via a bolt carrier key; and
wherein the tube has a length from a front sight mounting hole thereof to a rear end thereof of less than 14.95 inches, and wherein the front sight mounting hole corresponds to an M16 firearm sight block location.

* * * * *